US012208771B2

(12) United States Patent
Ricketts

(10) Patent No.: US 12,208,771 B2
(45) Date of Patent: Jan. 28, 2025

(54) TAILGATE LADDER SYSTEM

(71) Applicant: Byron Norman Ricketts, Sunrise, FL (US)

(72) Inventor: Byron Norman Ricketts, Sunrise, FL (US)

( * ) Notice: Subject to any disclaimer, the term of this patent is extended or adjusted under 35 U.S.C. 154(b) by 346 days.

(21) Appl. No.: 17/532,885

(22) Filed: Nov. 22, 2021

(65) Prior Publication Data

US 2023/0158958 A1    May 25, 2023

(51) Int. Cl.
  *B60R 3/02*    (2006.01)
  *B60N 3/02*    (2006.01)
  *B62D 33/027*    (2006.01)

(52) U.S. Cl.
  CPC .............. *B60R 3/02* (2013.01); *B60N 3/023* (2013.01); *B62D 33/0273* (2013.01)

(58) Field of Classification Search
  CPC ........ B60R 3/02; B60N 3/023; B62D 33/0273
  See application file for complete search history.

(56) References Cited

U.S. PATENT DOCUMENTS

| | | | |
|---|---|---|---|
| 8,182,013 B1 * | 5/2012 | Alvarado | B60R 3/007 182/127 |
| 2004/0183326 A1 * | 9/2004 | Tegtmeier | B62D 33/0273 296/62 |
| 2006/0261623 A1 * | 11/2006 | Kuznarik | B60R 3/02 296/62 |

* cited by examiner

Primary Examiner — Jason D Shanske
Assistant Examiner — James J Triggs
(74) Attorney, Agent, or Firm — Diana Mederos; Mederos Legal, PLLC

(57) ABSTRACT

The Tailgate Ladder System (TRS) which is the only two stepped folding Tailgate Ladder in existence to date, that is comprised of a Ladder Casing, a rotating, aftermarket and sliding Tailgate Ladder, and a Three Point Rail. Together they form a climbing system which make accessing and climbing to an elevated Tailgate of a vehicle much easier. The Ladder Casing is recessed and it support and housed a closed Tailgate Ladder within its walls. The Tailgate Ladder is retractable, and has two folding Steps which open to give access to the climber, and close when not in use. The Three Point Rail is a flexible hand rail which give the climber a sturdy support. These three components of the TLS, combine to create a climbing system that is second to none, which give climbers a two stepped Ladder System, that with small steps, the rear of a pickup can be assessed.

7 Claims, 85 Drawing Sheets

TAILGATE LADDER SYSTEM

BACKGROUND OF THE INVENTION

The Tailgate Ladder System (TRS) is comprised of a Ladder Casing, a rotating, and sliding Tailgate Ladder, and a flexible Three Point Rail. Together they form a climbing system which make accessing and climbing to an elevated Tailgate of a vehicle, much easier, even for smaller individuals and older persons. The Ladder Casing is recessed, it supports and housed a closed Tailgate Ladder within its walls. The Tailgate Ladder is retractable, and has two folding Steps which open to give access to the Ladder and close when not in use. The Three Point Rail is a flexible hand rail which gives the climber a sturdy support as he/she moves up and down the Steps.

At 6' 5" tall, and the owner of a Lincoln Navigator L, climbing into the back door of my SUV, which is about the same height as that of an opened Tailgate of a pickup truck, is challenging, even at my height. For those who are shorter, they would even find it more difficult. I thought to myself that there is not an adequate climbing system on the market to access the Tailgate of a pickup truck, or the back door of a large SUV, without drastically affecting the outer appearance of the Tailgate, and therefore the Tailgate Ladder System was born. It does not interfere or affect in anyway the outer appearance of the Tailgate of the host vehicle.

There is a Tailgate Ladder that is now offered on GM pickup which has a single step. It opens from the outside of the Tailgate which significantly affects its outer appearance. My TLS on the contrary does not impede or affect in anyway, the outer appearance of the Tailgate, or a vehicle in general. The TLS sits on the inside facing side of the Tailgate and opens from within the confine of this area, and therefore the outer body side of the said Tailgate is not compromised and remains intact.

There are different variety of the Tailgate Ladder and they are as follow:
1) Manual Tailgate Ladder
2) Electric Tailgate Ladder
3) Sliding Tailgate Ladder
4) Aftermarket Tailgate Ladder The different types of Tailgate Ladders are virtually identical in most part, but where they differ are in the operating process and how it is attached to the Tailgate. The Manual Tailgate Ladder operates manually and flips over from the confine of the Ladder Casing to a functional two stepped Ladder. The Electric Tailgate Ladder is power operated, has a large Tube, and flips over from the confine of the Ladder Casing to a functional two stepped Ladder just like the Manual Tailgate Ladder. The Sliding Tailgate Ladder does not flip over like the first two Tailgate Ladders, but slides along its Tracks to open and close. The Aftermarket Tailgate Ladder can be manual, electrical or sliding and is not embedded in a recessed area of a Tailgate, but sits on the flat inside of it.

The Tailgate Ladder System (TLS) makes it easier for anyone to access the rear of a pickup or a SUV. This two Stepped Tailgate Ladder along with a flexible Three Point Rail, provides a climbing system that only requires small steps and with a sturdy rail, even the frail will find pleasure in utilizing this system.

SUMMARY OF THE INVENTION

The Tailgate Ladder System (TLS) has three major components which is the Ladder Casing, Tailgate Ladder, and the Three Point Rail. Together these three components combine to create a climbing system that is second to none, that give climbers an easy access to the rear of a pickup and also to the back door an SUV. Our TLS is the only two stepped retractable Tailgate Ladder in existence to date. The two Steps of Tailgate Ladder makes a significant difference when compared to a single step ladder, by only requiring smaller steps which makes it easier on the climber's joints and make the climb more appealing.

The Ladder Casing is stationery, mostly hidden from view, has a large recessed area that housed a closed Tailgate Ladder, and it is the backbone of the TLS. It is connected to the Tailgate by six Brackets, three on each short side, that are connected to the sturdy Left and Right Support Bars. The Tailgate Ladder swings open on a rotating joint of the Left and Right Support Bars of the Ladder Casing and retracks and closes to the recess of the said Ladder Casing.

The Tailgate Ladder is a two stepped Ladder that rotates or slides from the recessed of the Ladder Casing, and is one of the two moveable parts of the TLS. It is connected to the Ladder Casing by a rotating joint at the Left and Right Support Bar Heads which is at the front end of the Support Bars. There are four types of Tailgate Ladders, and they are the Manual Tailgate Ladder, Electric Tailgate Ladder, Sliding Tailgate Ladder and the Aftermarket Tailgate Ladder. They are mostly similar in appearance but differ in the operating process and also how they are attached to the Tailgate.

The Manual Tailgate Ladder operates manually, and flips over from the confine of the Ladder Casing to a functional two Stepped Ladder. The Electric Tailgate Ladder is power operated, has a large Tube to accommodate the Motor, and flips over just like the Manual Tailgate Ladder, to a functional two stepped Ladder. The Sliding Tailgate Ladder does not flip over like the first two Tailgate Ladders, but slides along its Tracks which are embedded in the Left and Right Support Bars, and is lowered to a functional two stepped Ladder. The Aftermarket Tailgate Ladder can be manual, electric or sliding, and is not embedded in a recessed area of the Tailgate but sits on the flat inside facing side of it.

The Three Point Rail is the second moveable component of the TLS. It is able to lift from the Rail Casing to an upright position, to assist the climber as he/she maneuvers the Steps. The Rail Handles of the Three Point Rail is flexible and can be moved to three different positions. The up position is for taller individuals who are able to reach higher, the horizontal position is for those who have an average reach, and the down position is for shorter individuals like kids and small adults.

The Tailgate Ladder System (TLS) provides a convenient and better way to move between a space, where the starting and end point are at different elevations, and are separated by height differences of anywhere between twenty-four to forty inched. This TLS bridge this gap with our two stepped Tailgate Ladder which only requires small steps for the climber, and a Three Point Rail to assist with the climb.

This TLS utilize the inside facing side of the Tailgate and therefore it does not interfere or affect the outer appearance of the pickup in anyway. From behind the pickup there is no seam line, no gaps, or bulge on the Tailgate to accommodate the Tailgate Ladder. One of our advantages is, all breaks, gaps and seam lines are on the inside facing side of the Tailgate which is mostly hidden from view.

Figure 1A:
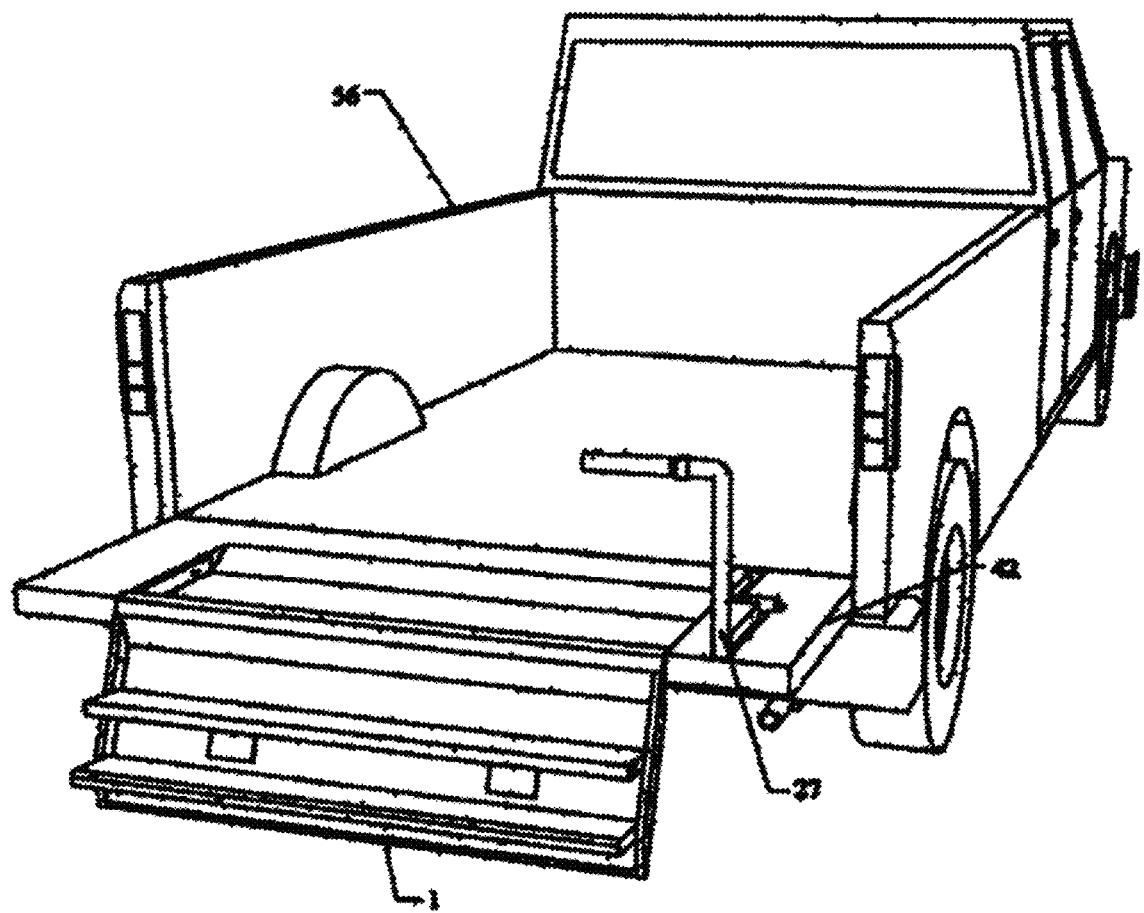
FIG. 1A is a rear view of a pickup with an opened Tailgate, and a fully opened Tailgate Ladder, with opened steps and an erected Three Point Rail, with a horizontal Rail Handle.

NUMERALS OF THE FIGURES 1. tailgate ladder
2. electric tailgate ladder
3. left arm
4. right arm
5. curved neck
6. curved neck
7. tailgate lock slot
8. curved slot
9. step support
10. main gate axle
11. belt
12. tailgate lock slot
13. step axle
14. step
15. step
16. handle
17. neck casing
18. left support bar
19. right support bar
20. left support bar head
21. right support bar head
22. U bracket
23. U bracket cover 24. anchor bracket
25. step handle backside
26. long screw
27. three-point rail main body
28. rail handle
29. stabilizer bar
30. rail base
31. shift button
32. bent neck
33. female slot
34. base connection loop
35. male insert
36. tip of three-point rail main body
37. slender bent recessed area
38. angled rail access point
39. bolt
40. step lock insert
41. step axle head
42. tailgate
43. ladder casing
44. tailgate lock insert
45. cylindrical motor
46. power cord
47. power cord connector
48. motor sleeve
49. tube
50. screw
51. control switch
52. casing gentle slope
53. motorhead
55. step lock slot
56. pickup
57. sport utility vehicle (SUV)
58. notched-out bumper
59. small axle hole
60. large axle hole
61. motor bulge
62. tailgate gentle slope
63. rubber bumper
64. left support bar head extension
65. switch cover
67. platform anchor bracket
68. male track
69. female track
71. end cap
72. retractable anchor
73. anchor slot
75. left support track bar
76. support bar head
77. right support track bar
78. track plate
79. track opening
80. track
81. track
82. axle wheel
83. sliding tailgate ladder
84. pull handle
85. motorhead connector
86. nut
87. washer
88. motor bracket
89. connector slot
90. center pin
91. floor
92. rail casing
93. connecting shaft
94. shift chamber
95. disc
97. curved slot
98. spring
99. angled slot
100. stationary horizontal bar
101. disc spout
102. bolt
103. belt recessed area
104. step axle hole
105. belt cover
106. belt cover insert
107. belt cover clip
108. nut
109. washer
110. step axle gear
111. gear hole

DETAILED DESCRIPTIONS OF THE DRAWINGS

FIG. 1A is a rear view of a pickup with an opened Tailgate, and a fully opened Tailgate Ladder, with opened steps and an erected Three Point Rail, with a horizontal Rail Handle. When closed the Tailgate Ladder and the Three Point Rail are flushed with the inside facing side of the Tailgate which does not interfere or reduce any cargo capacity of the pickup. The Tailgate is first opened then the Tailgate Ladder is pulled up from the inside of the opened Tailgate, and flipped over to the underside as it rotates to about 260 degrees from the floor of the Ladder Casing. The swinging actions of the Tailgate Ladder is similar to that of a door being opened and closed. The Steps are then lowered by pulling the handles on the back of the Step. The Three Point Rail is also pulled from the inside of the Rail Casing to an erected position. The Rail Handle of the Three Point Rail has been lowered to a horizontal position.

Figure 1B:
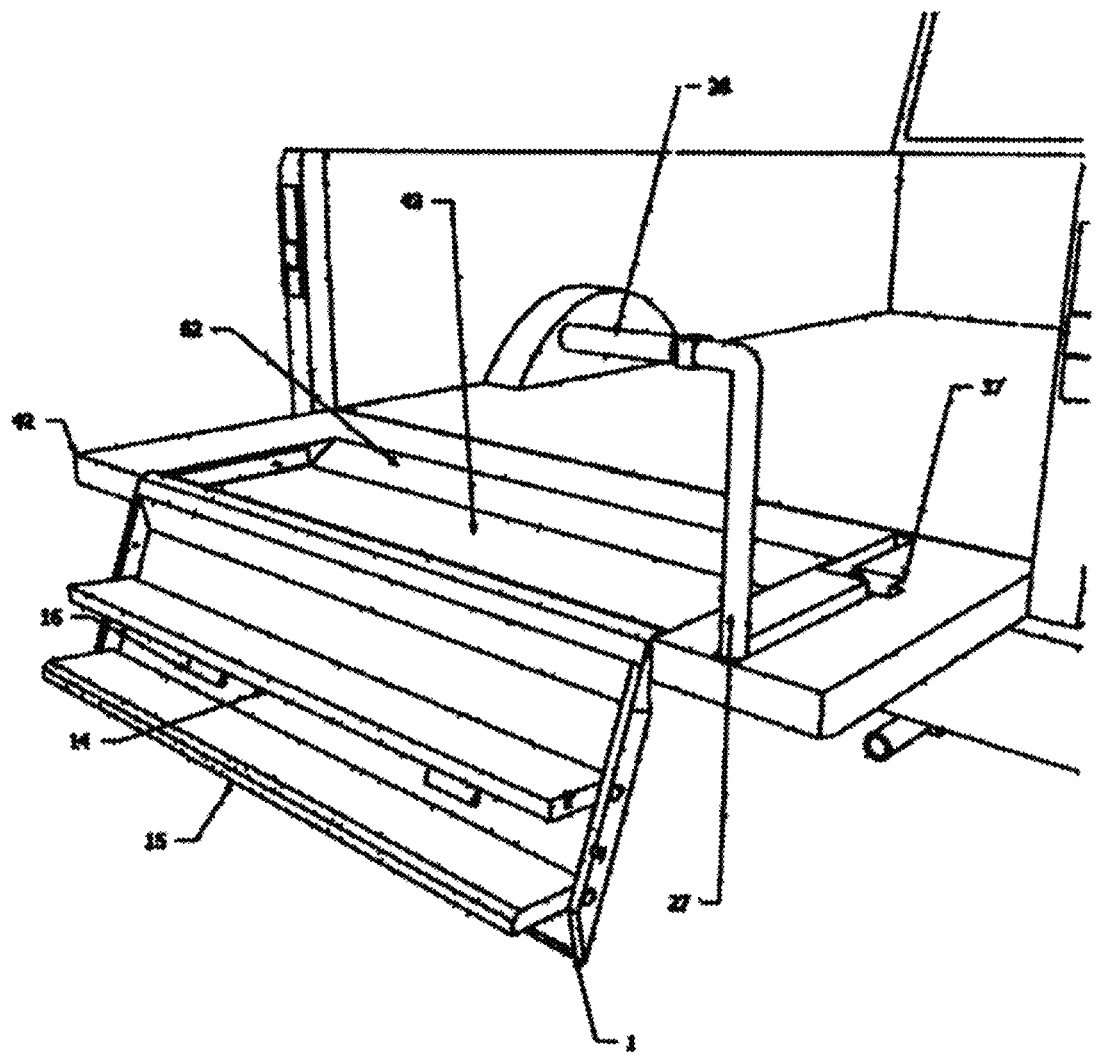
FIG. 1B is a closeup of the rear of a pickup of the said picture in Fig. A-1a. From slight right, it shows an opened Tailgate with an opened Tailgate Ladder and an erected Three Point Rail with a horizontal Rail Handle. Both has been lifted from their respective recessed casing which are now vacant. The larger rectangular recessed area, housed a closed Tailgate Ladder and the slender bent recessed area, housed a closed Three Point Rail.

FIG. 1B is a closeup of the rear of a pickup of the said diagram in FIG. 1A. From slight right, it shows an opened Tailgate with an opened Tailgate Ladder and an erected Three Point Rail with a horizontal Rail Handle. Both has been lifted from their respective recessed casing which are now vacant. The larger rectangular recessed area, housed a closed Tailgate Ladder and the slender bent recessed area, housed a closed Three Point Rail. The large recessed area known as the Ladder Casing has a Gentle Slope in the rear which matches the bottom section of the Tailgate Ladder. Between both Steps are two protruding rectangular boxes which are the backside of the Handle of the Tailgate Ladder. A horizontal Rail Handle of the Three Point Rail provides support for the climber.

Figure 2A:
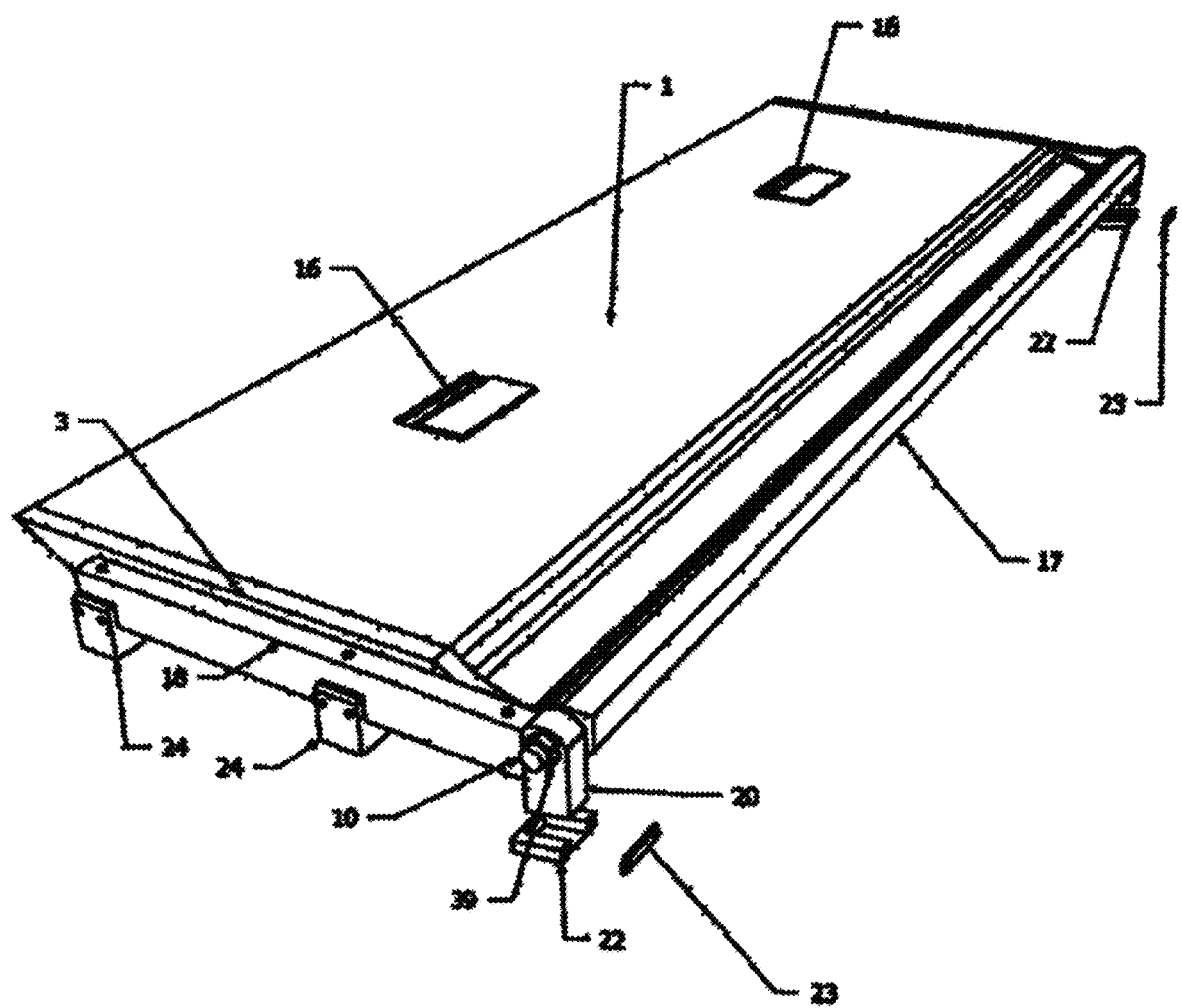
FIG. 2A is a left-side, front view of a partial Tailgate Ladder System (TLS) with a Tailgate Ladder that is in full view and a Ladder Casing which is mostly hidden except on the edges. The steps of the Tailgate Ladder are folded and hidden from view. The Three Point Rail is the missing part of the TLS.

FIG. 2A is a left-side, front view of a partial Tailgate Ladder System (TLS) with a Tailgate Ladder that is in full view and a Ladder Casing which is mostly hidden except on the edges. The steps of the Tailgate Ladder are folded and hidden from view. The Three Point Rail is the missing part of the TLS. The unseen right side of the Tailgate Ladder is a mirror image of the visible left side. There are two Anchor Brackets and One U Bracket on each side, which is a part of the Ladder Casing and together they anchor it to the Tailgate. Two L Shaped Anchor Brackets in the rear, are connected to the Support Bar, and two U Brackets at the front, are floating below both Support Bar Heads, and are flanked in the front by U Bracket Covers. All the L Shaped Brackets and the U Brackets secure the Ladder Casing to the Tailgate and are welded to the Tailgate for added strength. The Main Gate Axle of the Tailgate Ladder has a large Number One (#1) Nut on the outside of the Left Support Bar Head which is penetrates by the said Main Gate Axle. This connection allows the Tailgate Ladder to be able to swing up and over to open to about 260 degrees, on the Support Bar Head, and swings back up and over to close as it returns to its starting point. Next to the Left Support Bar is the Left Ann which is the outer most part of the Tailgate Ladder, Both Arms curve into a Neck which is partially visible on the Left Ann. The Main Gate Axles is locked to the Left Arms and forms a rotating joint as it penetrates the Support Bar Head. On top are two Handles which is used to lift the Tailgate Ladder manually.

Figure 2B:
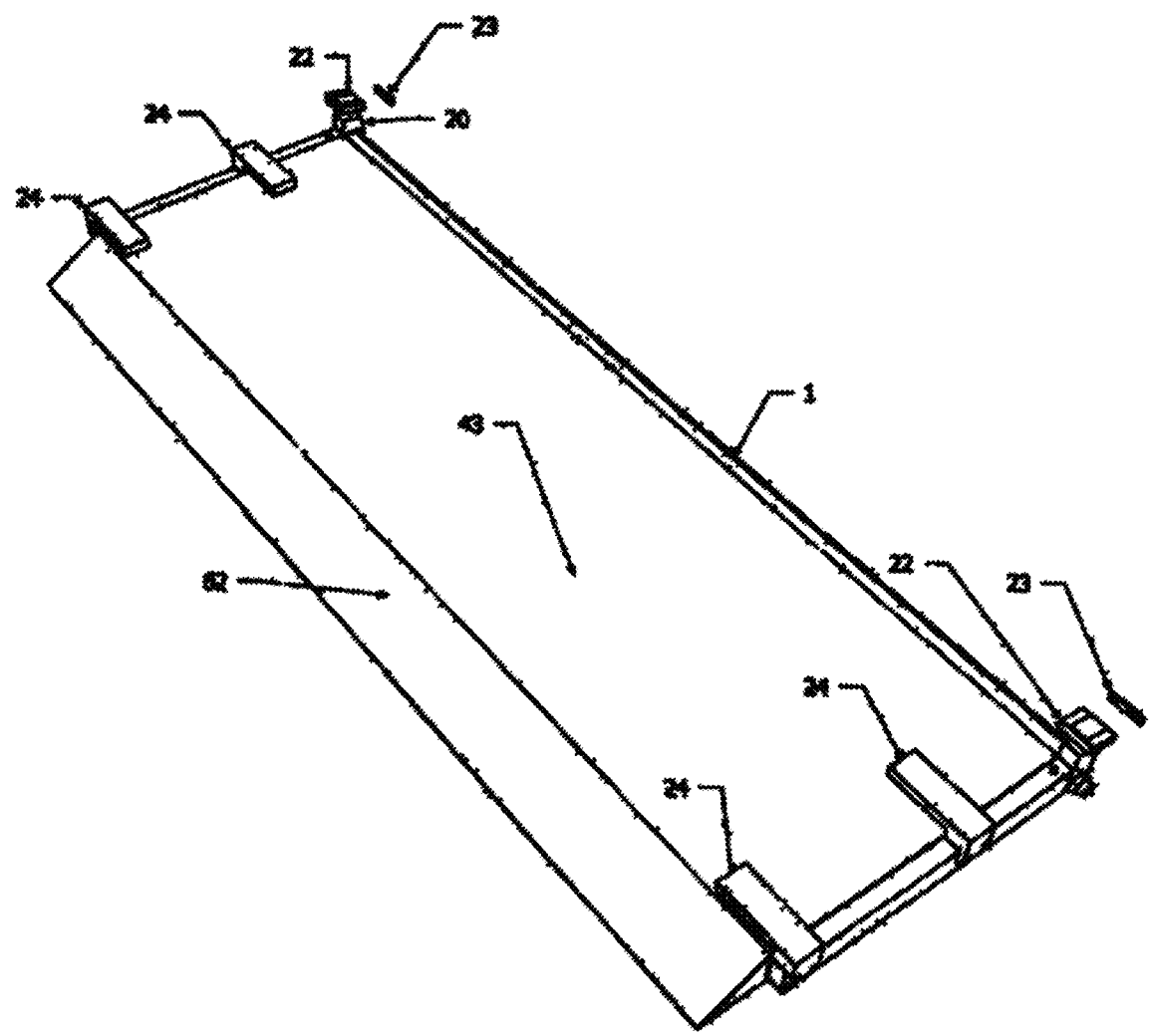
FIG. 2B shows the underside of the said partial Tailgate Ladder System in Fig. A-1c. From this view the bottom of the Ladder Casing is in full view, with attached brackets secured to the two short sides. The folded Steps are also not visible from this view.

FIG. 2B shows the underside of the said partial Tailgate Ladder System in Fig. A-1c. From this view the bottom of the Ladder Casing is in full view, with attached brackets secured to the two short sides. The folded Steps are also not visible from this view. In the front the Ladder Casing has a Gentle Slope which allows a smooth transition from it to the bed of the pickup. Four L Shaped Anchor Brackets and Two U Bracket, secure the Ladder Casing to the Tailgate. Floating in front of both U Bracket are U Bracket Covers. All the connecting brackets will be welded to the inside of the Tailgate. The U Brackets are designed to allow the Left and Right Support Bar Head to slip in and out and to be locked in place by the U Bracket Cover. From this view the Tailgate Ladder is mostly hidden and is barely visible on the rear long-side of the diagram.

Figure 2C:
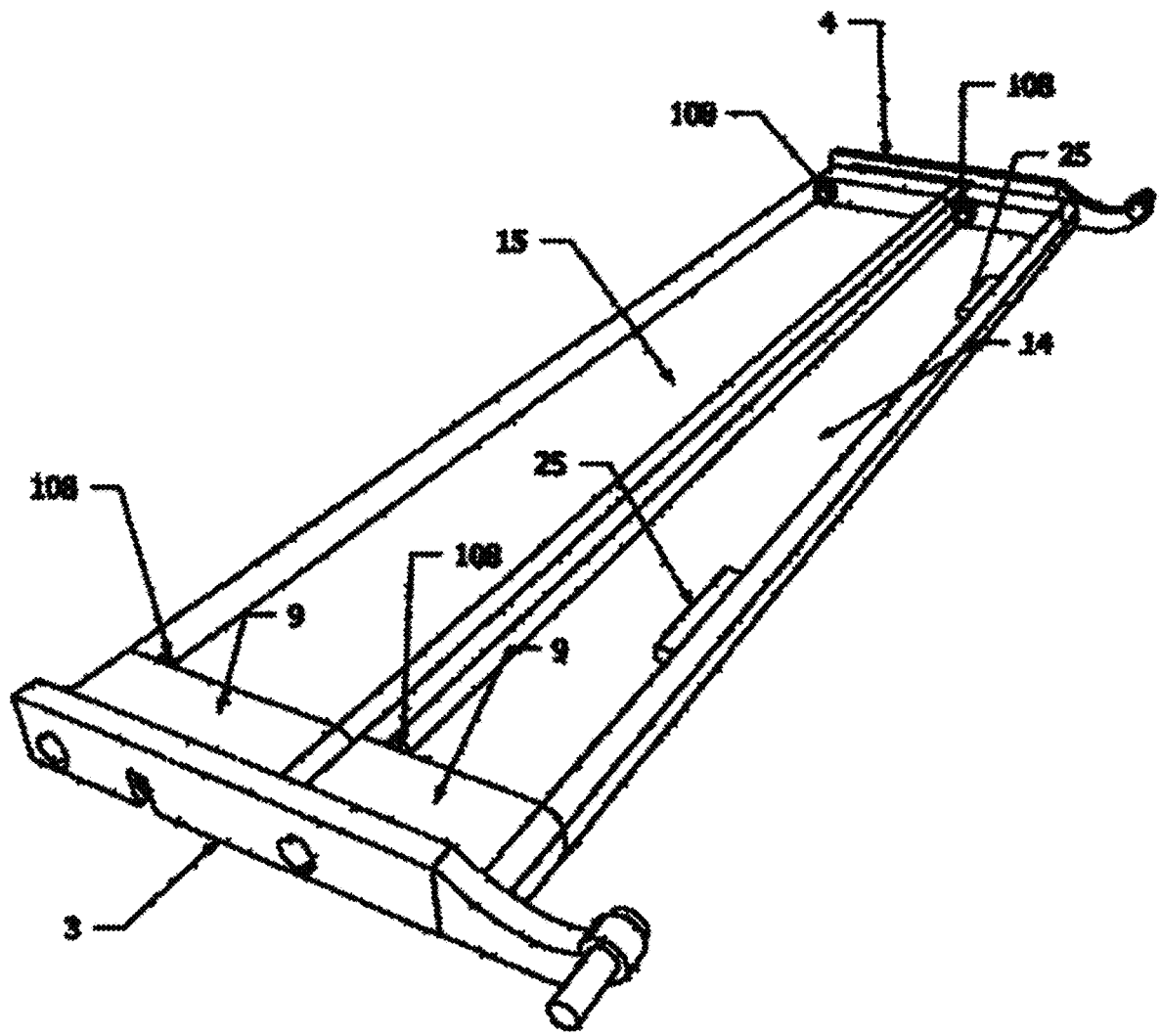
FIG. 2C shows the topside of a Tailgate Ladder from the left side with the outer cover and the top of both Steps removed, which exposed the inside of the Steps. The Steps are sandwiched by both Right and Left Arms and are attached to them by two Step Axle at the rear end of each Step.

FIG. 2C shows the topside of a Tailgate Ladder from the left side with the outer cover and the top of both Steps removed, which exposed the inside of the Steps. The Steps are sandwiched by both Right and Left Arms and are attached to them by two Step Axle at the rear end of each Step. The Right Arm in the rear is a mirror image of the Left Arm in the front of the diagram. To the inside of the Left and Right Arms are four Step Supports which are the solid inner frames of the Steps. On the left, a partial view of two #6 Bolts which secure the Step Axles to the Step Supports, and on the far right two of the said #6 Bolts are in full view as they secure the Step Axles to the Step Supports. On the inside of the Top Step which is on the right. are two partial views of the backside of the Step Handles.

Figure 3A:
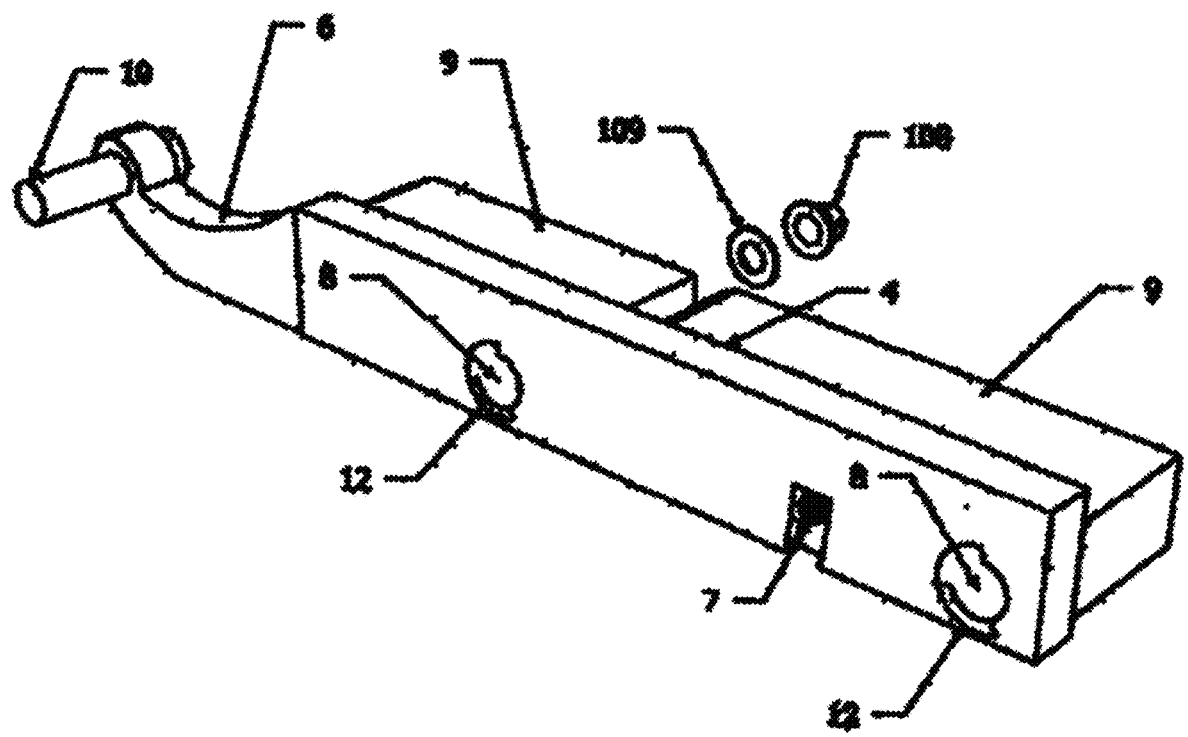
FIG. 3A is a right-side view of the Right Ann with attached Step Supports and floating #6 Washer and Nut in the background. The Left Ann along with the Right Ann which is a mirror image, together they form the outer frame of the Tailgate Ladder.

FIG. 3A is a right-side view of the Right Arm with attached Step Supports and floating #6 Washer and Nut in the background. The Left Ann along with the Right Ann which is a mirror image, together they form the outer frame of the Tailgate Ladder. The Right Ann is one solid piece with the circular end pierced by the Main Gate Axle that is next to the Curved Neck which is connected to the rectangular body of the said Right Arm. The rectangular body of the Right Ann is pierced by two Step Axles which are connected to the Step Supports. Flush on the face of the Right Ann, are two Step Axle Heads, which are the large outer part of the Step Axle. Below each Step Axle Head is a Curved Slots which is an opening that allows the said Step Axle Head to oscillate in it. The Step Axle Heads are able to move back and forth along the Curved Slots which cause the Steps to open and close. Between both Step Axle Heads is the Tailgate Lock Slot and together with the Tailgate Lock Insert, they secure the Tailgate Ladder to the Ladder Casing.

Figure 3B:
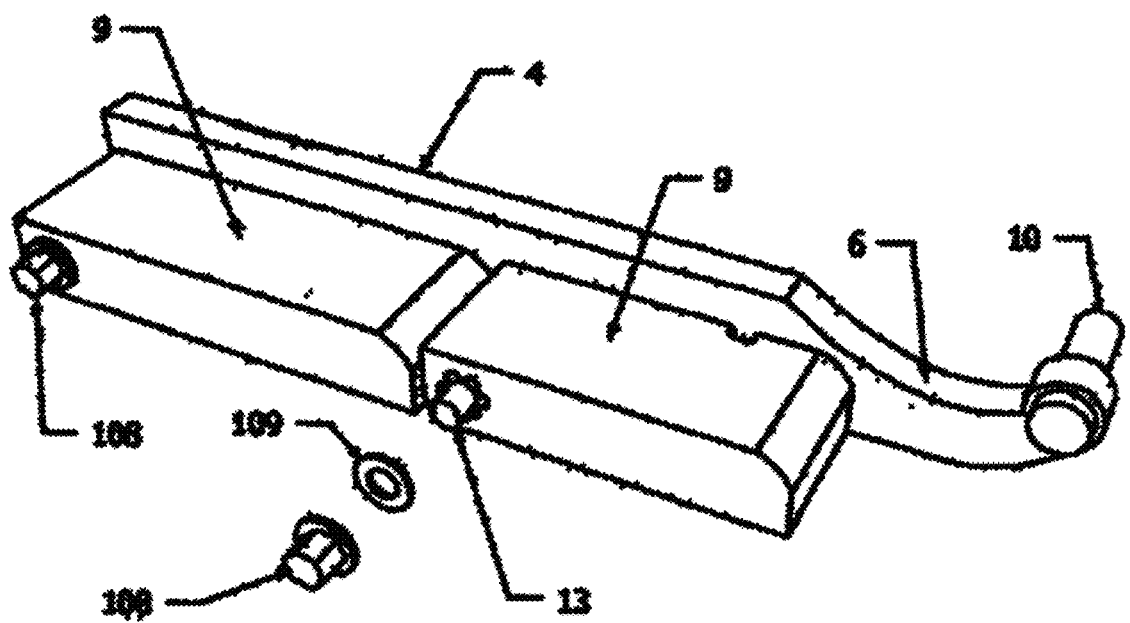
FIG. 3B is a left side view of the said Right Ann is Fig. A-1f. From this view, both Step Supports are connected to the Right Arm by the Step Axles, with one fully secured and the other has aligned #6 Washer and Nut.

FIG. 3B is a left side view of the said Right Ann is Fig. A-1f. From this view, both Step Supports are connected to the Right Ann by the Step Axles, with one fully secured and the other has aligned #6 Washer and Nut. The circular end of the Right Ann is pierced by the Main Gate Axle, and moving to the left it curves into a Curved Neck and then continues to form the main body of the said Right Ann. The Step Support on the right is a solid frame of the Top Step and is slighter smaller than the one on the left which is a solid frame for the Bottom Step.

Figure 3C:
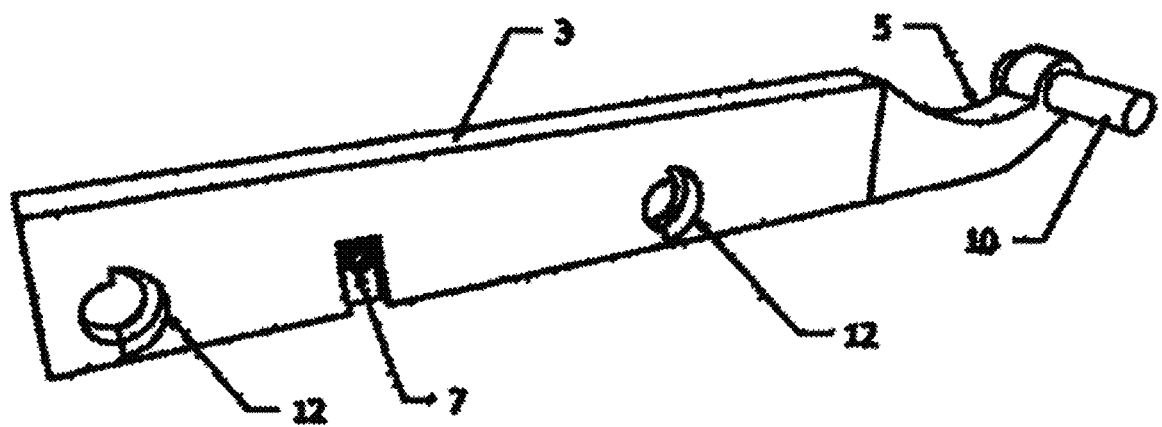
FIG. 3C is a left-side view of the Left Ann that is pierced by the Main Gate Axle on the far narrow end. Both Curved Slots are vacated by the Step Axles Head which therefore create vacant tunnel sections. The Tailgate Lock Slot is located between both Curved Slots and together with the Tailgate Lock Insert, they lock the Tailgate Ladder to the Ladder Casing.

FIG. 3C is a left-side view of the Left Ann that is pierced by the Main Gate Axle on the far narrow end. Both Curved Slots are vacated by the Step Axles Head which therefore create vacant tunnel sections. The Tailgate Lock Slot is located between both Curved Slots and together with the Tailgate Lock Insert, they lock the Tailgate Ladder to the Ladder Casing.

Figure 3D:
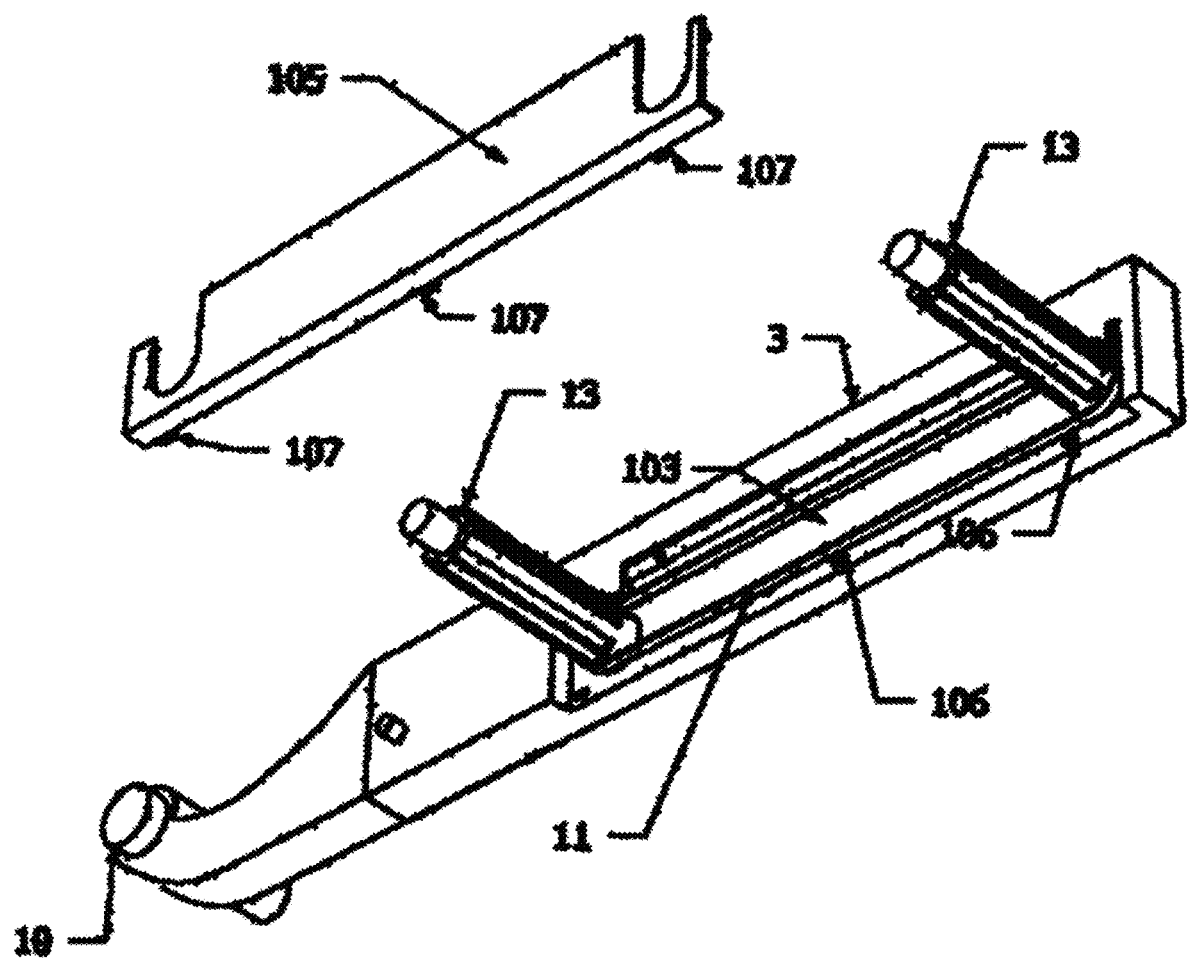
FIG. 3D is a right-side view of the Left Ann with a separated and aligned Belt Cover. Both Step Axles are connected to the Belt which synchronize their movement.

FIG. 3D is a right-side view of the Left Ann with a separated and aligned Belt Cover. Both Step Axles are connected to the Belt which synchronize their movement. The Belt Cover has three Belt Cover Clips on the lower inside of it that are aligned with the Belt Cover Inserts. On the left-side of the Left Ann where it curves and narrows, is the Main Gate Axle. A Belt Recessed Area housed both Step Axles that are linked by a Belt, which does not need a tensioner for tightness.

Figure 3E:
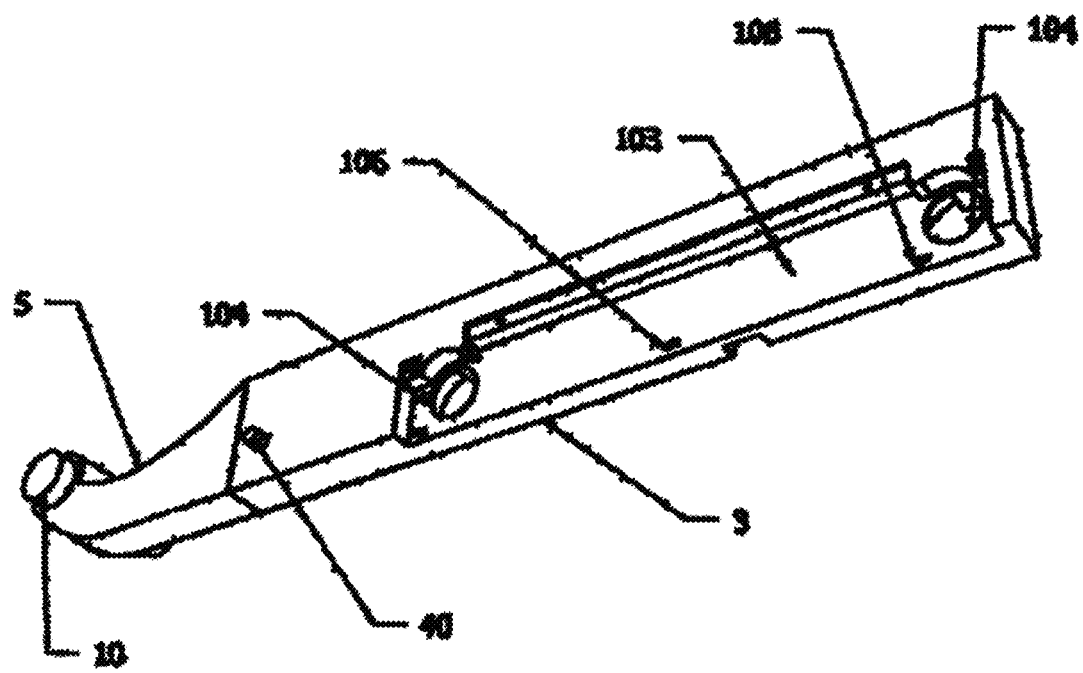
FIG. 3E is a right-side view of the said Left Ann in Fig. A-1i, but the Belt, Belt Cover and both Step Axles have been removed.

FIG. 3E is a right-side view of the said Left Ann in Fig. A-1i, but the Belt, Belt Cover and both Step Axles have been removed. The vacated, Belt Recessed Area now revels both Step Axle Holes which housed both Step Axles. From left, the Left Ann has a narrow circular end that is pierced by the Main Gate Axle and flows into a Curved Neck which extend into a wider body. The small cylindrical Step Lock Insert is right of the Curved Neck, and together with the Step Lock Slot, they lock the Steps in place. Along the bottom of the Belt Recessed Area are Belt Cover Inserts which secure the Belt Cover.

Figure 3F:
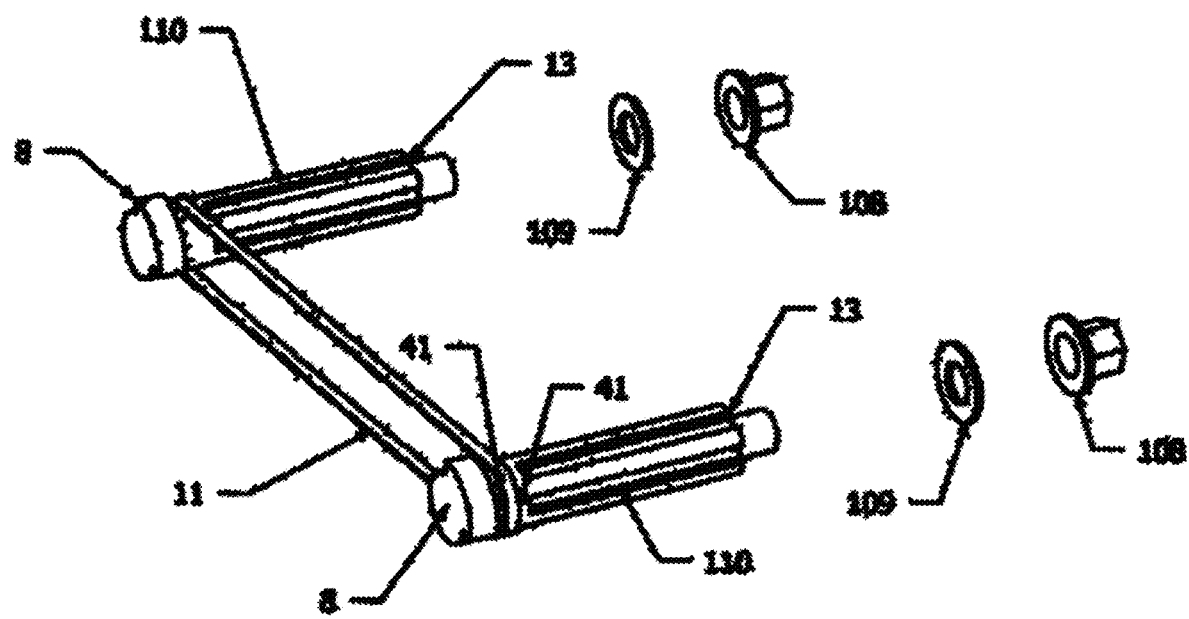
FIG. 3F shows both Step Axles connected by the Belt just behind the Step Axle Head. This connection causes the synchronization of both Step Axles and therefore allow both Steps to open and close together.

FIG. 3F shows both Step Axles connected by the Belt just behind the Step Axle Head. This connection causes the synchronization of both Step Axles which allow both Steps to open and close together. The Step Axle has a large offsetting Step Axle Head that is attached to a cylindrical body, mostly covered in gears and narrows into a blot end that is aligned by floating #6 Washer and Nut. The Step Axle Gears of both Step Axles locks into the gears of the Step Support.

Figure 3G:
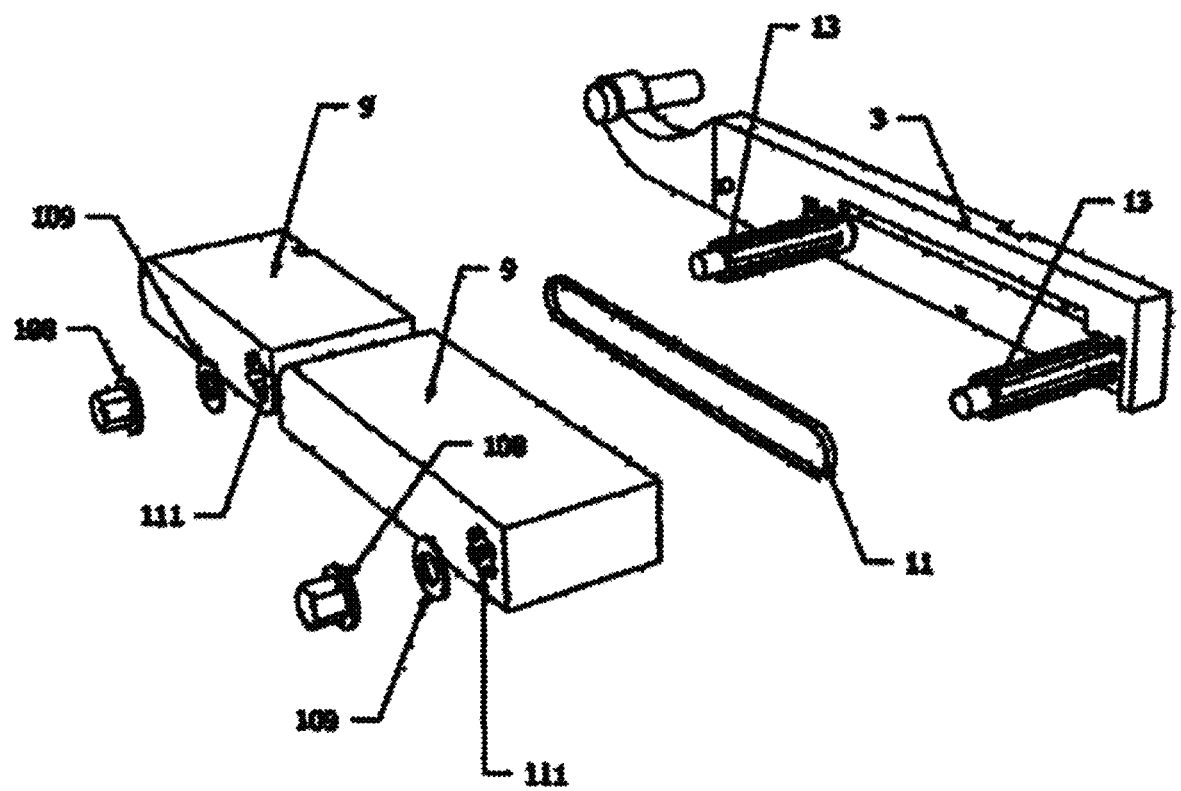
FIG. 3G shows a Left Ann in the rear with the Belt Cover removed, a separated and aligned Belt in the middle, and both Step Support in the front with #6 washers and Nuts on the outside.

FIG. 3G shows a Left Ann in the rear with the Belt Cover removed, a separated and aligned Belt in the middle, and both Step Support in the front with #6 washers and Nuts on the outside. The Left Ann has attached and protruding Step Axles that are aligned with the separated Belt. Both Step Supports which are solid frames of the Steps, are pierced by a Gear Hole on the right end that fits the Step Axle Gear of the Step Axle. On the outside of the Step Supports are #6 Washers and Nuts that fasten the Step Axles of the said Step Supports.

Figure 4A:
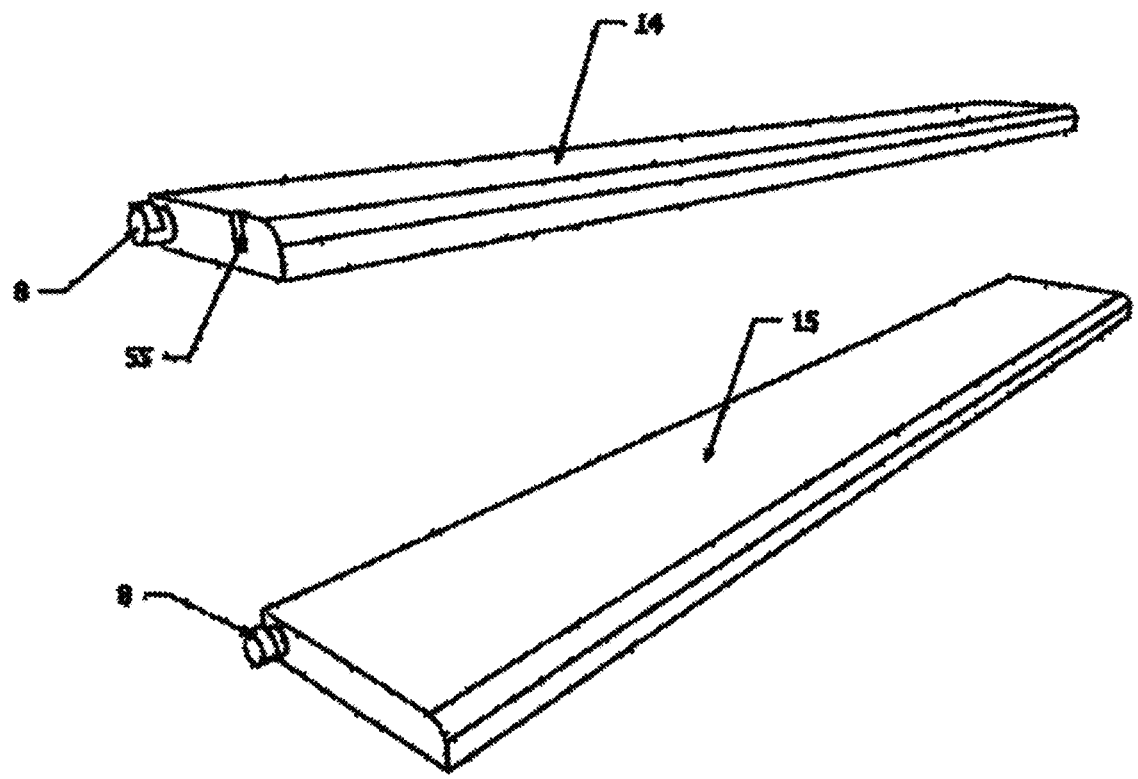
FIG. 4A shows both Steps with exposed ends revealing both Step Axle Head and the Step Lock Slot of the Top Step. Both Steps are similar in length but are different in width, where the Bottom Step is much wider than the Top Step.

FIG. 4A shows both Steps with exposed ends revealing both Step Axle Head and the Step Lock Slot of the Top Step. Both Steps are similar in length but are different in width, where the Bottom Step is much wider than the Top Step. The protruding Step Axle Heads are the outmost part of the Step Axles which penetrates and locks into the gears of the Step Support. All the features of the left-side, including the Step Lock Slot of the Top Step is a mirror image of the hidden right-side. Together both Step Lock Slots lock on to the Step Lock Inserts of the Right and Left Arm, and they lock the closed Steps in place.

Figure 4B:
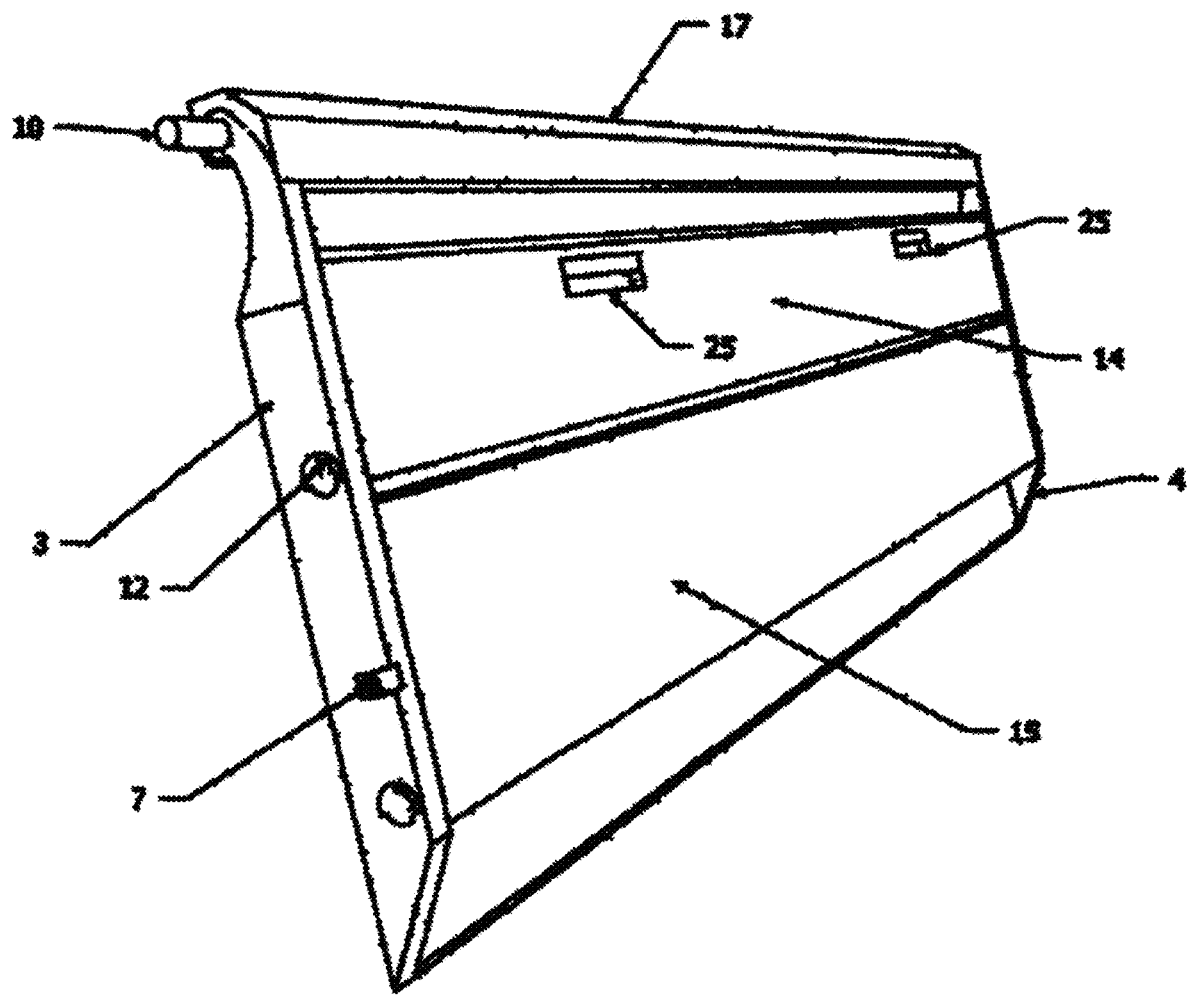
FIG. 4B shows an upright Tailgate Ladder that has been lifted from the confine of the Ladder Casing and is now flipped over with closed Steps. The Steps can now be lowered which would give the climber access to the Tailgate Ladder.

FIG. 4B shows an upright Tailgate Ladder that has been lifted from the confine of the Ladder Casing and is now flipped over with closed Steps. The Steps can now be lowered which would give the climber access to the Tailgate Ladder. The features of the left-side of the Tailgate Ladder are identical to the hidden right-side, and the Main Gate Axle at the top left connect on both sides to the Ladder Casing at a rotating joint that allows the Tailgate Ladder to swing up and over to open, and with the same motion in reverse, to close. The Curved Slots are opening along the Arms that allows the Step Axle Head to move as the Steps open and close. The two Step Handles of the Top Step are used to open both Steps. At top, the Neck Casing wraps around the Curved Neck of the Arms from side to side.

Figure 4C:
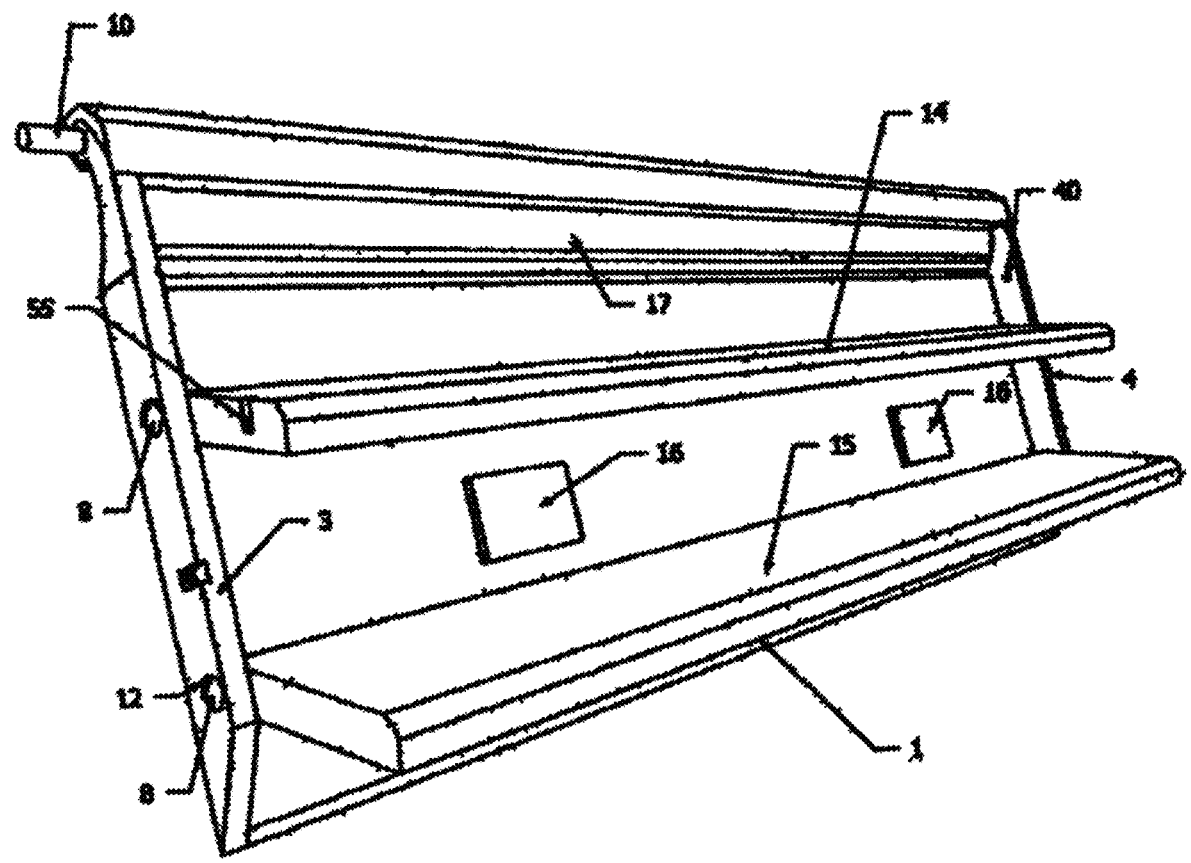
FIG. 4C is a left side view of an opened Tailgate Ladder with opened Steps. This Tailgate Ladder is ready to be used and will provide easy access to the bed of a pickup.

FIG. 4C shows a left side view of an opened Tailgate Ladder with opened Steps. This Tailgate Ladder is ready to be used and will provide easy access to the bed of a pickup. The Tailgate Ladder is in an upright position and the Steps are lowered which exposed the rectangular backside of the Tailgate Handles. In this position with the Steps down, the Step Axle Heads rotate from one end of the Curved Slots of the Arm, to the other end. Also exposed with the lowering of the Steps are the Step Lock Slot on the outer end of the Top Step, and the Step Lock Insert, which is visible on the upper, inner side of the far-Right Arm. When the Steps are closed, the Step Lock Slots on both ends of the Top Step, locks into the Step Lock Insert, on the inside of the Arms and prevents the Step from moving.

Figure 4D:
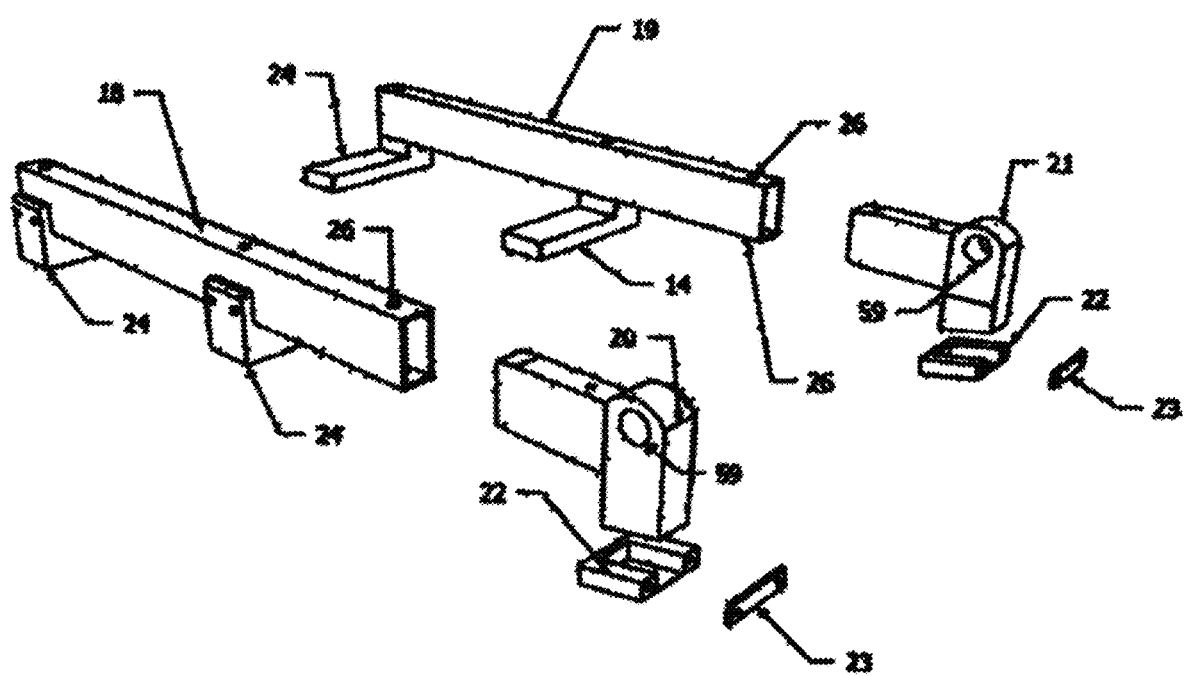
FIG. 4D is a left-side view of a pair Left and Right Support Bars with attached Anchor Brackets, separated Left and Right Support Bar Head and U Brackets with floating U Bracket Cover in the front. Together all these components combine to form the frame or the backbone of the Ladder Casing.

FIG. 4D is a left-side view of a pair Left and Right Support Bars with attached Anchor Brackets, separated Left and Right Support Bar Head and U Brackets with floating U Bracket Cover in the front. Together all these components combine to form the frame of the Ladder Casing. The Right and Left Support Bars are the backbone of the Ladder Casing and the Tailgate Ladder System at large. Four Anchor Brackets in the rear and the two U Brackets in the front are connected to the inside surface of the Tailgate. They are the only part of the structure that is anchor to Tailgate. The Support Bars are then bolted to the Anchor Brackets via short screws at the sides and long screws which goes from the top of the Support Bars and penetrate the Anchor Brackets. The Support Bar Head is then inserted into the Support Bar and is secure in place by a long screw from the top. The Support Bar Head simultaneously slides into the Support Bar and the U Bracket and is also secured by the U Bracket Cover.

Figure 4E:
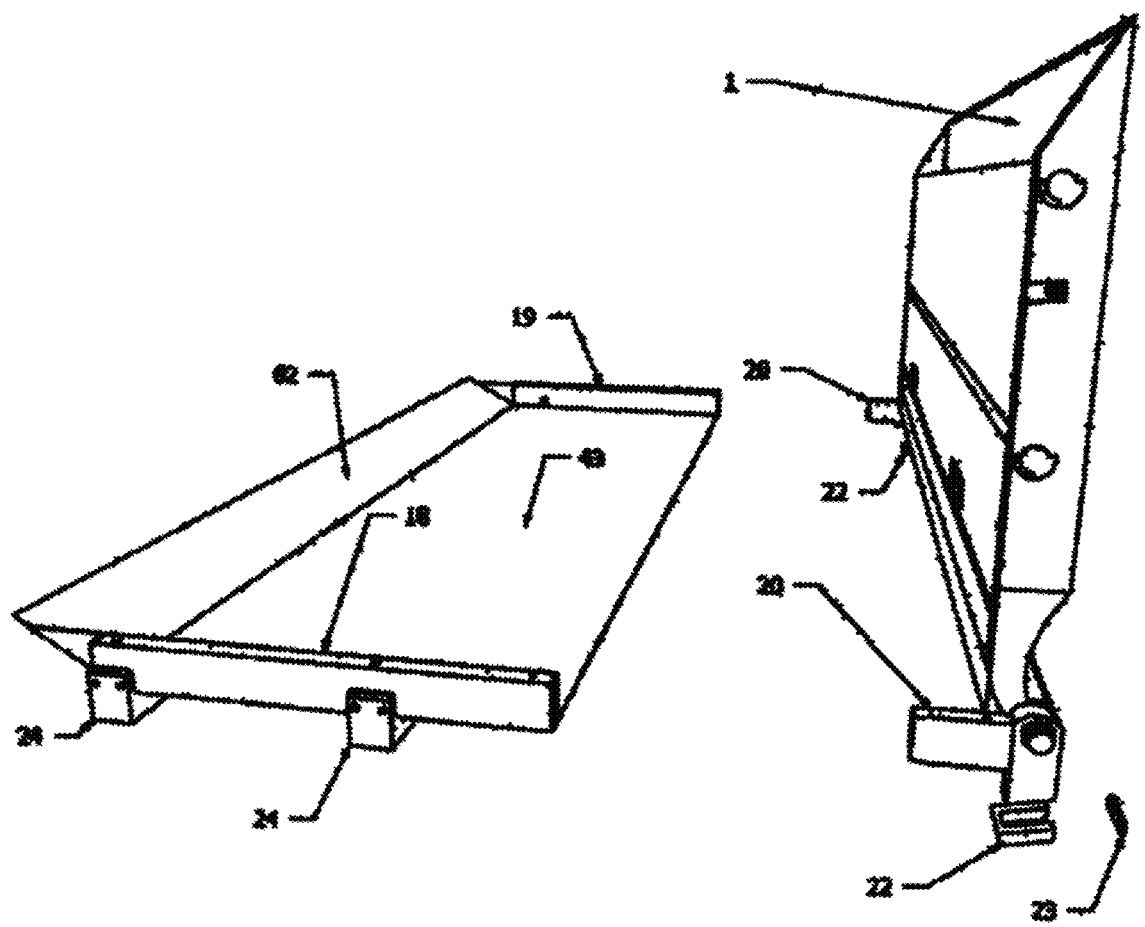
FIG. 4E is a left-side view of a separated Tailgate Ladder System, with the Ladder Casing, excluding the Left and Right Support Bar Head, on the left and the Tailgate Ladder including the Left and Right Support Bar Head of the Ladder Casing, on the right.

FIG. 4E is a left-side view of a separated Tailgate Ladder System, with the Ladder Casing, excluding the Left and Right Support Bar Head, on the left and the Tailgate Ladder including the Left and Right Support Bar Head of the Ladder Casing, on the right. The Left and Right Support Bar Head of the Ladder Casing are attached and bolted to the Tailgate Ladder. The rectangular tube section of the Left and Right Support Bar Heads are aligned with the left and Right Support Bar and when they are attached, a long bolt is inserted from on top to secures them together.

Figure 4F:
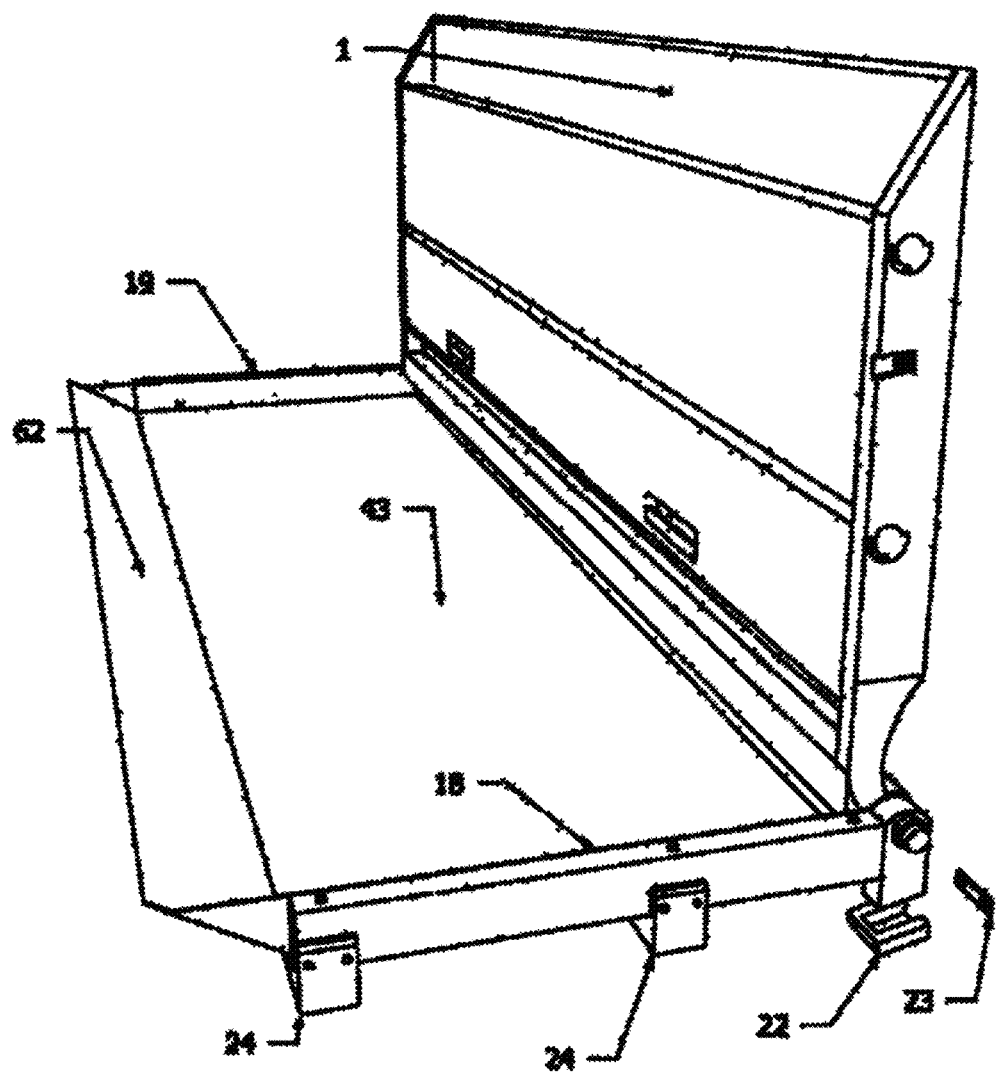
FIG. 4F is a left side view of the Tailgate Ladder System with the Ladder Casing and the Tailgate Ladder connected together. The Tailgate Ladder is in an upright position as it is being connected to the Ladder Casing.

FIG. 4F is a left side view of the Tailgate Ladder System with the Ladder Casing and the Tailgate Ladder connected together. The Tailgate Ladder is in an upright position as it is being connected to the Ladder Casing. The Tailgate Ladder has a pointed end which matches the Gentle Sloped area of the Ladder Casing.

Figure 4G:
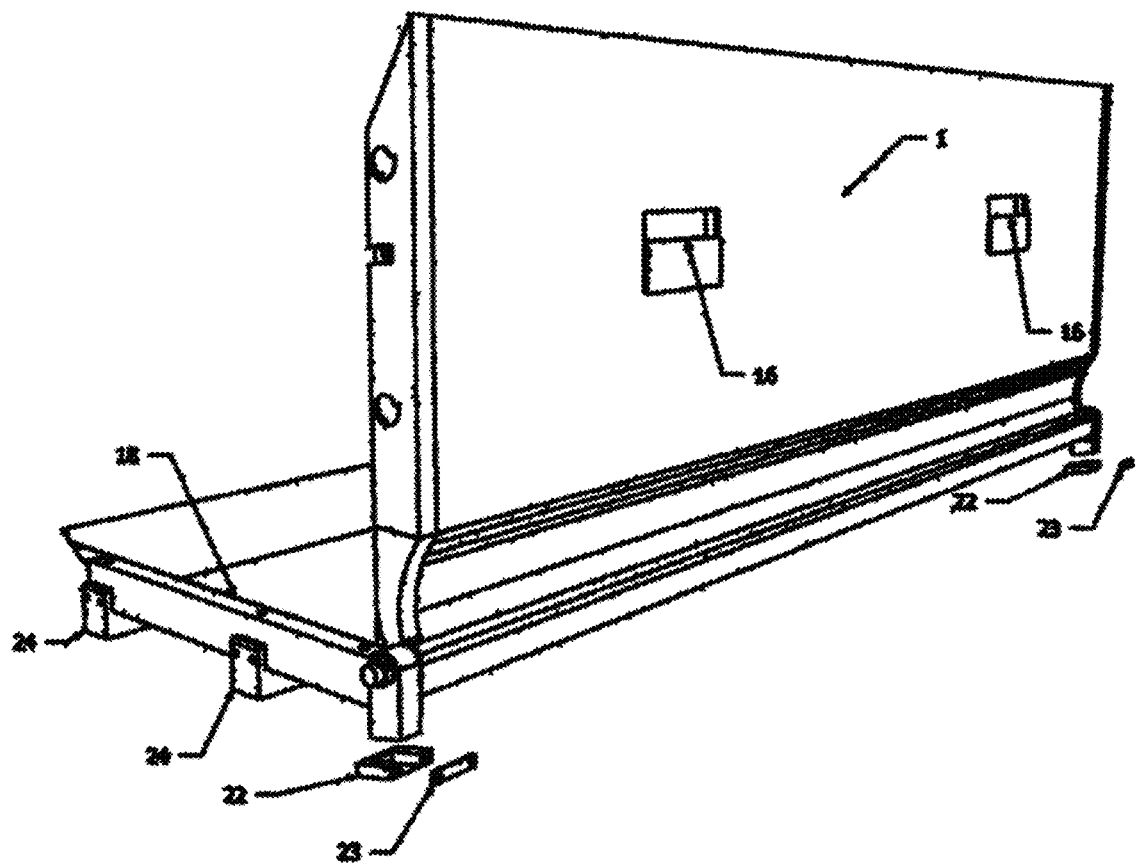
FIG. 4G is a front, left-side view of the said diagram in Fig. A-1r. From this view the topside of the upright Tailgate Ladder is in full view showing both Tailgate Handles. A partial view of the Ladder Casing shows attached Anchor Brackets on the left and in the front are aligned and floating U Brackets and U Bracket Covers.

FIG. 4G is a front, left-side view of the said diagram in FIG. 4F. From this view the topside of the upright Tailgate Ladder is in full view showing both Tailgate Handles. A partial view of the Ladder Casing shows attached Anchor Brackets on the left and in the front are aligned and floating U Brackets and U Bracket Covers. The Tailgate Ladder fits completely in the recessed Ladder Casing and does not consume any valuable space.

Figure 4H:
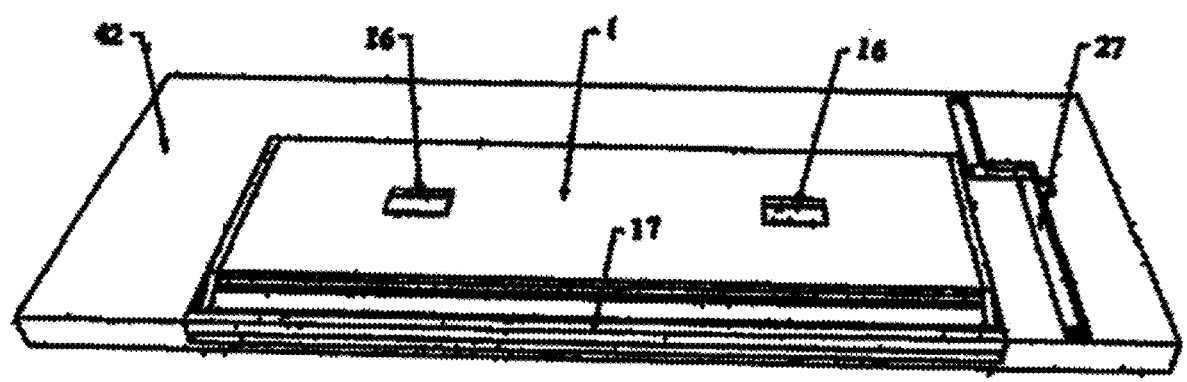
FIG. 4H shows a front view of a Tailgate of a pickup truck with a closed Tailgate Ladder and a closed Three Point Rail embedded in the recessed areas.

FIG. 4H shows a front view of a Tailgate of a pickup truck with a closed Tailgate Ladder and a closed Three Point Rail embedded in the recessed areas. The Tailgate Ladder is fully closed and is flushed with the edge of the Tailgate. The Tailgate Handles and the Neck Casing of the Tailgate Ladder are visible from this view. The Three Point Rail is also closed and is laying in the slender jagged recessed area to the right of the closed Tailgate Ladder.

Figure 5A:
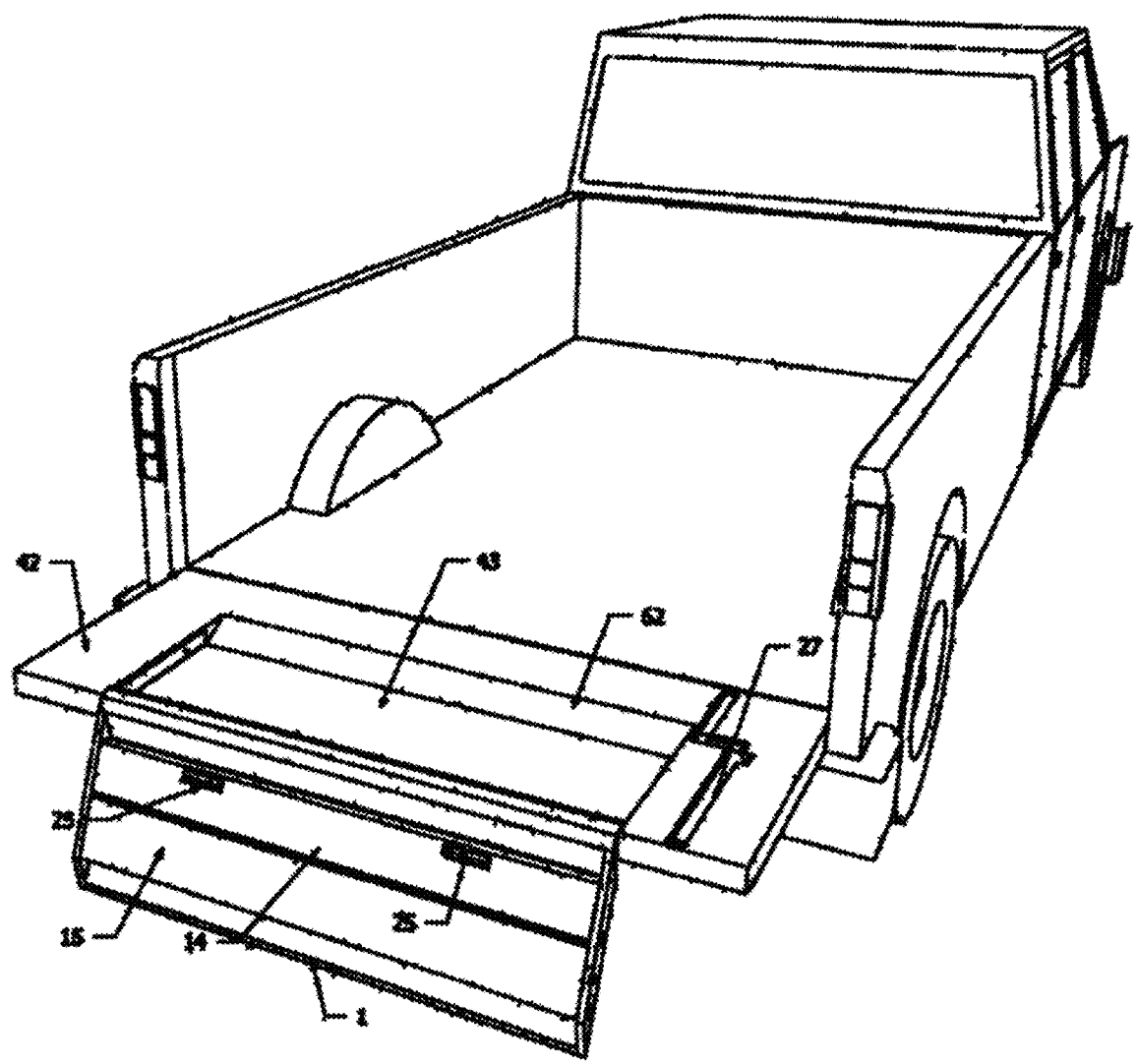
FIG. 5A shows a rear view of a pickup with an open Tailgate with two recessed areas. The large rectangular recess on the left houses the Tailgate Ladder and the slender bent recess on the right houses the Three Point Rail.

FIG. 5A shows a rear view of a pickup with an open Tailgate with two recessed areas. The large rectangular recess on the left houses the Tailgate Ladder and the slender bent recess on the right houses the Three Point Rail. The large recess is comprised of a fully installed Ladder Casing and a Rail Casing in the narrow recess. The recess of the Tailgate shows the Ladder Casing with a Gentle Slope in the rear and a miniature, protruding Tailgate Lock Insert located on the left wall which is barely visible, and on the right is the jagged Rail Casing.

Figure 5B:
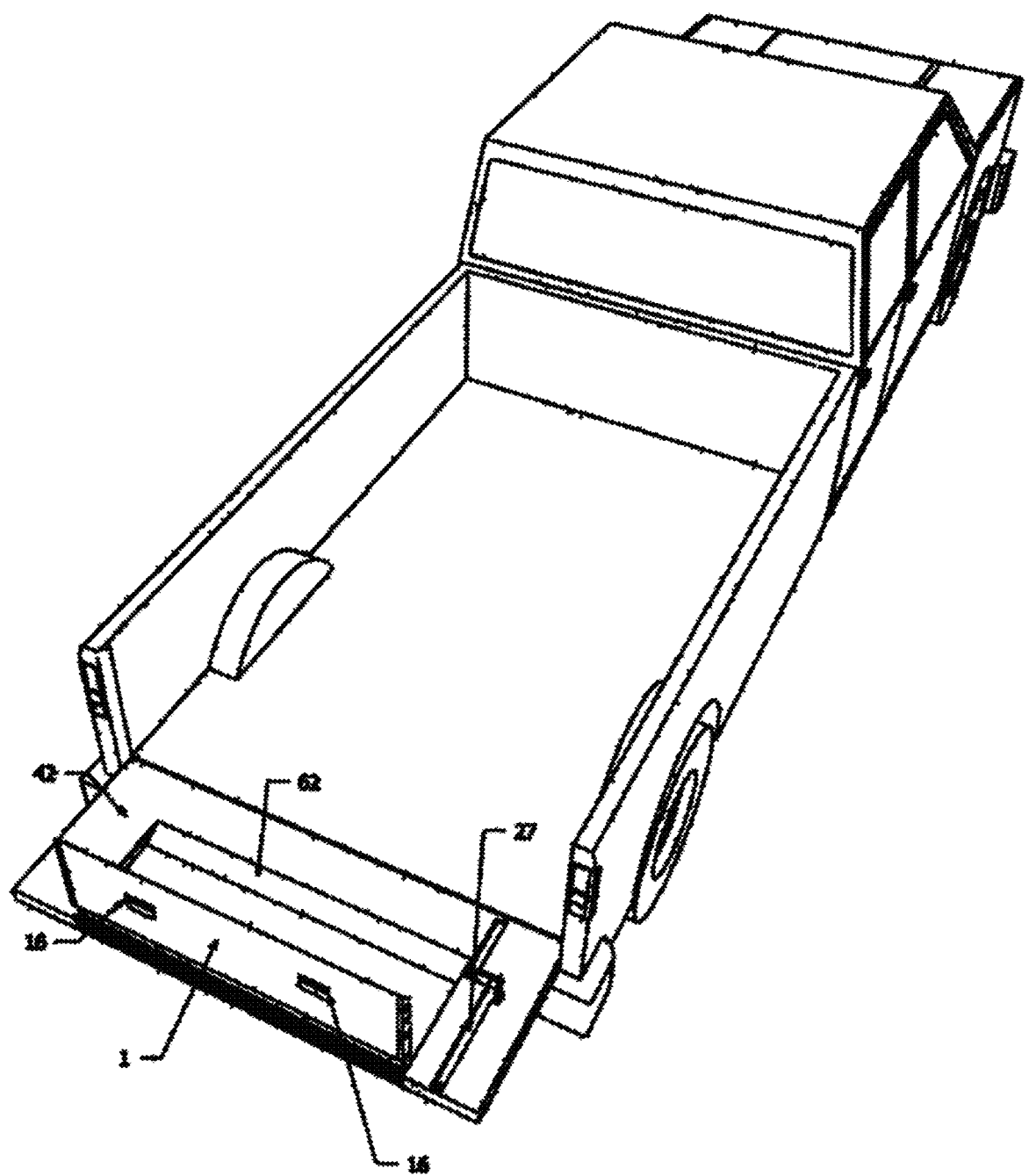
FIG. 5B is a rear view of a pickup, with an opened Tailgate that has a closed Tailgate Ladder and a lowered Three Point Rail that are housed, in the recess of the Tailgate.

FIG. 5B is a rear view of a pickup, with an opened Tailgate that has a closed Tailgate Ladder and a lowered Three Point Rail that are housed, in the recess of the Tailgate. This illustration is identical to the drawing in FIG. 5A. The Tailgate Ladder is fully closed and is flushed with the Tailgate. Two Tailgate Handles are used to release and pull the Tailgate Ladder up and over to an opening position. The Three Point Rail is lowered and sits just below the surface of the Tailgate.

Figure 5C:
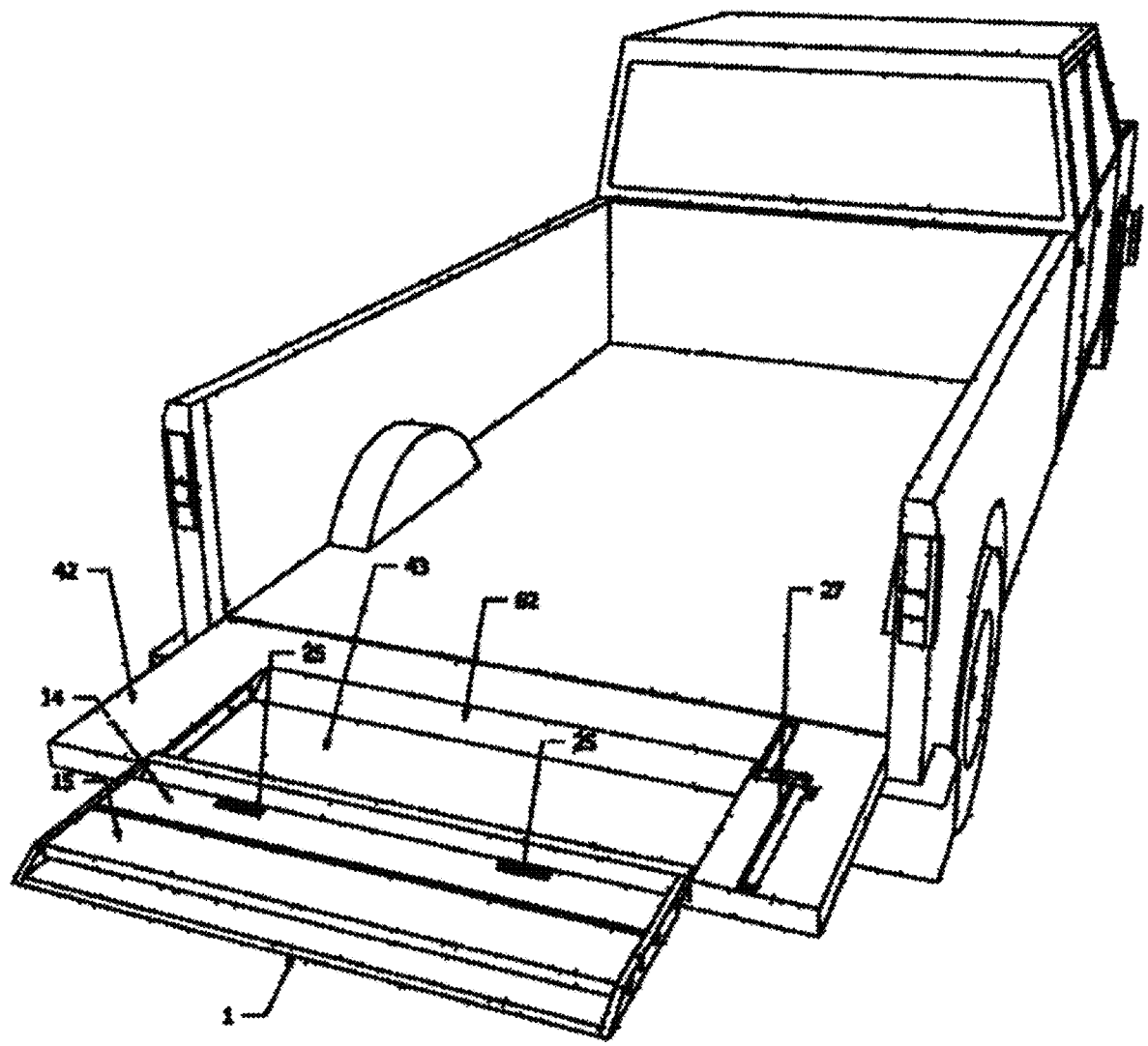
FIG. 5C shows an opened Tailgate, with a partially opened Tailgate Ladder that is perpendicular to the bed of the pickup and a closed Three Point Rail.

FIG. 5C shows an opened Tailgate, with a partially opened Tailgate Ladder that is perpendicular to the bed of the pickup and a closed Three Point Rail. The Tailgate Ladder has been pulled up from the Ladder Casing to an upright position. It has lifted about ninety degrees which is a third of the total opening. The Gate Handles on the Tailgate Ladder and the Gentle Slope of the Ladder Casing are visible from this view. The closed Three Point Rail is also visible from this view.

Figure 5D:
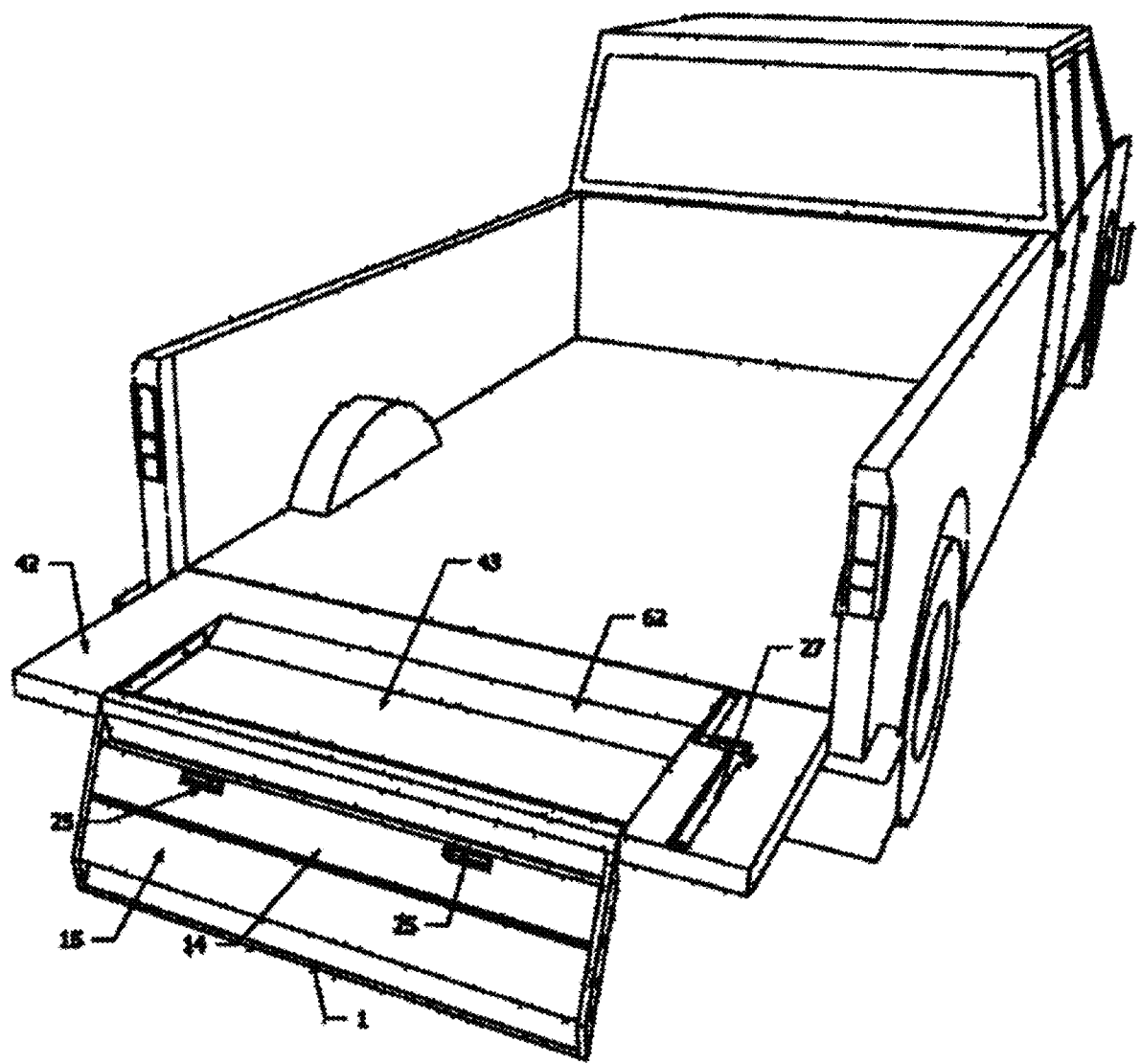
FIG. 5D shows an opened Tailgate, with a flipped over Tailgate Ladder that is aligned with the bed of the pickup, with Steps that are closed and a Three Point Rail that is still closed.

FIG. 5D shows an opened Tailgate, with a flipped over Tailgate Ladder that is aligned with the bed of the pickup, with Steps that are closed and a Three Point Rail that is still closed. The Tailgate Ladder has now been opened to about 180 degrees which is about two thirds of its opening. At this point the Tailgate Ladder has been flipped over and the underside, which faces the Ladder Casing, when the Tailgate Ladder is closed, is now facing up, which exposed the Top Step and Bottom Step. The Step Handles are located on the upper part of the Top Step and when the Tailgate Ladder is fully open. they are used to open the Steps. The Three Point Rail still remains in a closed position.

Figure 5E:
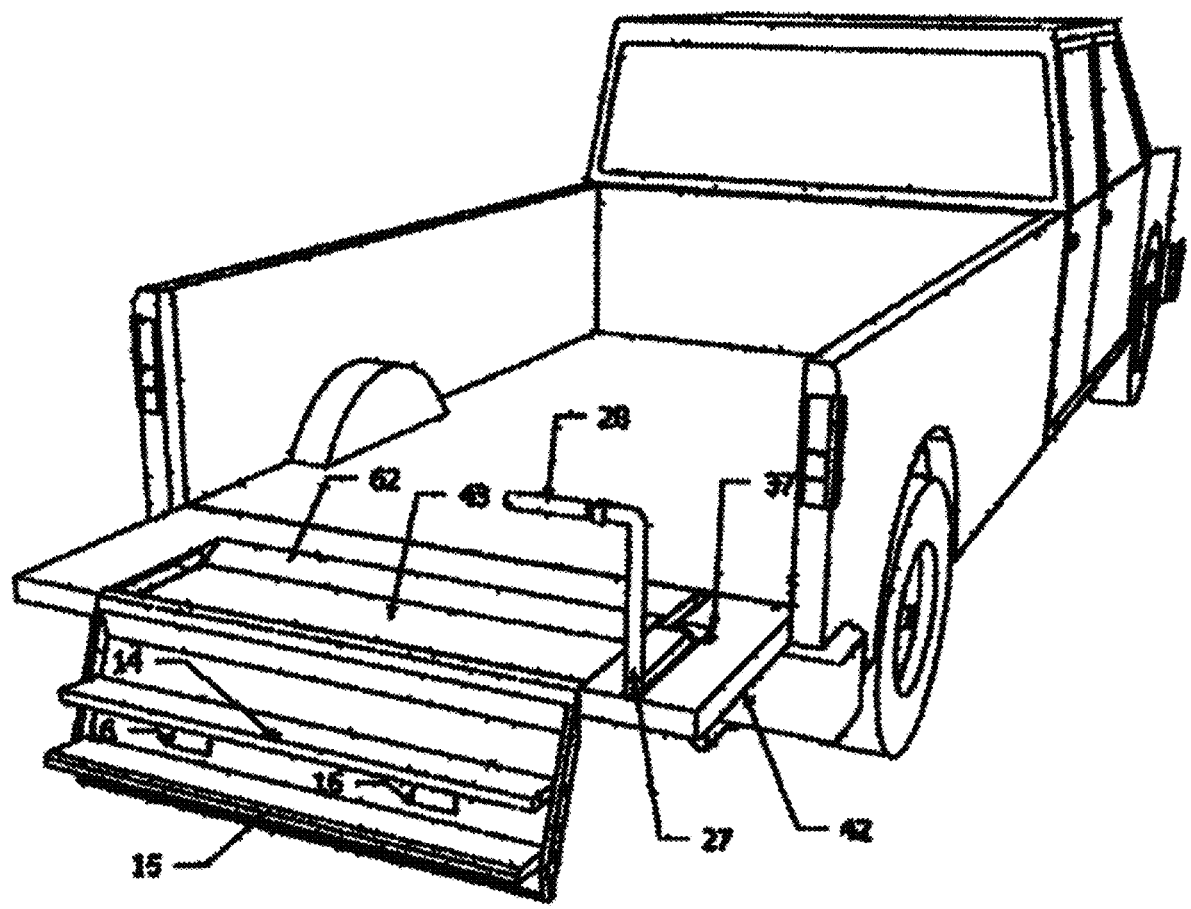
FIG. 5E is a rear view of a pickup showing an opened Tailgate with a Tailgate Ladder that has been fully rotated with closed Steps while Three Point Rail is still in a closed position.

FIG. 5E is a rear view of a pickup showing an opened Tailgate with a Tailgate Ladder that has been fully rotated with closed Steps while Three Point Rail is still in a closed position. At this point the Tailgate Ladder has reached its maximum rotation on its axles and has comes to a rest against the top edge of the Tailgate. The Steps of the Tailgate Ladder are still closed, and pulling on both Step Handles release the hidden Step Lock Slot from The Step Lock Insert, to lower the Steps. The Steps will be lowered to give access to the back of the pickup truck. The Bottom Step does not have a handle, but both Steps are tied together by a Belts that is located in Right and Left Arms, which synchronized their movement.

Figure 5F:
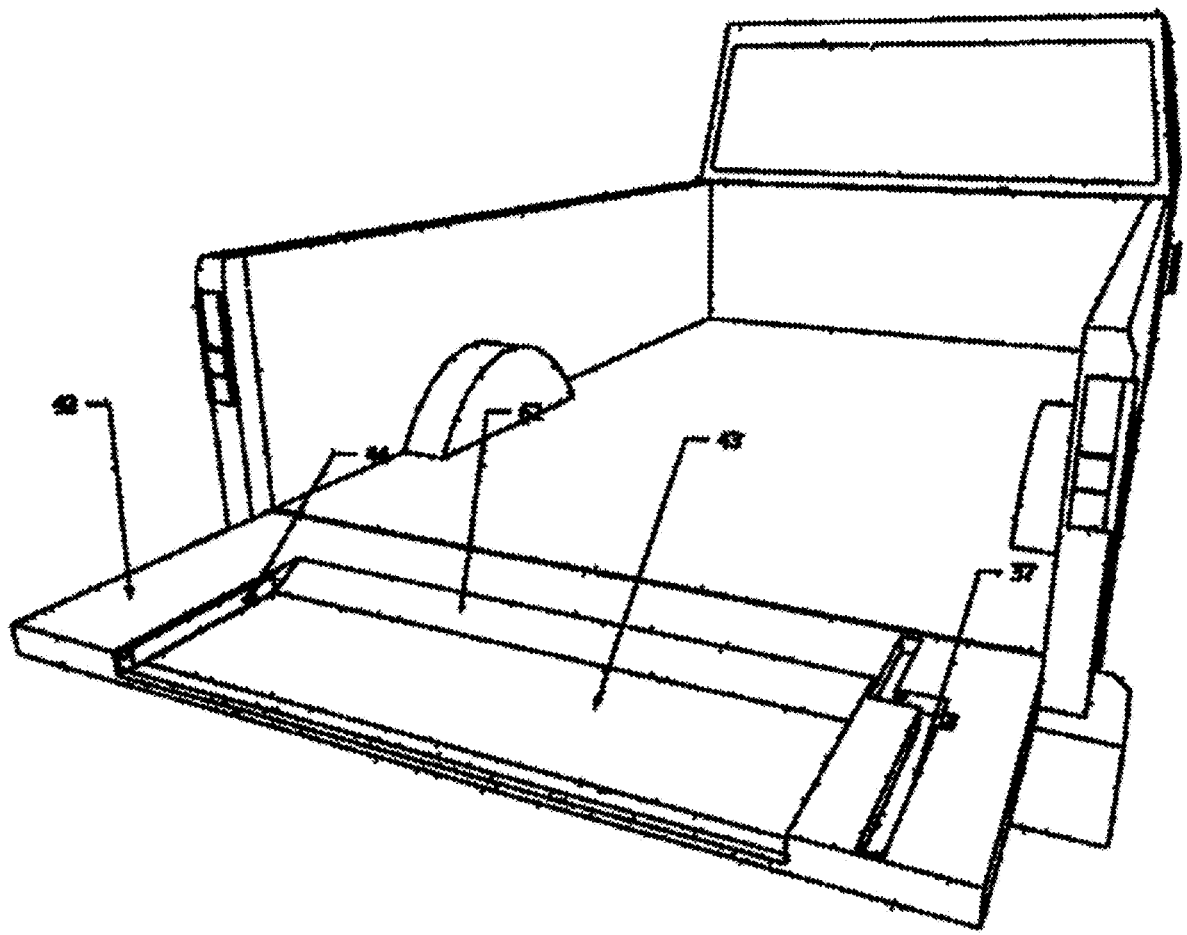
FIG. 5F shows an opened Tailgate with a fully opened Tailgate Ladder, with opened Steps and an upright Three Point Rail with a horizontal Handle.

FIG. 5F shows an opened Tailgate with a fully opened Tailgate Ladder, with opened Steps and an upright Three Point Rail with a horizontal Handle. The Steps are now lowered and they are ready to be accessed by the climber. Between the Steps is a partial view of the rectangular backside of both Step Handles. The pointed tip of the Tailgate Ladder has been moved from the Gentle Slope of the Ladder Casing and flipped over and is now closest to the surface. Three Point Rail has been lifted from the Rail Casing and displays a horizontal Rail Handle.

Figure 5G:
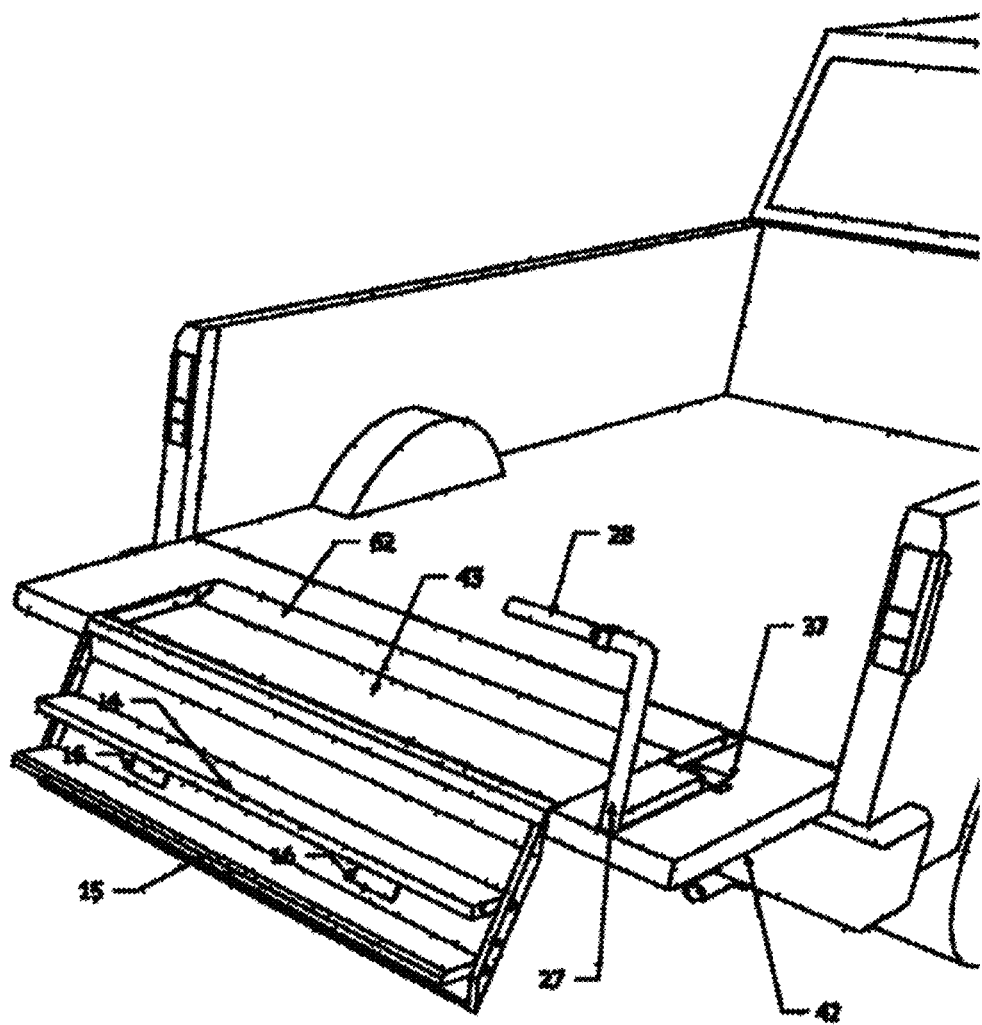
FIG. 5G is a close-up rear view of the said picture in Fig. A-1z. The Tailgate Ladder is fully opened with deployed Steps and an erected Three Point Rail gives the climber a sturdy support.

FIG. 5G is a close-up rear view of the said picture in FIG. 5E. The Tailgate Ladder is fully opened with deployed Steps and an erected Three Point Rail that gives the climber a sturdy support. The recess of the Tailgate has been revealed with the Tailgate Ladder flipped over, which exposed the hidden Ladder Casing. The Gentle Slope of the Ladder Casing provides a smooth transition to the bed of the pickup. The Tailgate Ladder has two Steps which gives climbers easy access with only smaller steps that are required to reach the bed of the pickup.

Figure 6A:
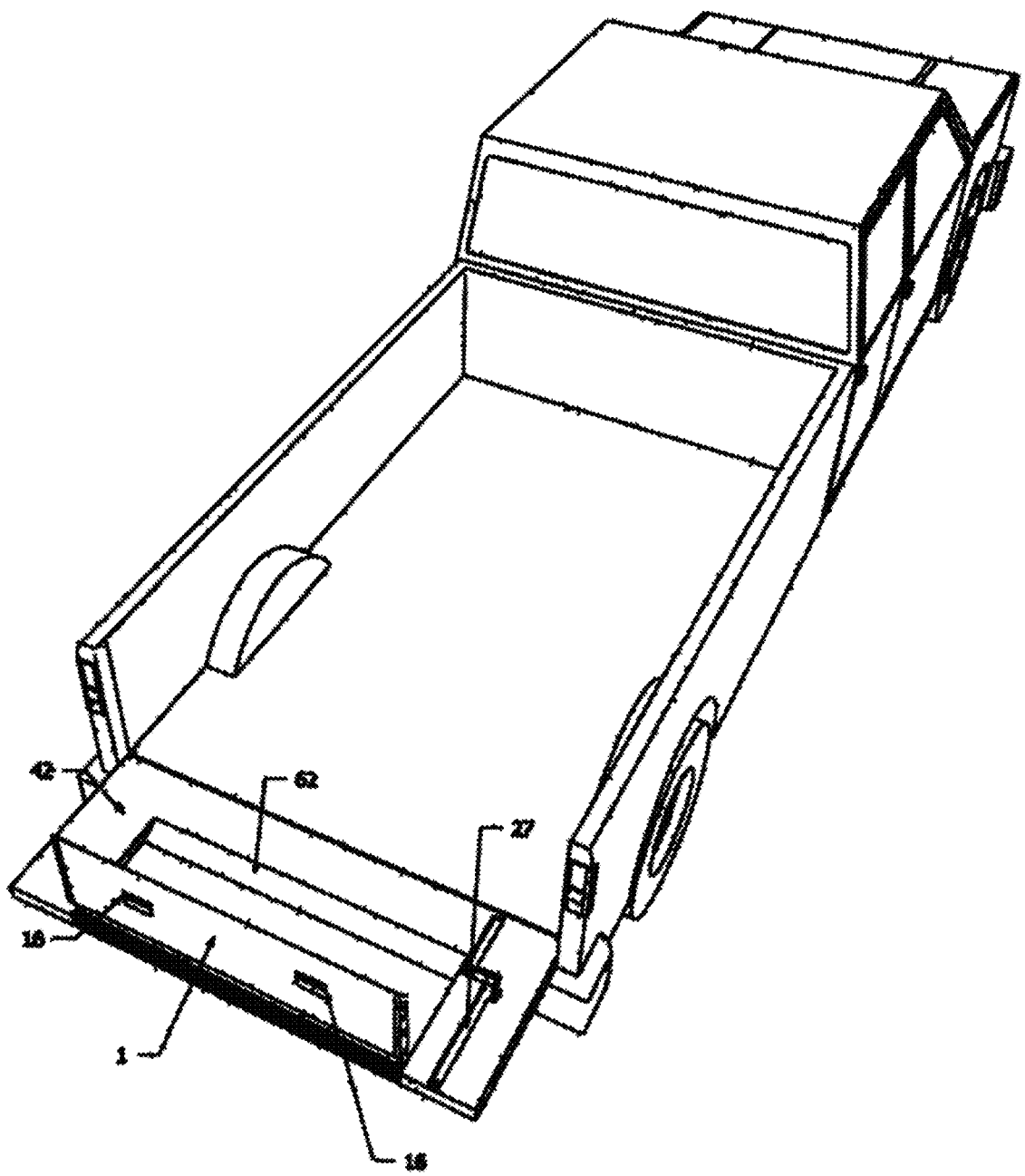
FIG. 6A shows a rear view of a SUV with a notched-out section of the bumper that gives an opened Tailgate Ladder enough clearance.

FIG. 6A shows a rear view of a SUV with a notched-out section of the bumper that gives an opened Tailgate Ladder enough clearance. The Notched Out Bumper allows the Tailgate Ladder to sit lower against it when opened, and therefore reaches closer to the ground. This also allow the Tailgate Ladder to be at a perfect angle when opened, which gives the climber an easy access to a sturdy climbing system.

Figure 6B:
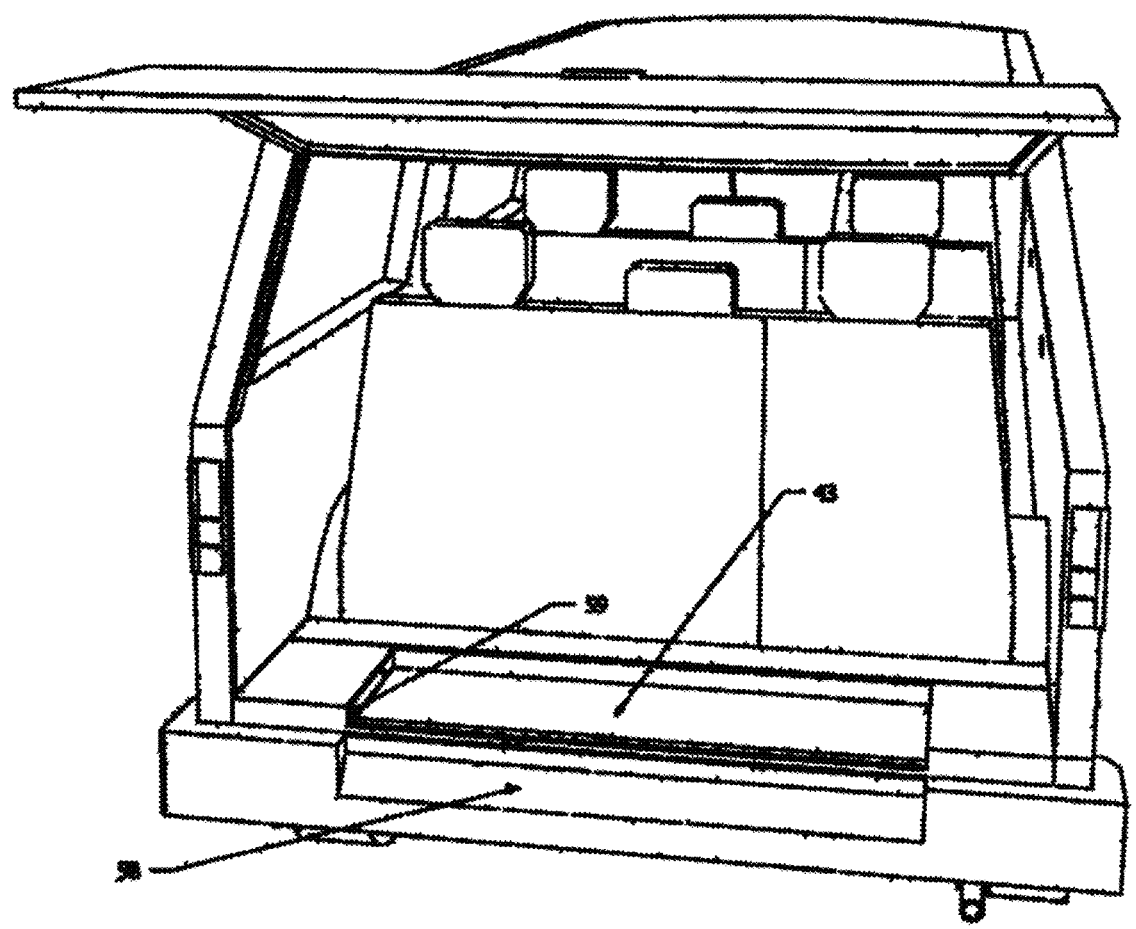
FIG. 6B is a rear view of a SUV with an opened backdoor that reveals a recessed Ladder Casing which is reserved for the Tailgate Ladder.

FIG. 6B is a rear view of a SUV with an opened backdoor that reveals a dugout, recessed area that is the Ladder Casing which housed the Tailgate Ladder. The small dot on the left front of the Ladder Casing is an Axle Hole which is one of the two attachment joints for the Tailgate Ladder. The other Axle Hole on the right is hidden but is a mirror image of the Axle Hole on the left. The Notched-Out Bumper is aligned with the Ladder Casing, and it allows the Tailgate Ladder to fit between its opening and sits lower against the bumper when opened. The Tailgate Ramp will be installed in the recessed, tight fitting Ladder Casing and its upside will be flush with the surrounding areas.

Figure 6C:
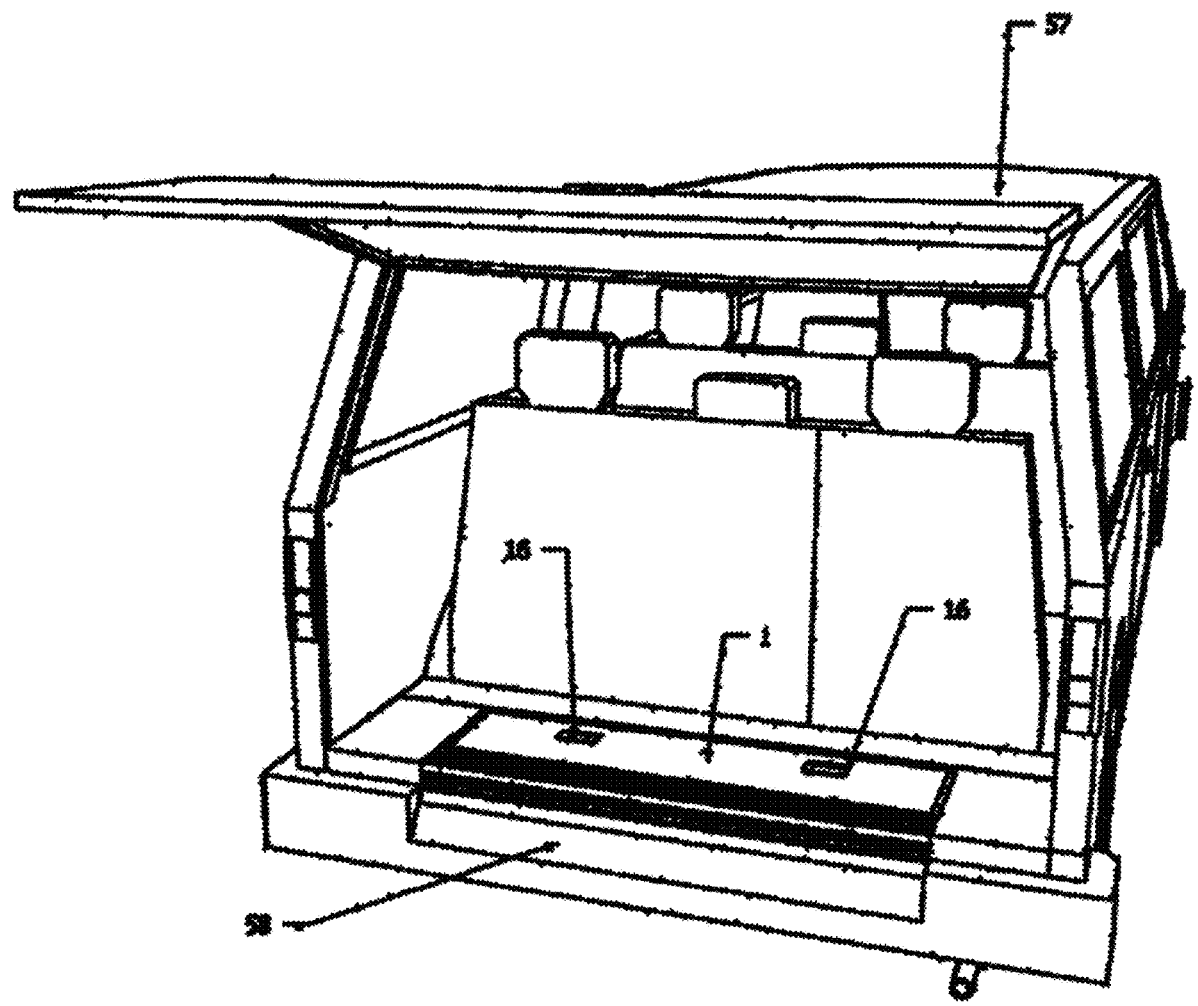
FIG. 6C shows a rear view of a SUV with an opened backdoor, and a Tailgate Ladder embedded in the recess of the Ladder Casing.

FIG. 6C is a rear view of a SUV, with an opened backdoor which reveals a Tailgate Ladder that has been embedded and installed in the recess of the Ladder Casing. Two rectangular shaped handles on the topside of the Tailgate Ladder, is used to pull it up and over to open. The Notched-Out Bumper is beveled at the required angle that allows the Tailgate Ladder, to sit lower against the bumper when fully opened.

Figure 6D:
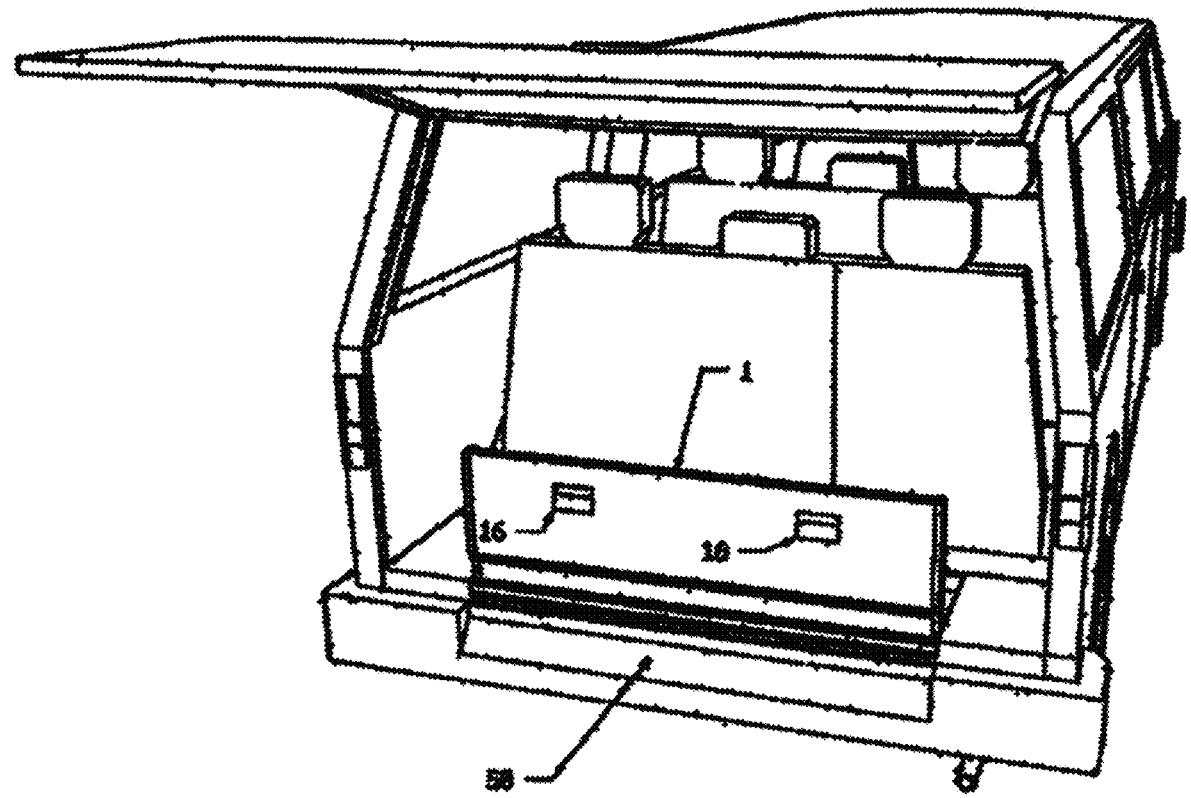
FIG. 6D shows a rear of a SUV with an opened backdoor and a partially opened Tailgate Ladder in an upright position.

FIG. 6D is a rear view of a SUV, with an opened backdoor which reveals a Tailgate Ladder that has been installed in the recess of the Ladder Casing and has been lifted up and rotate 90 degrees from the floor. The two rectangular handles on the face of the Tailgate Ramp are more noticeable while it is erected, and they are used to lift it up and over. The Notched-Out Bumper is beveled at a required angle which allows the Tailgate Ladder, to sit lower against the bumper and extend lower to the ground.

Figure 6E:
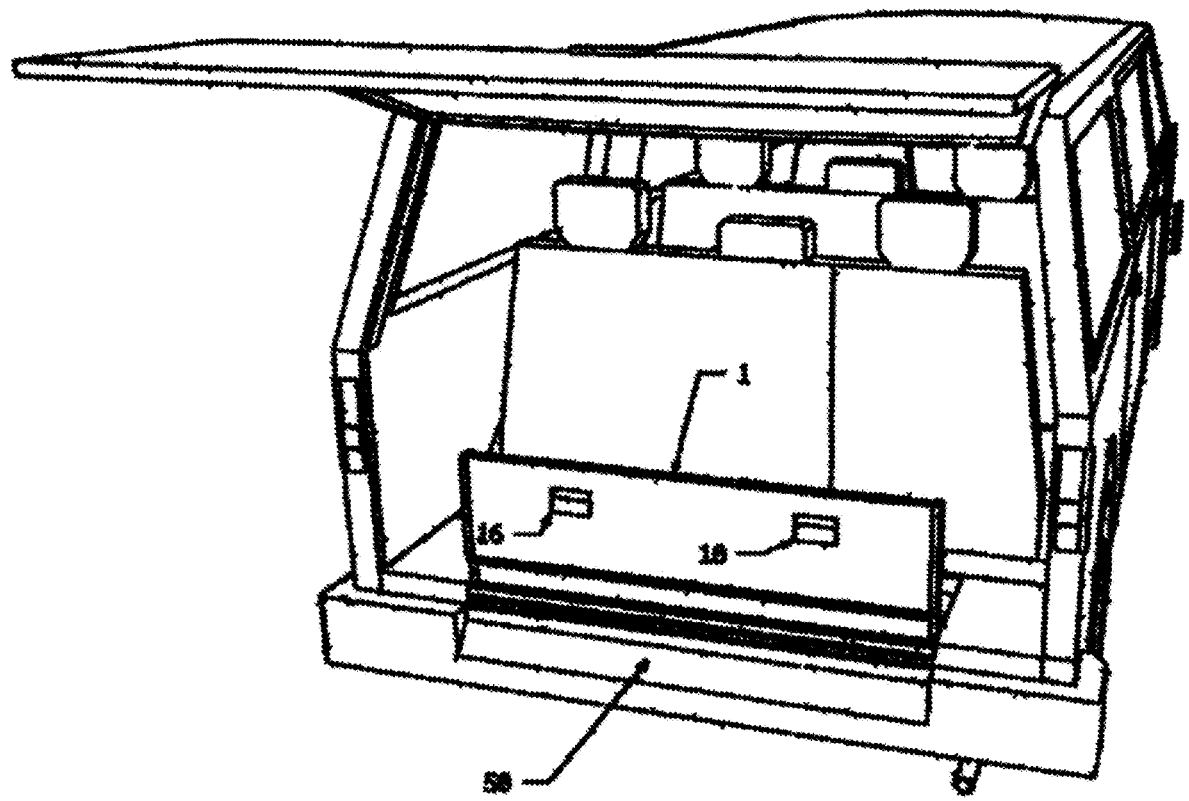
FIG. 6E shows a rear view of a SUV with an opened backdoor and a flipped over Tailgate Ladder that is parallel with the surface which reveal the closed Steps.

FIG. 6E is a rear view of a SUV, with an opened backdoor which reveals a Tailgate Ladder that has been installed in the recess Oe the Ladder Casing and has been lifted up and flipped over and is now parallel with the surface. It has rotated 180 degrees and the hidden underside is now facing up, which reveal the Steps, and two rectangular Step Handles which are located on the Top Step. Now that the Tailgate Ladder has been flipped over, the dugout, recess of the Ladder Casing is now visible again. A small dot on the rear of the left sidewall, (Left Support Bar) is the Tailgate Lock Insert which locks a closed Tailgate Ladder in place. The hidden right sidewall is a mirror image of the left-side and also shares a Tailgate Lock Insert. To the right of the Tailgate Ladder is a partial view of the Notched-Out Bumper.

Figure 6F:
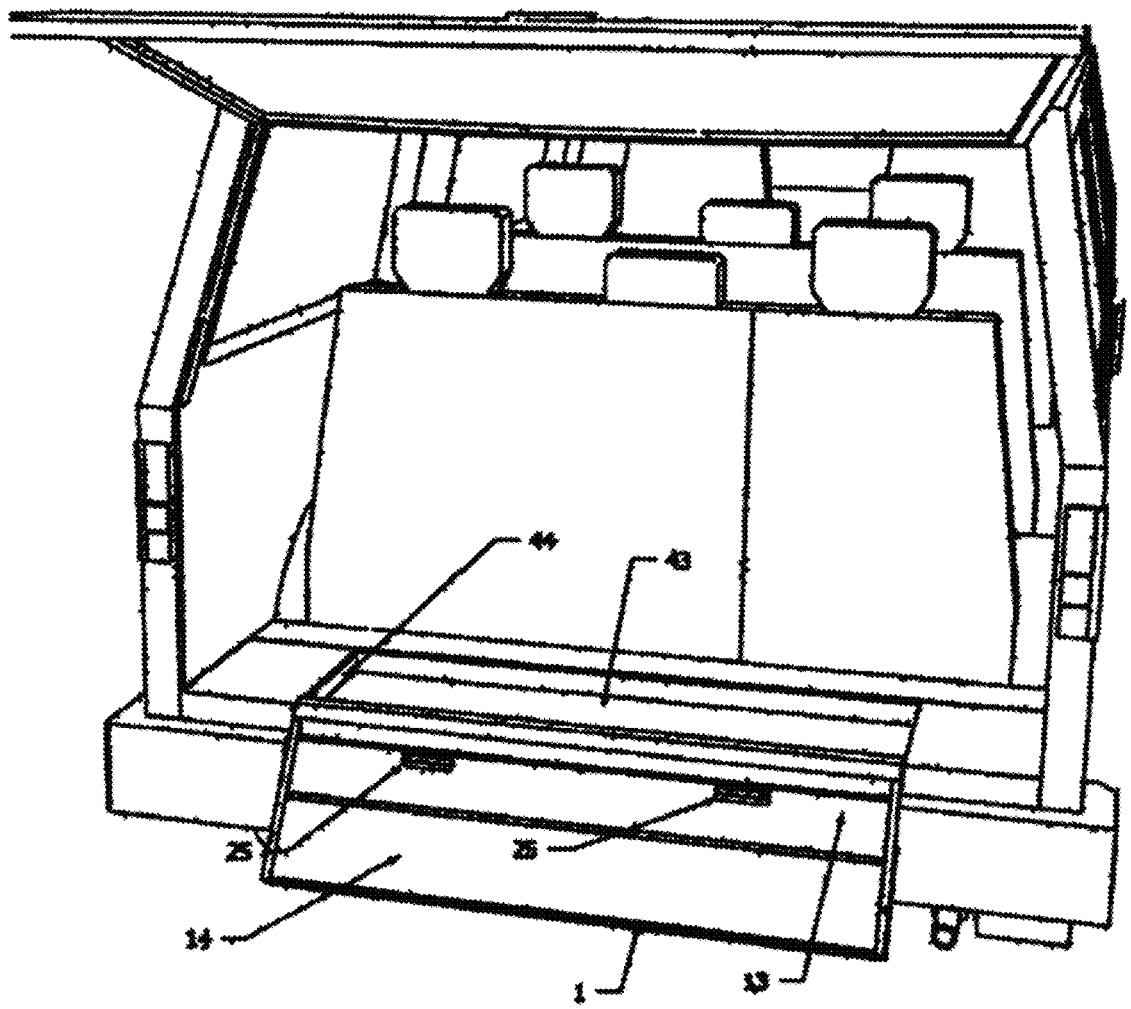
FIG. 6F shows a rear view of a SUV with an opened backdoor and an opened Tailgate Ladder with closed Steps. The operator is now able to pull the Step Handles which will lower the Steps.

FIG. 6F shows the rear view of a SUV with an opened backdoor and an opened Tailgate Ladder with closed Steps. The operator is now able to pull the Step Handles which will lower the Steps. The Tailgate Ladder has rotated to its maximum, at about 235 degrees and is now resting on the Notched-Out Bumper. Even though the Tailgate Ladder has rotated to its maximum, and is close to the ground, it is still not accessible until the Steps are lowered. A small dot in the recessed Ladder Casing, left sidewall, (Left Support Bar) is the Tailgate Lock Insert which locks the closed Tailgate Ladder in place. The hidden right sidewall is a mirror image of the left sidewall and also shares a Tailgate Lock Insert. The Tailgate Ladder is resting deep inside of the Notched-Out Bumper, which provides a perfect opening angle that allows the Steps, when opened, to be parallel with the surface.

Figure 6G:
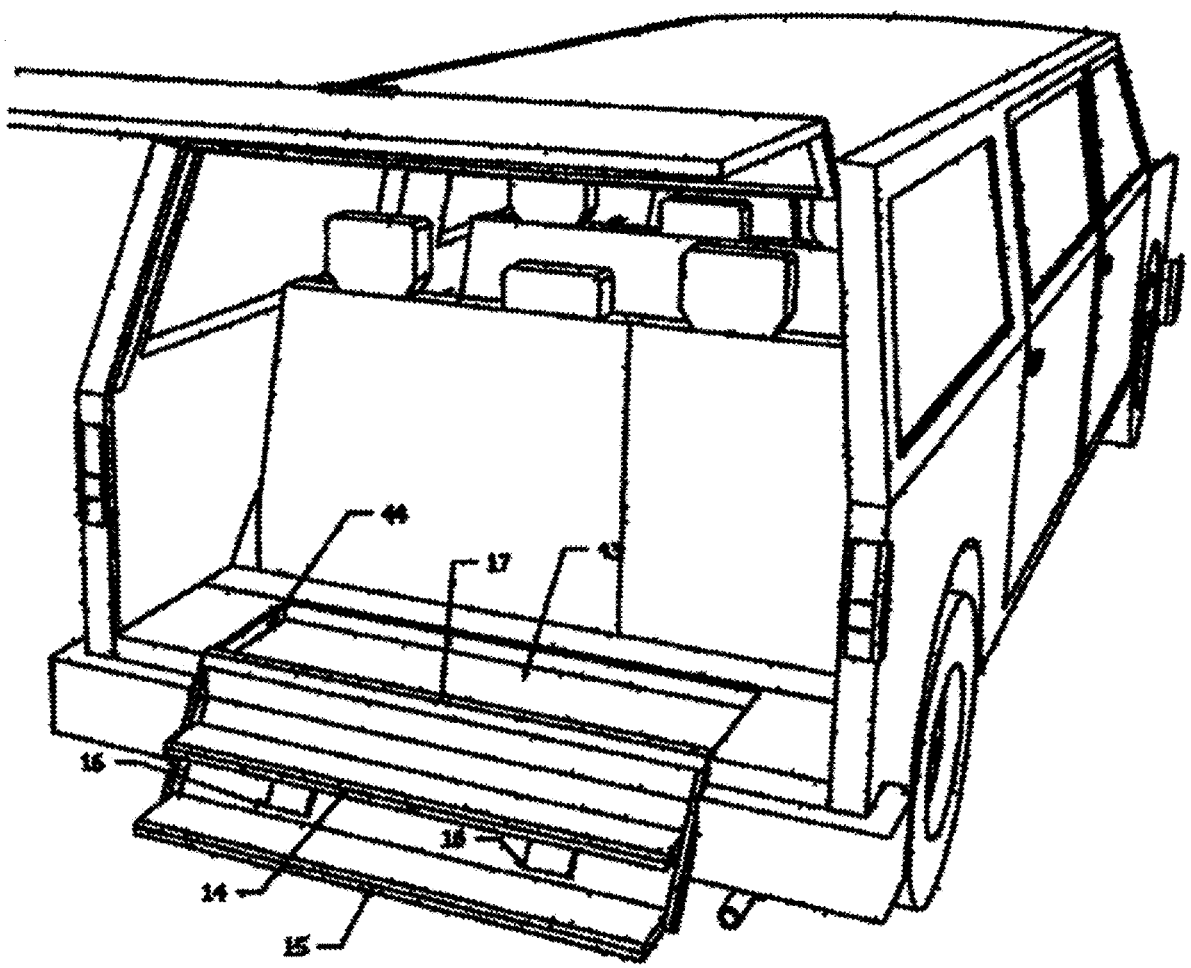
FIG. 6G shows a rear view of a SUV with an opened backdoor and a fully open Tailgate Ladder with deployed Steps.

FIG. 6G shows a rear view of a SUV with an opened backdoor and a fully open Tailgate Ladder with deployed Steps. The Tailgate Ladder has rotated 235 degrees from the recess of the Ladder Casing to its maximum and is now resting inside the Notched-Out Bumper, with opened Step. The Tailgate Ladder is now fully opened which makes the rear of the SUV accessible. A small dot in the recessed Ladder Casing, on the left sidewall, (Left Support Bar) is the Tailgate Lock Insert which locks the closed Tailgate Ladder in place. The hidden right sidewall is a mirror image of the left sidewall and also shares a Tailgate Lock Insert. The two stepped Tailgate Ladder provides a climbing system which only requires small steps, and therefore anyone will be able to utilize this service.

Figure 7A:
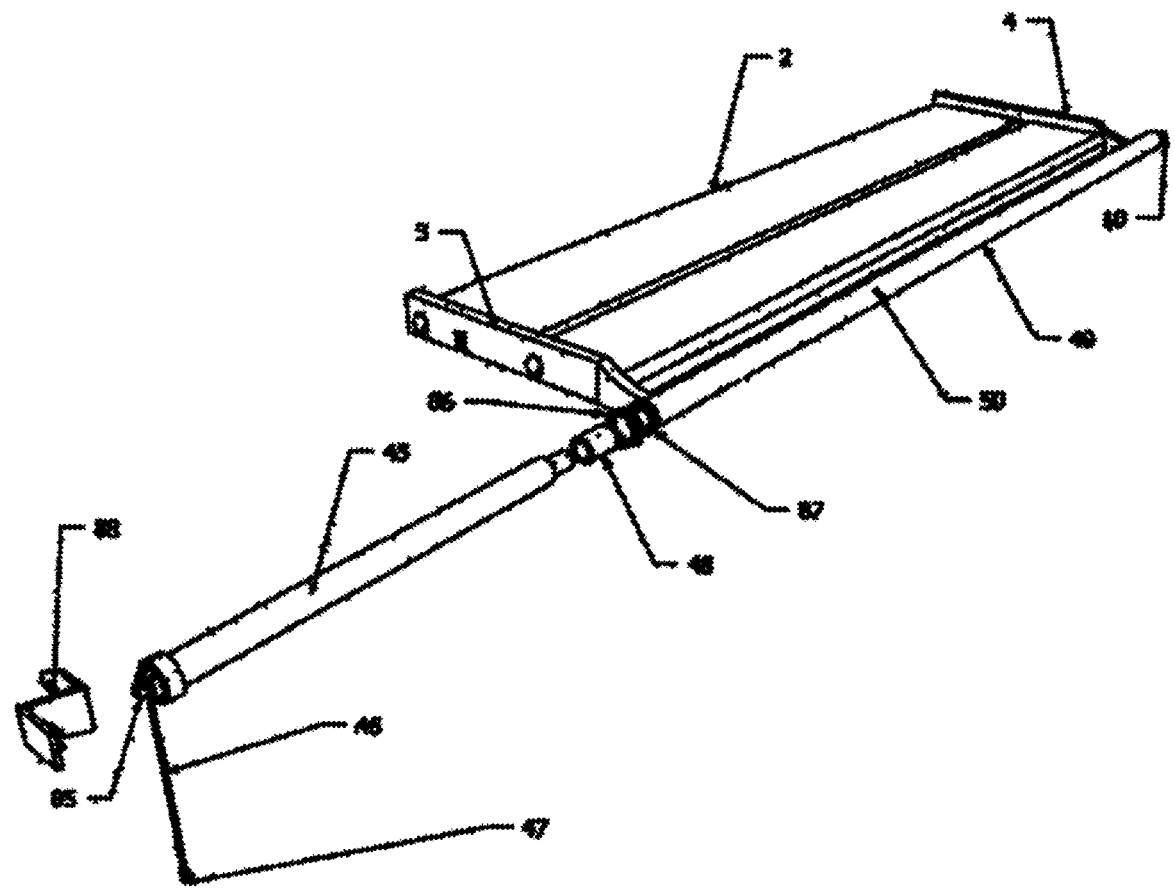
FIG. 7A shows a left, front side view of an Electric Tailgate Ladder and to its left are, an aligned large Washer, large #4 Nut, Motor Sleeve, Motor, and a Motor Bracket on the far left. The Motor electrifies the Tailgate Ladder, and is inserted along with the Motor Sleeve inside the Tube. The Washer, #4 Nut and Motor Bracket secure the Motor to the Tube and the Left Ann of the Ladder.

FIG. 7A shows a left, front side view of an Electric Tailgate Ladder and to its left are, an aligned large Washer, large #4 Nut, Motor Sleeve, Motor, and a Motor Bracket on the far left. The Motor electrifies the Tailgate Ladder and is inserted along with the Motor Sleeve inside the Tube. The Washer, #4 Nut and Motor Bracket secure the Motor to the Tube and the Left Arm of the Ladder. The Electric Tailgate Ladder is aligned with the floating parts to its left while the Left and Right Arms are the outer edges that sandwiched the Steps. The Tube span the font side. and a Screw in the middle of it, secures the Motor to the inner tube. The Motor when inserted inside of the Tube becomes the Main Gate Axle on the left and at the far right of the Tube, is a partial view of the right-side, Main Gate Axle.

Figure 7B:
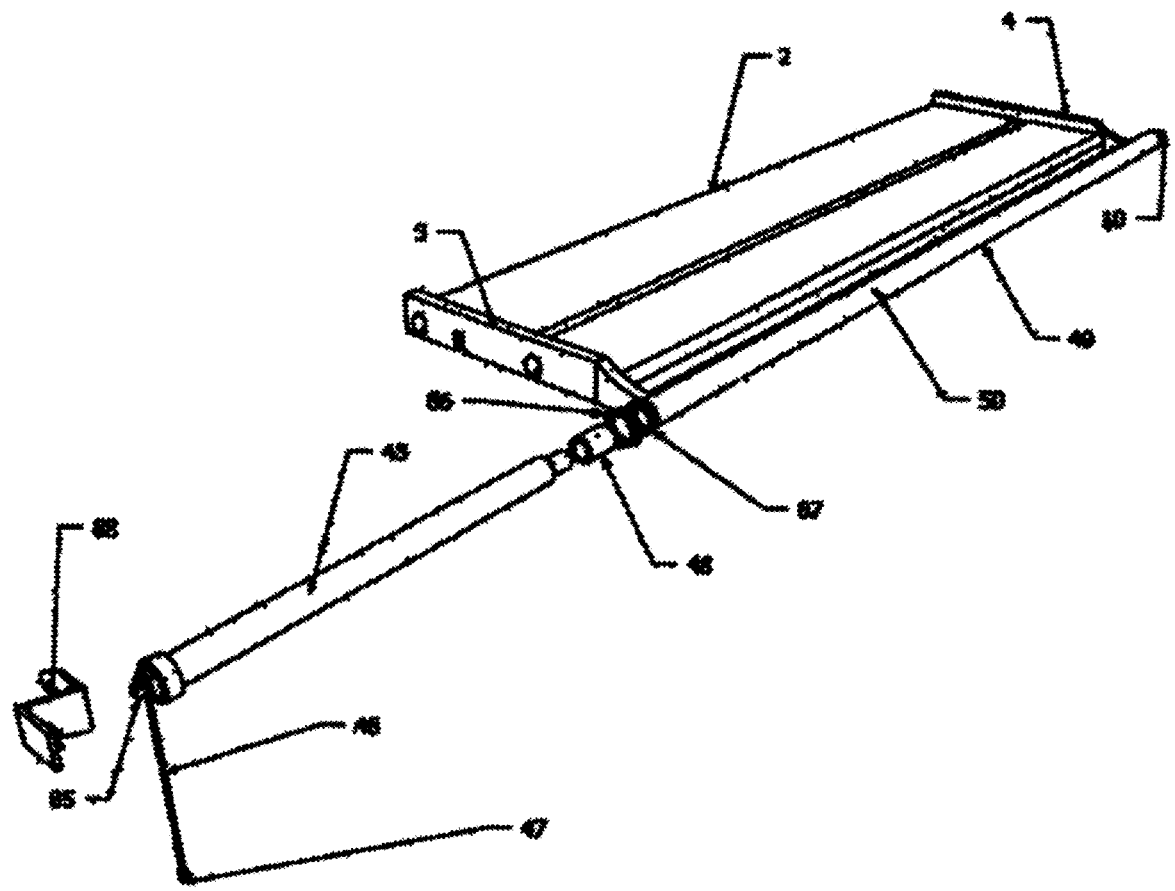
FIG. 7B is a close up view of the Motor with an aligned Motor Bracket on the left, and a Motor Sleeve, #4 Nut and Washer are on the right. This Motor is similar to a window shade motor, that has the capability of lifting over 300 pounds, and with its lifting capacity and cylindrical shape, makes it an ideal choice.

FIG. 7B is a closeup view of the Motor with an aligned Motor Bracket on the left, and a Motor Sleeve, #4 Nut and Washer are on the right. This Motor is similar to a window shade motor, that has the capability of lifting over 300 pounds, and with its lifting capacity and cylindrical shape, makes it an ideal choice. On the left is the Z shaped Motor Bracket that secures the Motorhead, and in the center is a cylindrical Motor that is flanked on the right by a Motor Sleeve, #4 Nut and Washer. The Motorhead has a cube shaped Motorhead Connector which is the piece that connects to the Motor Bracket. Above and to the right of the Motorhead Connecter, are Control Switches which provides a preset that allows the precise setting of the opening and closing. Below the Motorhead Connector is a hanging Power Cord with a Connector at the tip. Right of the Motorhead is the cylindrical body of the Motor. The Motor Sleeve which covers the narrow tip of the Motor, has a Screw Hole on the outside. By inserting a Screw through the hole in the center of the Tube it penetrates to the said hole of the Motor Sleeve which secure and lock both the Motor and the Tube together.

Figure 7C:
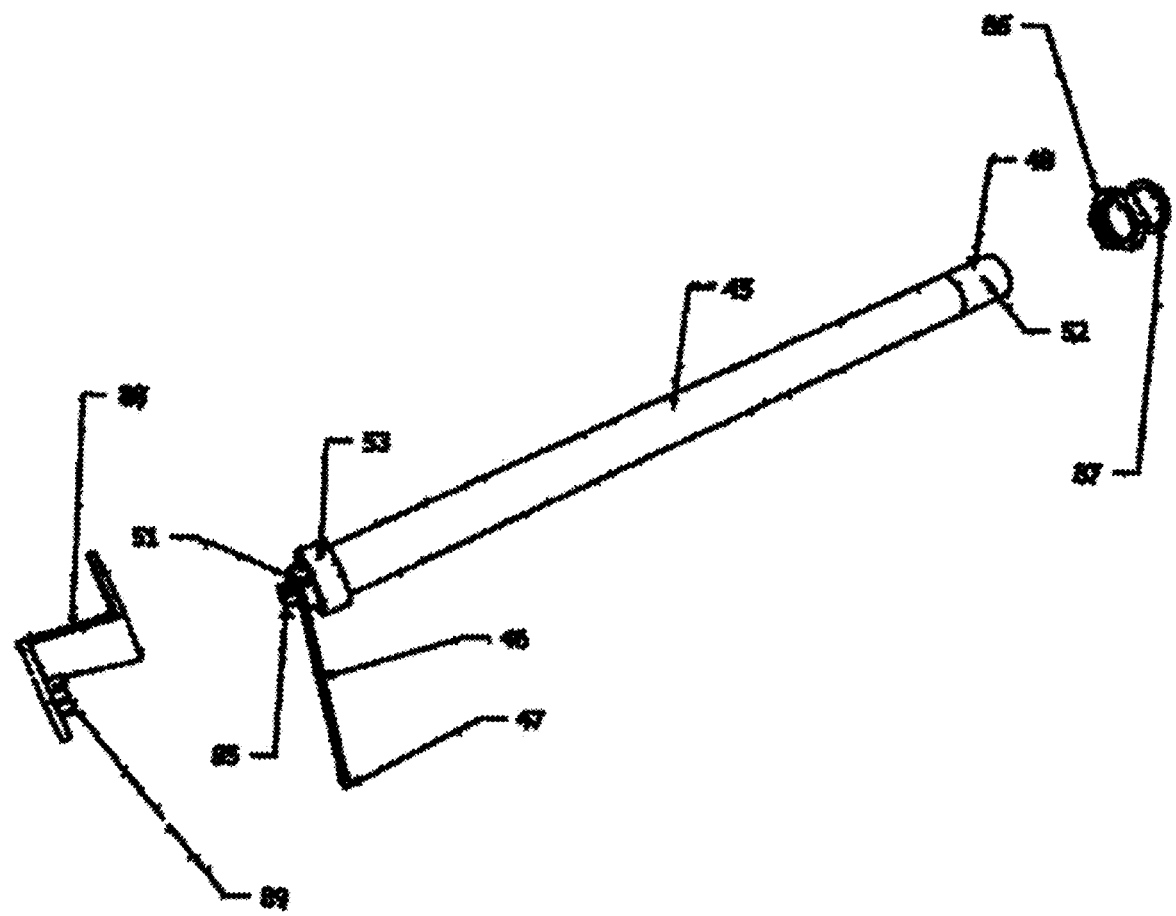
FIG. 7C is a close up of the Motor with an attached Motor Sleeve, an aligned Motor Bracket on the left and a #4 Nut and Washer on the right. The Motor has two Control Switch buttons, located on the Motor Head, one that preset the opening limit and the other the closing limit.

FIG. 7C is a closeup of the Motor with an attached Motor Sleeve, an aligned Motor Bracket on the left and a #4 Nut and Washer on the right. The Motor has two Control Switch buttons, located on the Motor Head, one that preset the opening limit and the other the closing limit. On the left is the Motor Bracket with a noticeable Connector Slot on the inside front. The Motorhead Connector fits into the Connector Slot and is secured by a pin. The Motor, on the right is cylindrical and has a large head. The Motorhead has a protruding Motorhead Connector which is the connecting piece that connects to the Motor Bracket. To the right of the Motorhead Connecter and above, is the Control Switch which provides a preset that allows the precise setting of the opening and closing, according to the requirements. Below the Motorhead Connector is the hanging Power Cord with a Connector at the tip. Right of the Motorhead is the cylindrical body of the Motor and attached to it at the right tip is the Motor Sleeve. The Motor Sleeve has a Screw Hole on top. A #4 Nut and a Washer are to the right of the Motor.

Figure 8A:
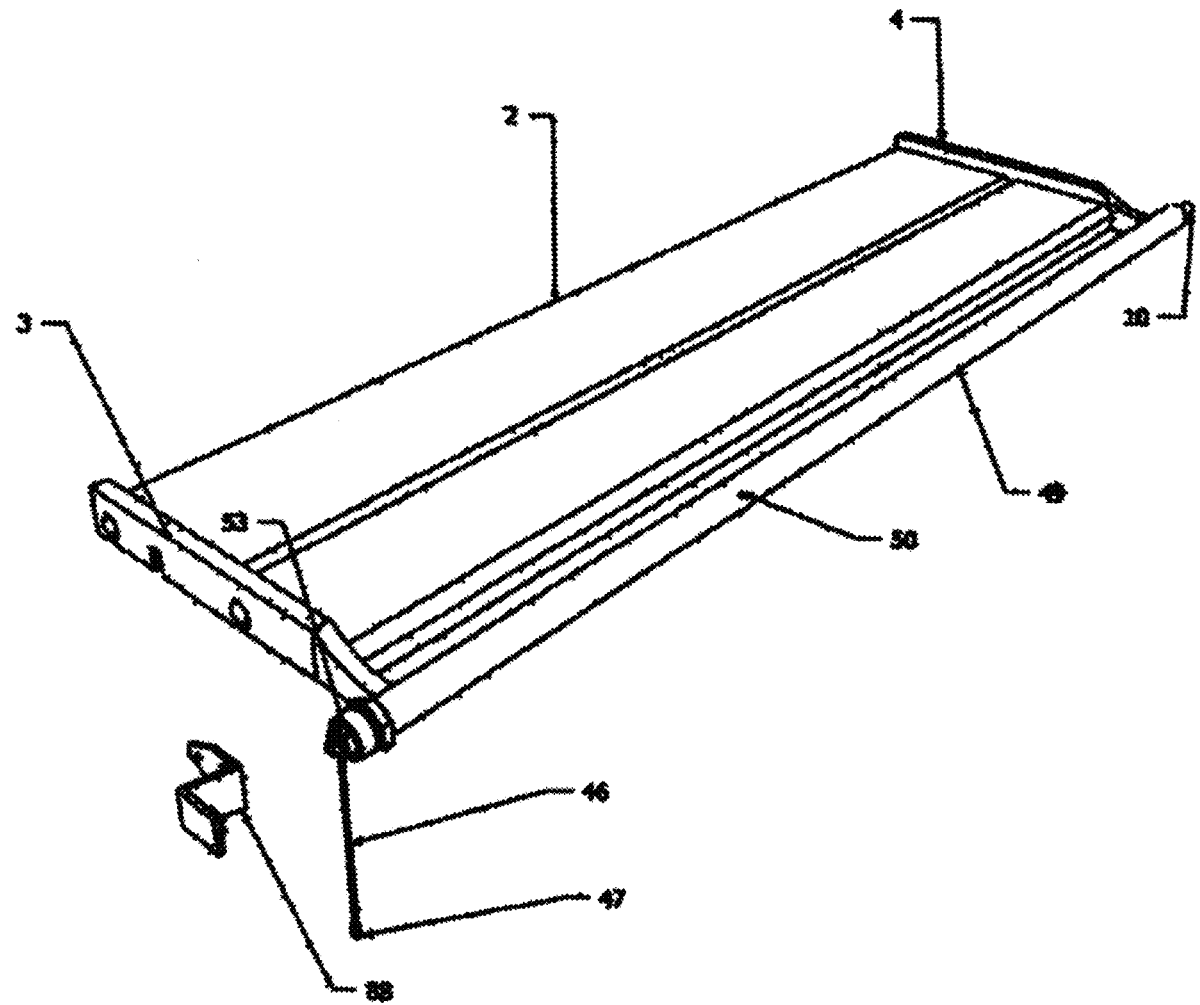
FIG. 8A is a front view of the top side of an Electric Tailgate Ladder with a missing top cover and a Motor fully inserted inside its Tube. Motorhead aligned with Motor Bracket on the left, which secures it and keeps it stationery.

FIG. 8A is a front view of the top side of an Electric Tailgate Ladder, with a missing top cover and a Motor fully inserted inside its Tube. The Motorhead is aligned with Motor Bracket on the left, which secures it and keeps it stationery. The topside of the Electric Tailgate Ladder has been peeled back and therefore its interior section is in view. The Motorhead has a hanging Power Cord with an attached connector, which is connected to the power source to electrifies the Electric Tailgate Ladder. The Tube span the front of the Electric Tailgate Ladder and a Screw in the front secures the hidden Motor Sleeve of the Motor to the innertube. At the far-right end of the Tube is the right-side Main Gate Axle. On the left side of the Electric Tailgate Ladder is the sturdy Left Arms with a curved neck, and on the right side, is an identical Right Ann that completes the right side.

Figure 8B:
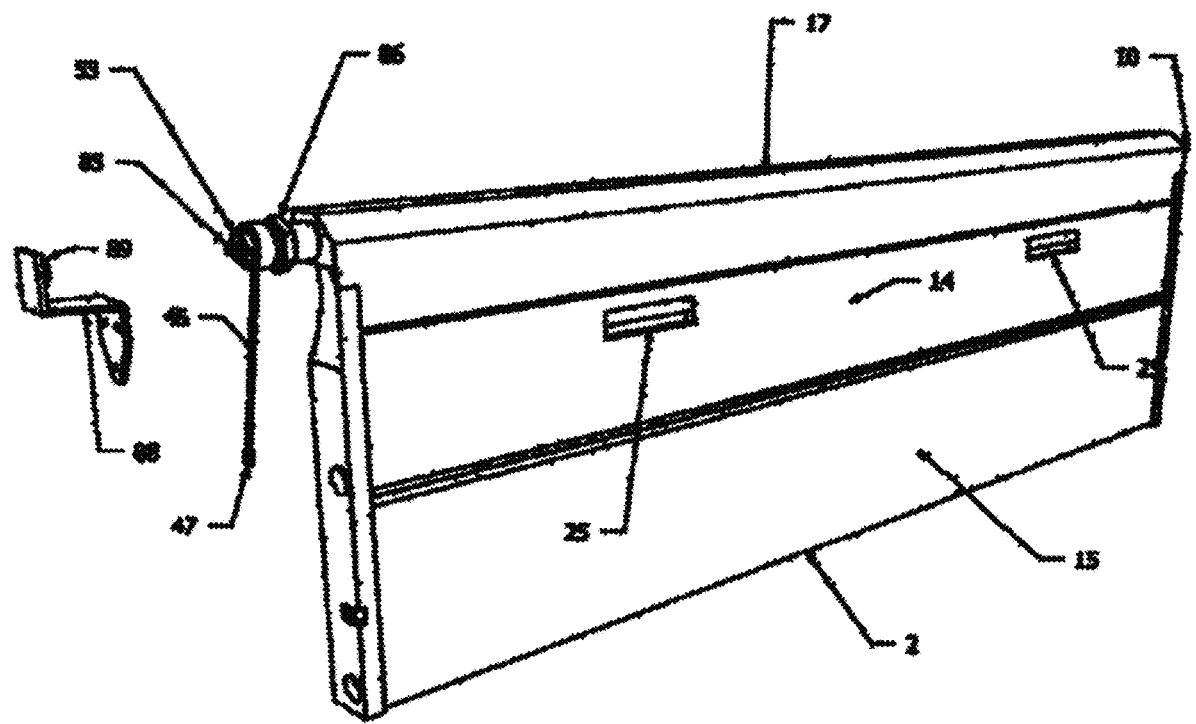
FIG. 8B is a front view of the underside of a flipped over Electric Tailgate Ladder which reveals the closed Steps. An inserted Motor, with its Motorhead at the top left of the diagram is aligned by the Motor Bracket to the left.

FIG. 8B is a front view of the underside of a flipped over Electric Tailgate Ladder which reveals the closed Steps. An inserted Motor, with its Motorhead at the top left of the diagram is aligned by the Motor Bracket to the left. To the left, is a floating and aligned Motor Bracket with a partial view of a Connector Slot on the upper inside. The exposed Motorhead has a cube shaped Motorhead Connector and hanging below, is the Power Core with a Connector tip. Right of the Motorhead is the #4 Nut with a hidden Washer. Between the Nut and the left-side of the Tailgate Ladder is a gap, which is the thickness of the vacant Left Support Bar. The Tube of the Tailgate Ladder which span the front is enclosed by the Neck Casing. To the right is the tip of the right-side Main Gate Axle. Two rectangular Step Handles located in the upper section of the Top Step, allows the operator to pull the Steps down to access them.

Figure 8C:
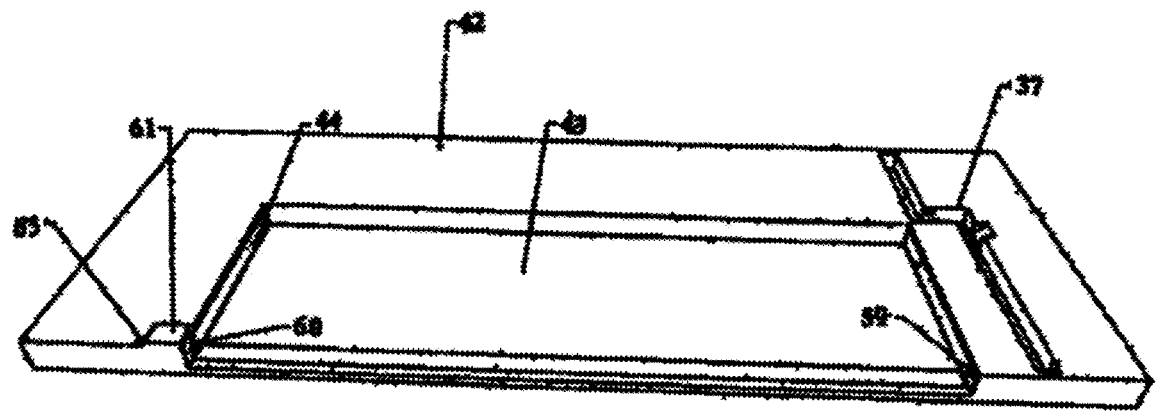
FIG. 8C shows a Tailgate of a pickup truck with two recessed areas. The larger is the Ladder Casing which housed the Electric Tailgate Ladder and the smaller is the Ladder Casing which housed the Three Point Rail. At the front, just left of the Ladder Casing, is a noticeable elevated area. This is known as the Motor Bulge, and it accommodates the large Motorhead which extends above the surface.

FIG. 8C shows a Tailgate of a pickup truck with two recessed areas. The larger is the Ladder Casing which housed the Electric Tailgate Ladder and the smaller is the Ladder Casing which housed the Three Point Rail. At the front, just left of the Ladder Casing, is a noticeable elevated area. This is known as the Motor Bulge, and it accommodates the large Motorhead which extends above the surface. Left of the Motor Bulge is a miniature square box. which is a Switch Cover, and hidden below, is a Switch that operates the Electric Tailgate Ladder. The Ladder Casing consumes most of the Tailgate, and at the front ends is a large Axle Hole for the Motor on the left. and a small Axle Hole on the right. The recessed, bent Rail Casing is right of the Ladder Casing, and it houses the Three Point Trail.

Figure 8D:
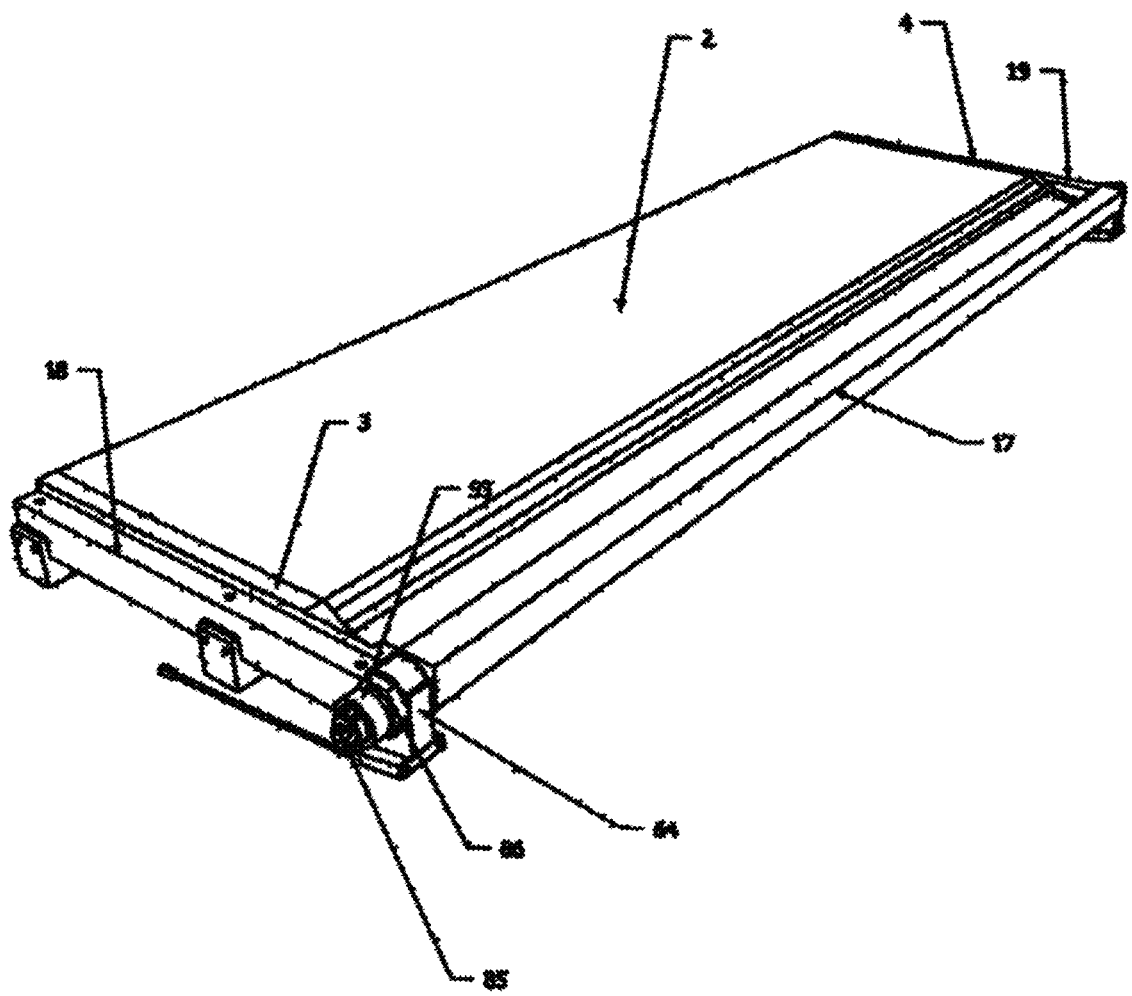
FIG. 8D is a front view of the Tailgate Ladder System, excluding the Three Point Rail, with all its connecting parts. The Electric Tailgate Ladder is fully folded and is embedded in the recess of the Ladder Casing with a Motor Bracket to the left.

FIG. 8D is a front view of the Tailgate Ladder System, excluding the Three Point Rail, with all its connecting parts. The Electric Tailgate Ladder is fully folded and is embedded in the recess of the Ladder Casing. From left the protruding Motorhead Connector is connected to the Motorhead, and right of it is a #4 Nut which secures the Electric Tailgate Ladder to the Left Support Bar Head Extension of the Ladder Casing. The Left Support Bar Head Extension is wider than the Left Support Bar Head and has a larger Axle Hole to accommodate the Motor and the larger Tube. The said Left Support Bar Head Extension is connected to the Left Support Bar rear of it. Sandwiched between the Left and Right Support Bars is the Electric Tailgate Ladder with a Neck Casing which covers the Tube. The Left and right Arms are the outer part of the Ladder and are next to the Support Bars.

Figure 8E:
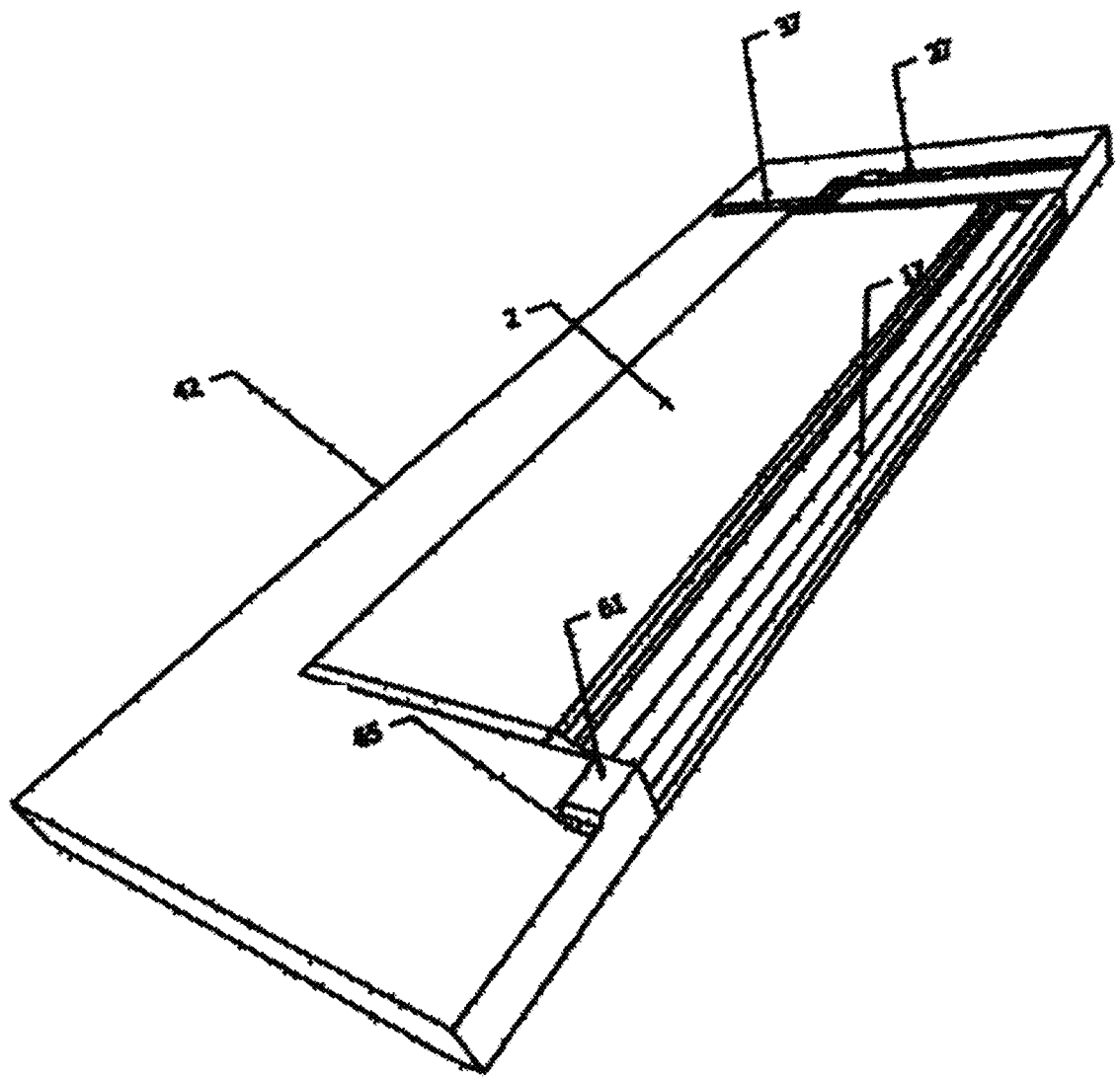
FIG. 8E is a left-side view of a Tailgate with an Electric Tailgate Ladder embedded in the recess of the hidden Ladder Casing, and a Three Point Rail that have been embedded into the recess of the Rail Casing.

FIG. 8E is a left-side view of a Tailgate with an Electric Tailgate Ladder that has been embedded in the recess of the hidden Ladder Casing, and a Three Point Rail that has been embedded into the recess of the Rail Casing. At the front, left of the Electric Tailgate Ladder, is a noticeable Bulge which accommodates the hidden large Motorhead that extend above the surface. To the left of the Bulge, is a rectangular box which is the Switch Cover for the Switch below. The hidden Switch operates and control every position of the Electric Tailgate Ladder. The Neck Casing in the front, has a curved section which allows the Ladder, when it is flipped over, to sit lower on the edge of the Tailgate.

Figure 9:
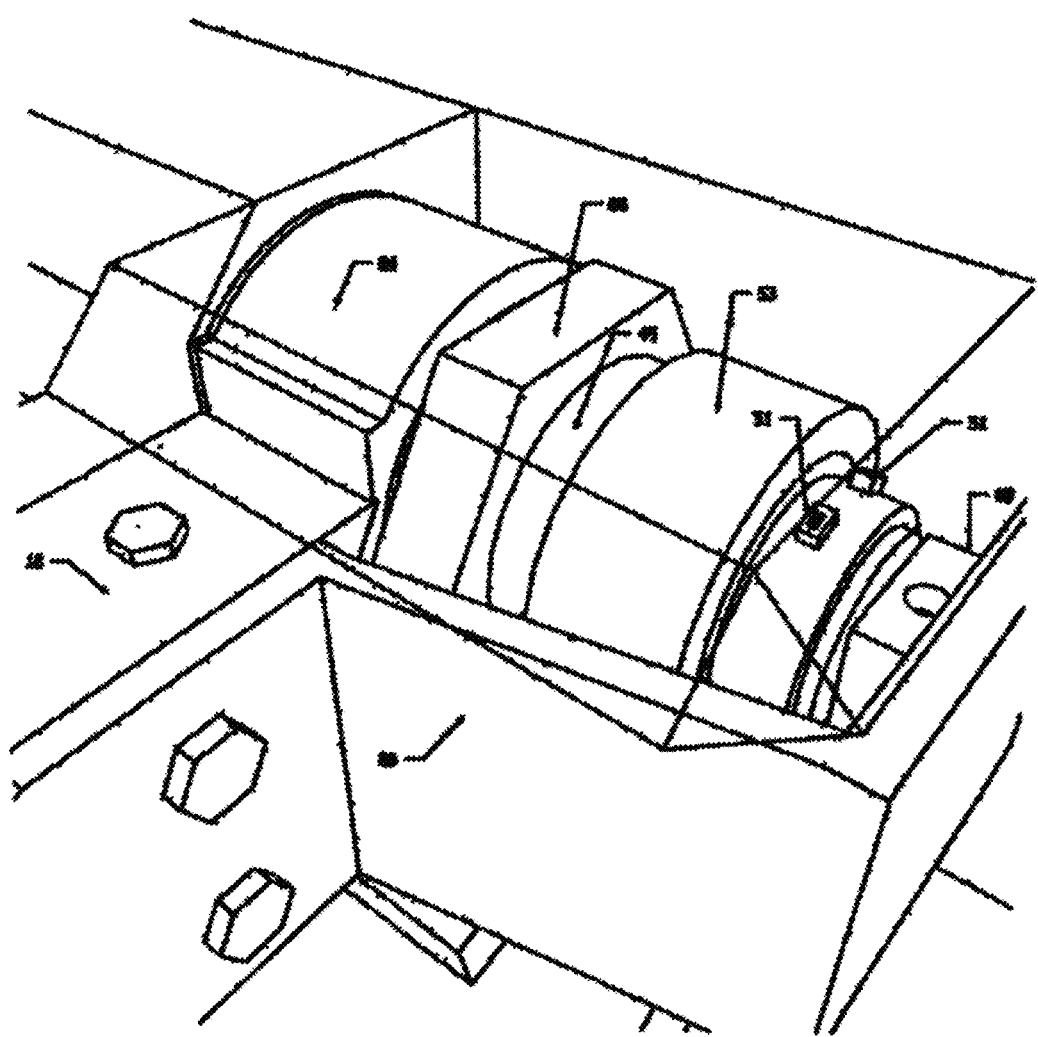
FIG. 9 is a closeup, left front corner, viewing through the covered Motor Bulge area at the left rotating joint. The Motor has been inserted through the wide Left Support Bar Head Extension, into the Tube and is secured by a large Nut. The Motorhead extends from right of the #4Nut and connects to the Connector Slot of the Motor Bracket on the right.

FIG. 9 is a closeup, left front corner, viewing through the covered Motor Bulge area, at the left rotating joint. The Motor has been inserted through the wide Left Support Bar Head Extension, into the Tube and is secured by a large #4Nut. The Motorhead extends from right of the #4Nut and connects to the Connector Slot of the Motor Bracket on the right. The Motor Bracket in the front wraps around and connects with the Left Support Bar on the left. The Left Support Bar is connected to the Left Support Bar Head Extension. Two cube shaped Control Switches on the top of the Motor Head are presets, which set the opening length and the closing point of the Electric Tailgate Ladder.

Figure 10A:
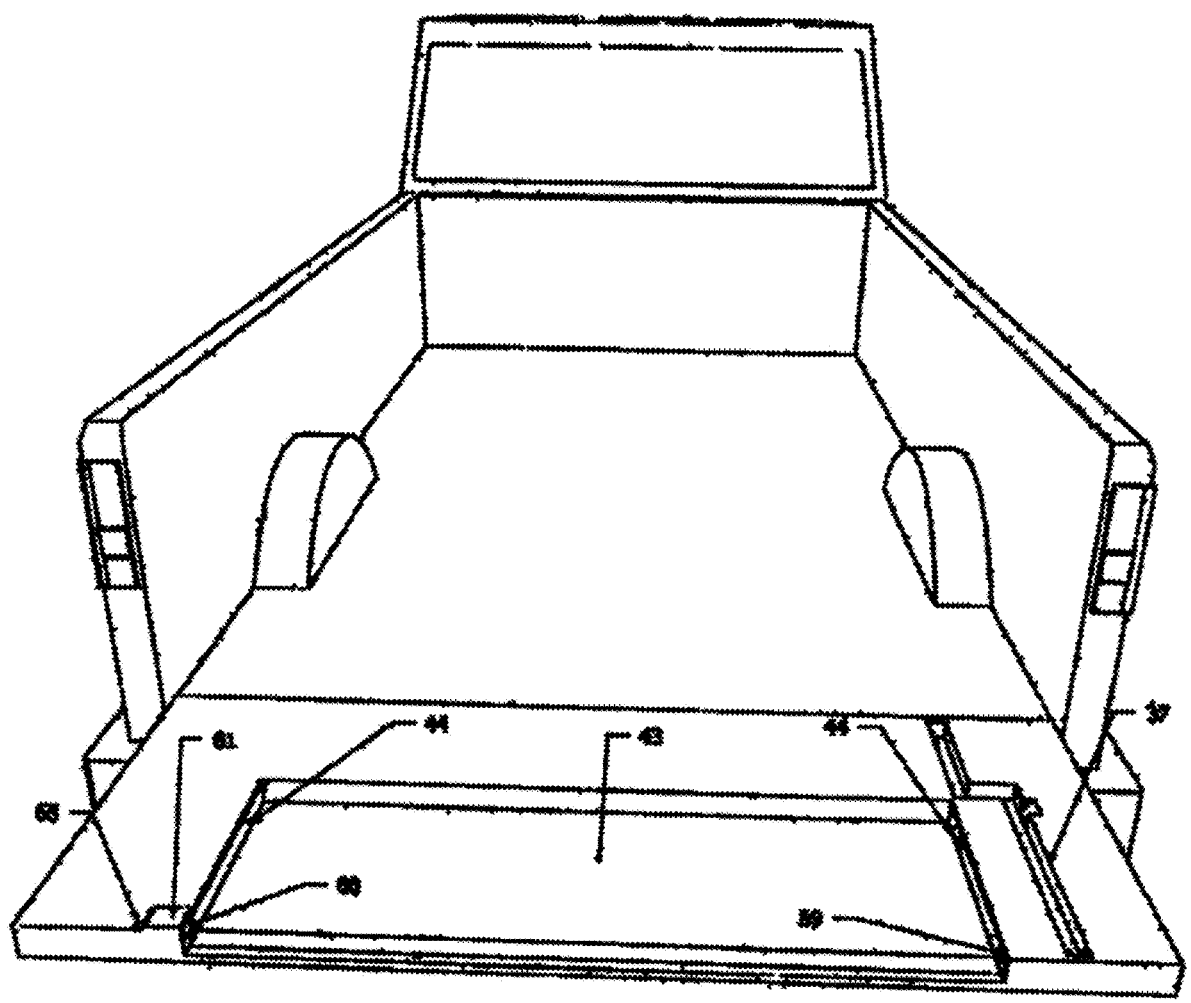
FIG. 10A is a rear view of the said picture in Fig. B-1f of a Tailgate, excluding the pickup. The Tailgate is attached to the pickup and the recess of the Ladder Casing and the Rail Casing are vacant.

FIG. 10A is a rear view of the said picture in Fig. B-1*f* of a Tailgate, excluding the pickup. The Tailgate is attached to the pickup and the recess of the Ladder Casing and the Rail Casing are vacant. The large rectangular recessed area (Ladder Casing), housed the Electric Tailgate Ladder and the small narrow bent recessed area (Rail Casing), housed the Three Point Rail. At the front, just left of Ladder Casing, is a noticeable bulge (Motor Bulge), which accommodates the large Motorhead that extend above the surface. Left of the Bulge is a rectangular box which is the Switch Cover for the Switch below. The Switch operates and controls every movement of the Electric Tailgate Ladder. At the front of the Ladder Casing, on the Left is a Large Axle Hole which fits the Motor and a smaller Axle Hole is on the right that fits a regular size Main Gate Axle. In the rear along the walls of the Ladder Casing are Tailgate Lock Inserts.

Figure 10B:
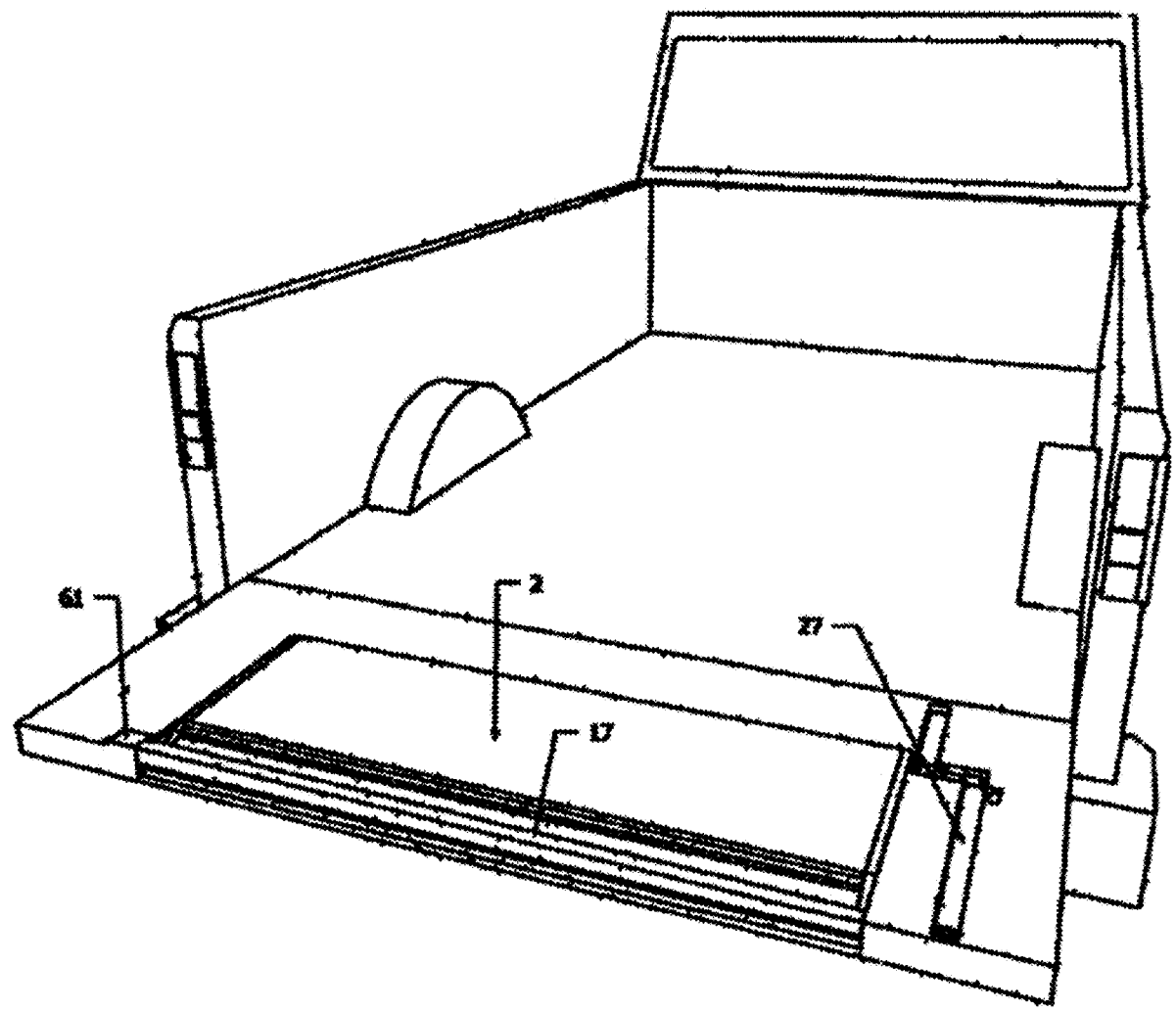
FIG. 10B is a rear view of a pickup with an opened Tailgate displaying a closed Electric Tailgate Ladder and a closed Three Point Rail.

FIG. 10B is a rear view of a pickup with an opened Tailgate displaying a closed Electric Tailgate Ladder and a lowered Three Point Rail. At the front, just left of the Electric Tailgate Ladder is the Motor Bulge, which accommodates the hidden, large Motorhead that extend above the surface. Left of the Bulge is a rectangular box which is the Switch Cover for the Switch below. The Switch operates and controls every movement of the Electric Tailgate Ladder. Most of the Electric Tailgate Ladder is flush with the surface areas of the Tailgate. The Neck Casing in the front, has a curved section which allows the Ladder, when it is flipped over, to sit lower on the edge of the Tailgate.

Figure 10C:
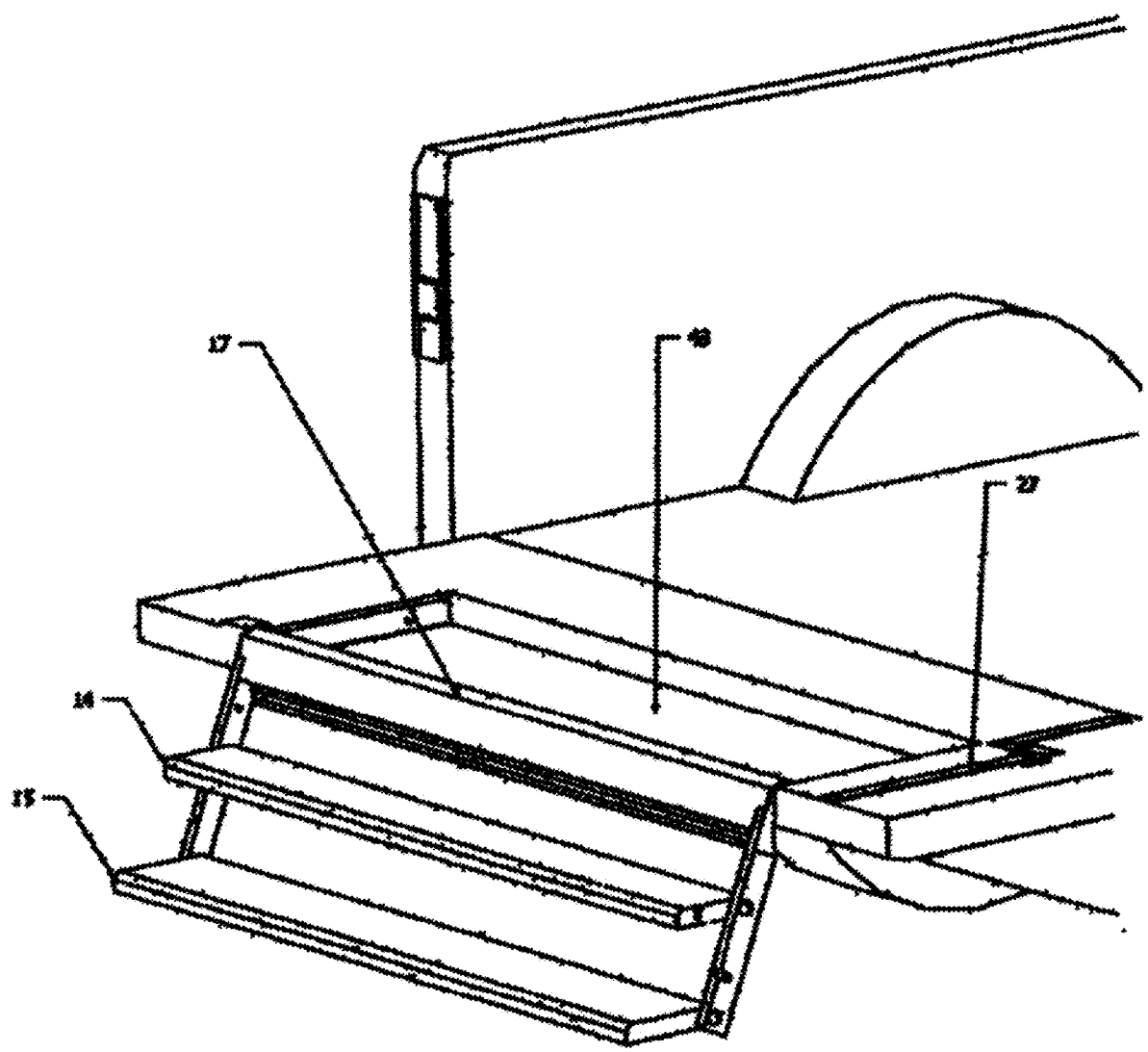
FIG. 10C is a rear view of an opened Tailgate with a fully opened Electric Tailgate Ladder with both Steps lowered and a Three Point Rail that is barely visible as it lays inside of the Rail Casing.

FIG. 10C is a rear view of an opened Tailgate with a fully opened Electric Tailgate Ladder with both Steps lowered and a Three Point Rail that is barely visible as it lays inside of the Rail Casing. The Electric Tailgate Ladder has been flipped over and rotated about 248 degrees, from the confine of the Ladder Casing. The Steps are fully opened and are now parallel with the Tailgate and the surface. The Neck Casing span the width of the Ladder and cover the Tube and the Curved Neck area.

Figure 11A:
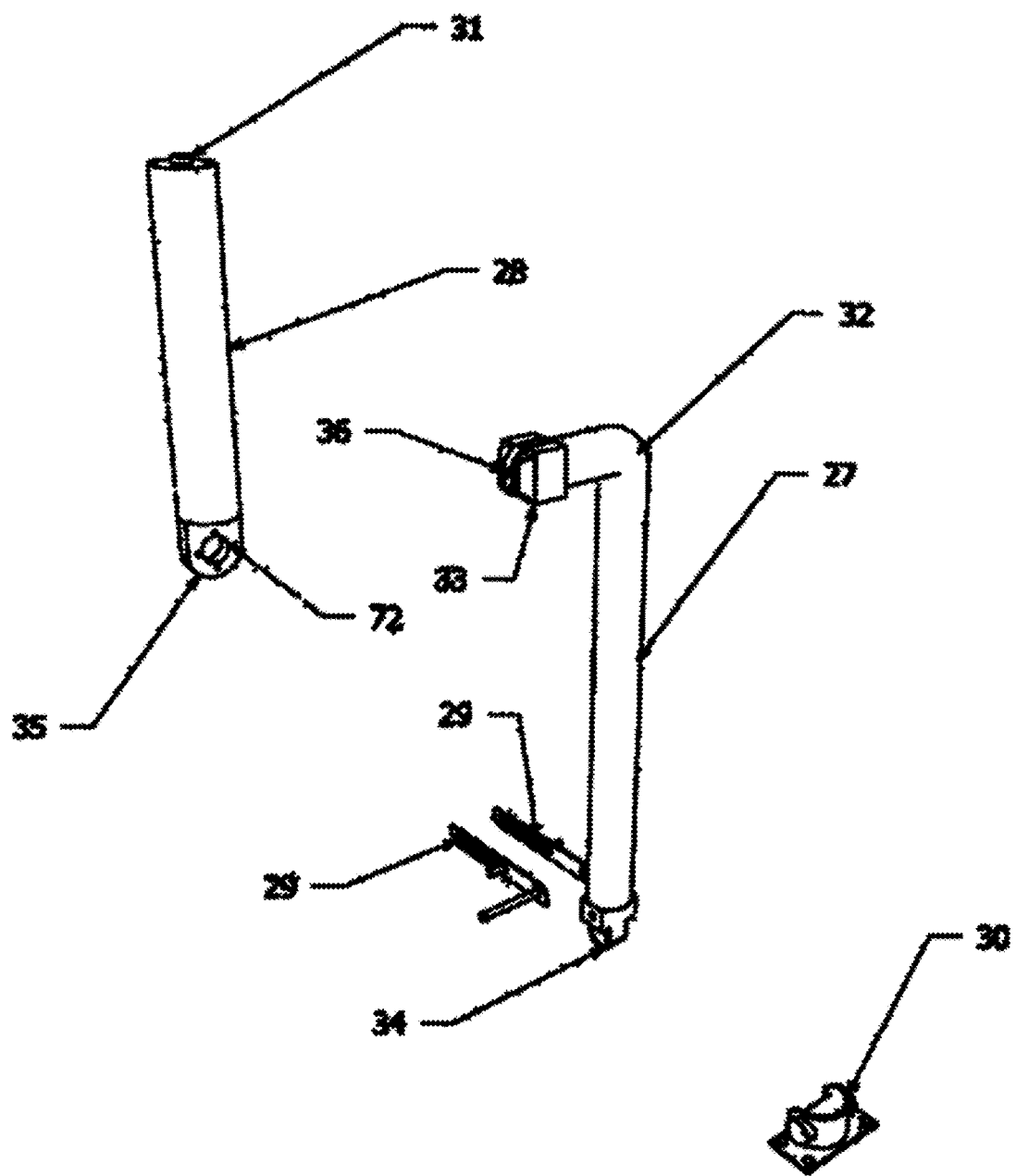
FIG. 11A is a separated Three Point Rail with the parts aligned and apart. The Rail Handle is at top left, below and to the right is the Main Body, behind it is a pair of Stabilizers and in the front is the Rail Base.

FIG. 11A is a separated Three Point Rail with the parts aligned and apart. The Rail Handle is at top left, below and to the right is the Main Body, behind it is a pair of Stabilizers and in the front is the Rail Base. The Rail Handle on the left has a Shift Button on top, and a slender Male Insert is at the bottom. The Male Insert has a large center hole that is flanked by four Retractable Anchors. The Main Body of the Three Point Rail has a Bent Neck which puts the Rail closer to the climber as he/she moves along the Steps. At the bottom of the Main Body is a connecting piece, which is the Base Connection Loop that connects to the Rail Base. Behind it is a pair of Stabilizer with protruding Bolts. The Stabilizers anchor the Three Point Rail and prevents it from tipping over. The Rail Base at the front is connected to the Main Body by a joint, and the wider base is connected to the Rail Casing.

Figure 11B:
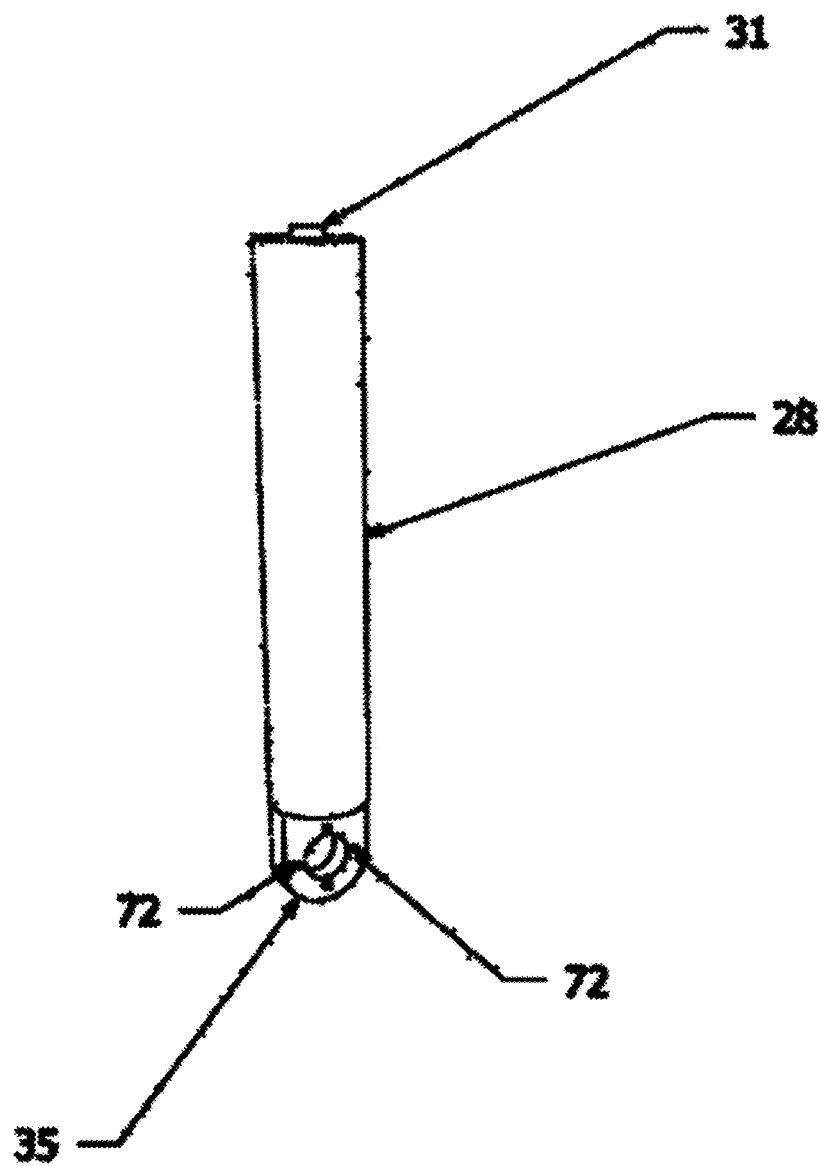
FIG. 11B is a closeup of a Rail Handle with a Shift Button on top, and at the bottom is the protruding Male Insert. The Male Insert has a large hole in the middle that is flanked by four Retractable Anchors.

FIG. 11B is a closeup of a Rail Handle with a Shift Button on top, and at the bottom is the protruding Male Insert. The Rail Handle is cylindrical in shape and fits the palm of the climber. The Shift Button that is in the center, on the top of the Rail Handle, when pressed with the thumb the said Rail Handle can be moved from upright to horizontal and to pointing down. The protruding Male Insert at the bottom, with a large center hole, is flanked by four Retractable Anchors. The Male Insert fits into the Female Slot at the tip of the Main Body of the Three Point Rail.

Figure 11C:
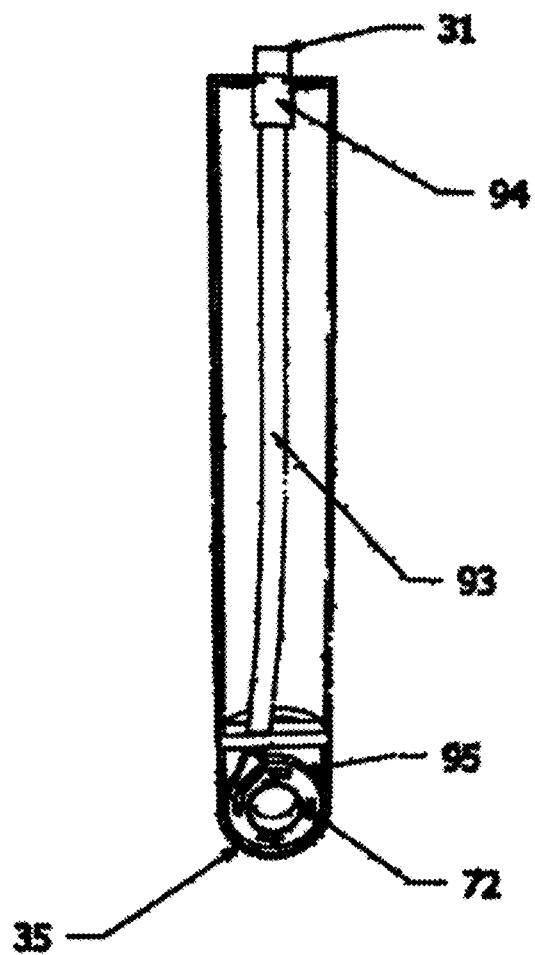
FIG. 11C is a cross-section of the Rail Handle which shows its inner components. The Shift Button sits on the Spring Chamber which is connected to the Connecting Chaff that pushes the Disc that is located in the narrow Male Insert.

FIG. 11C is a cross-section of the Rail Handle which shows its inner components. The Shift Button sits on the Shift Chamber which is connected to the Connecting Chaff that pushes the Disc that causes it to rotate. The Shift Button when pressed, lower the Retractable Anchors which allows the Rail Handle to be moved along the Female Slot of the connecting joint. By pressing the Shift Button, the connected Shift Chamber that is connected to the Connecting Chaff, move simultaneously and push the spring-loaded Disc at the top of it which causes the said Disc to rotate counterclockwise. This counterclockwise rotation of the Disc allows the Retractable Anchors to slide from the shallow end to the deep end, of the Curved Slots. By sliding to the deep end of the Curved Slots the protruding Retractable Anchors appears to retract, which allows the Rail Handle to move.

Figure 12A:
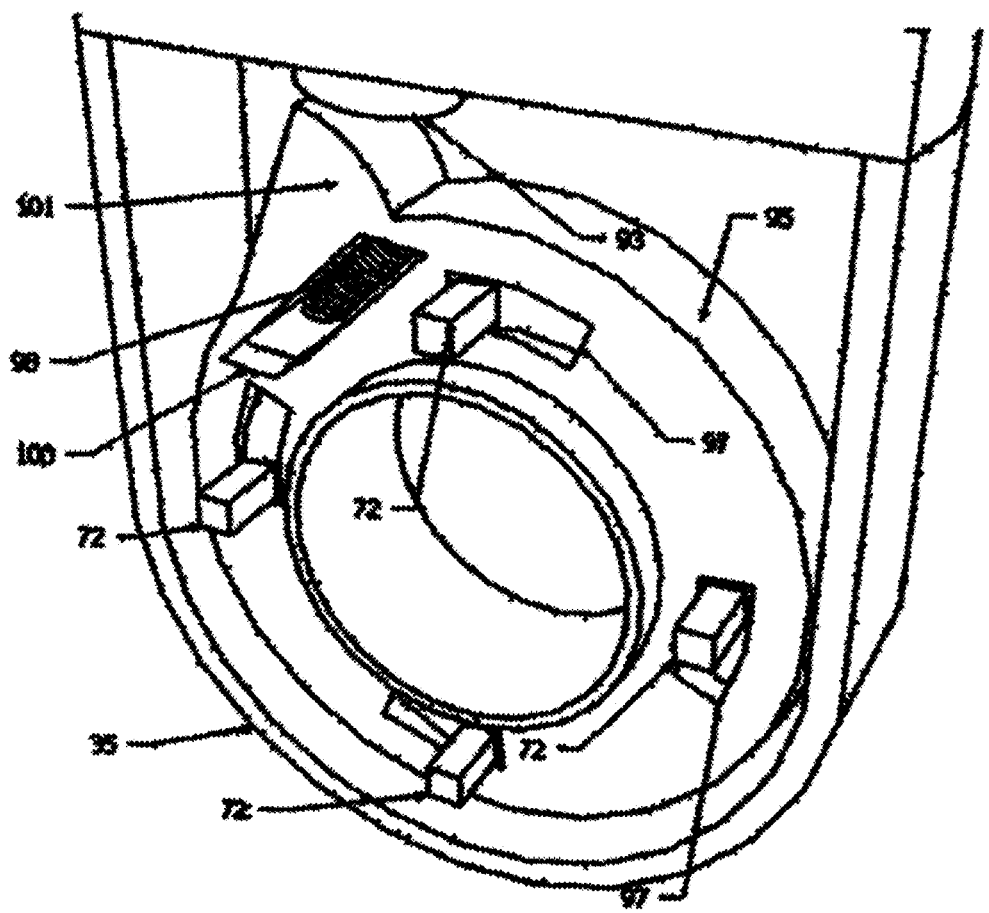
FIG. 12A is a close up view of the Male Insert at the lower end of the Rail Handle with its outside cover removed. The Disc in the center has four Curved Slots, with Retractable Anchors at the shallow end of them. The tip of the Connecting Chaff is above the Disc Spout, and below the said Disc Spout is an Angled Slot with a Spring sitting on a Stationery Rod.

FIG. 12A is a close up view of the Male Insert at the tip of the Rail Handle with the outside cover removed. The Disc in the center has four Curved Slots with Retractable Anchors at the shallow end of them. The opposite side of the Disc is a mirror image of side that is in view. The tip of the Connecting Chaff is above the Disc Spout, and below the said Disc Spout is an Angled Slot which penetrates the Disc and housed the Spring that sits on the Stationery Horizontal Bar. The Stationery Horizontal Bar is not attached to the Disc, but to the walls of the Male Insert, and it passes through the Angled Slot of the Disc. As the Disc rotates, the Spring is compressed against the Stationery Horizontal Bar and when the force is removed it recoils and the Disk rotates back to its starting point. Four Retractable Anchors are embedded in the shallow end of the Curded Slots. The counterclockwise rotation of the Disc allows the Retractable Anchors to slide from the shallow ends to the deep ends, of the Curved Slots which makes them buried deeper in the Curved Slots of the Disc and therefore makes them shorter. By getting shorter the Retractable Anchors separate from the Anchor Slots of the Female Slot and cause the Rail Handle to be in neutral, and free to move.

Figure 12B:
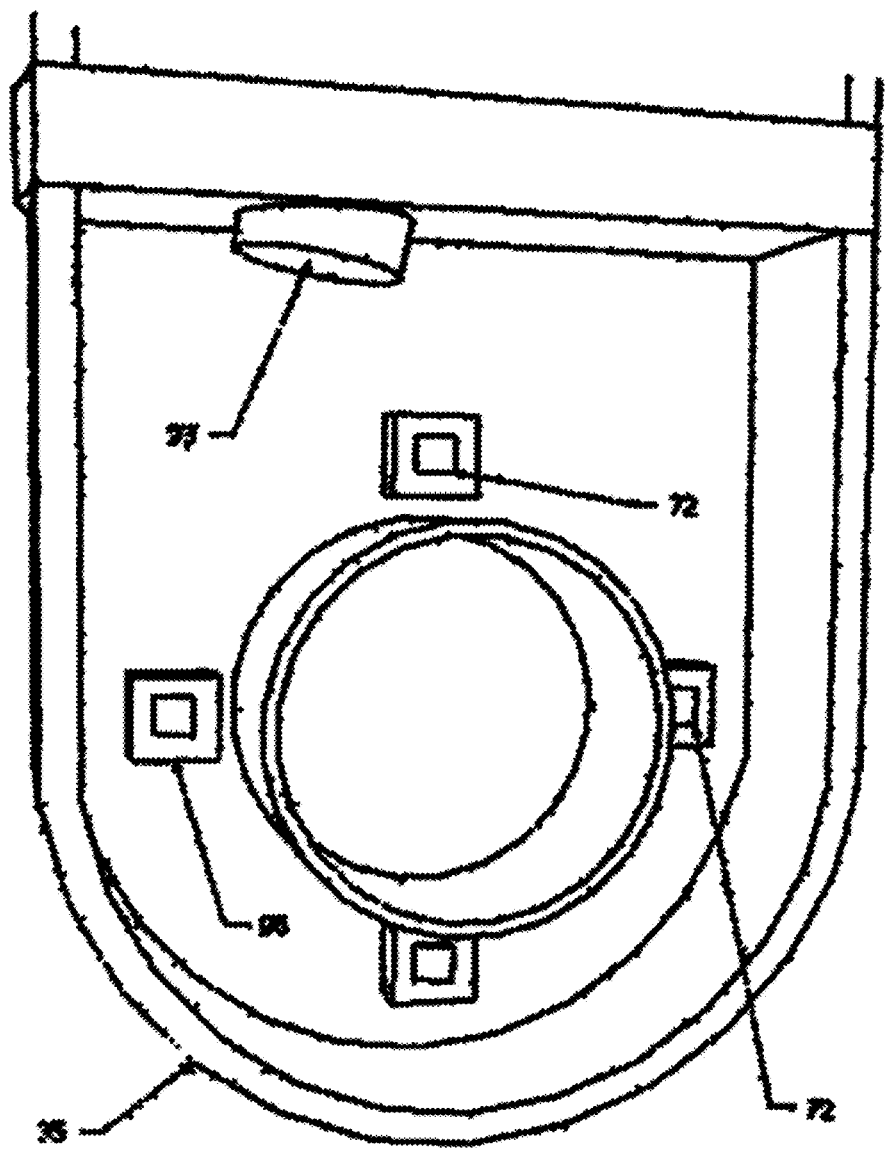
FIG. 12B is a close up view of the Male Insert at the bottom end of the Rail Handle. The Disc has been removed, which reveals the far inside wall that is a mirror image of the missing outside wall. Four Retractable Anchors are surrounded by tight fitting Anchor Casing which allows them to move in and out as they submerge and elevate along the Curved Slot of the Disc.

FIG. 12B is a closeup view of the Male Insert at the bottom end of the Rail Handle. The Disc has been removed, which reveals the far inside wall that is a mirror image of the missing outside wall. Four Retractable Anchors are surrounded by tight fitting Anchor Casing which allows them to move in and out as they submerge and elevate along the Curved Slot of the Disc. The hole in the center, anchors the Center Pin and create a rotating joint with male and female connection.

Figure 12C:
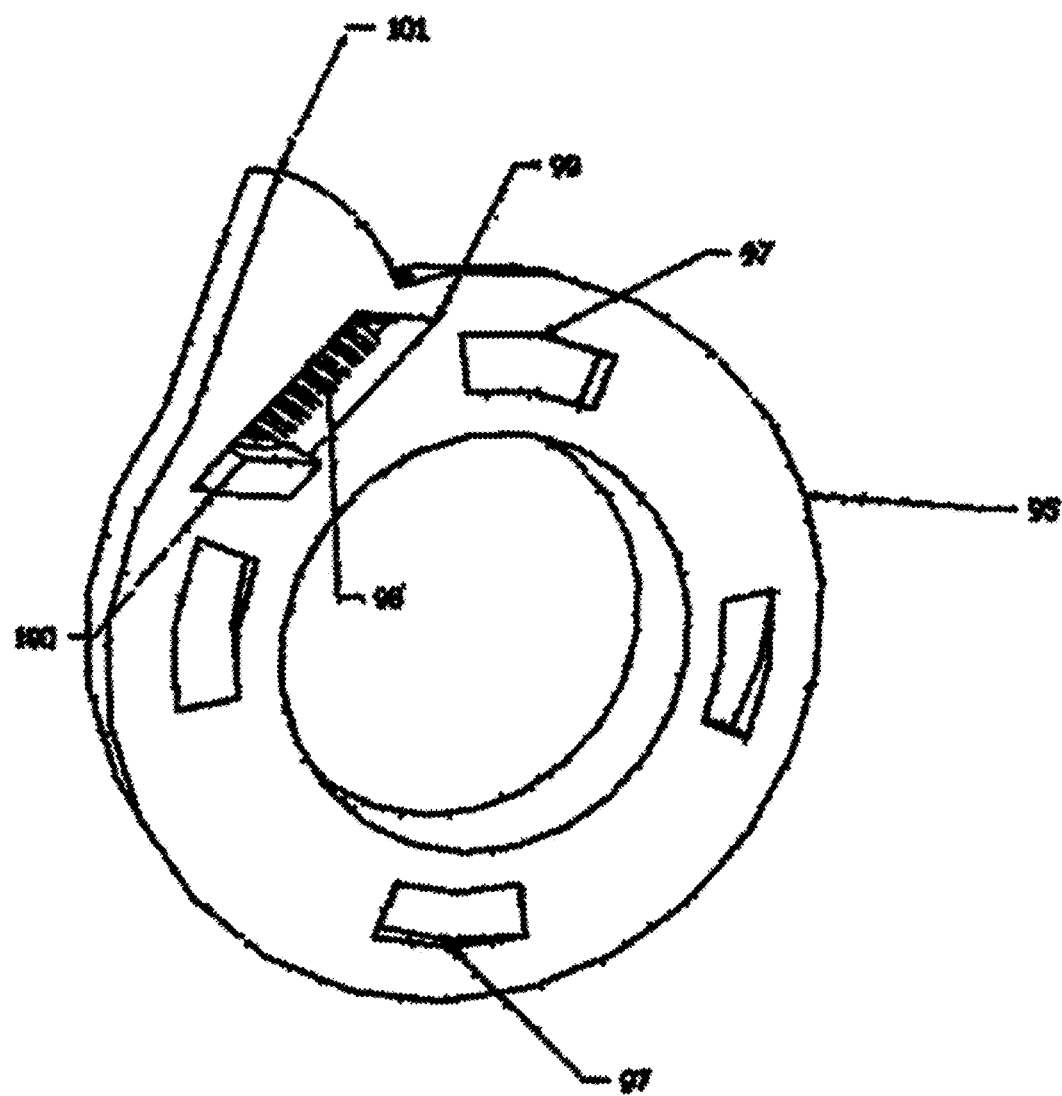
FIG. 12C is a close up view of a separated Disc. The Disc has a Disc Spout on top, and below it is an Angled Slot with a partial view of a Spring resting on top of a Stationery Horizontal Bar. The Disc has four Curved Slots that are sloped at the bottom and have a shallow and a deep end.

FIG. 12C is a closeup view of a separated Disc. The Disc has a Disc Spout on top, and below it is an Angled Slot with a partial view of a Spring resting on top of a Stationery Horizontal Bar. The Disc has four Curved Slots that are sloped at the bottom and have a shallow and a deep end. The Stationery Horizontal Bar is not attached to the Disc but to the walls of the Male Insert. As the Disc rotates, the Spring is compressed against the Stationery Horizontal Bar and when the force is removed it recoils and the Disk rotates back to its starting point. The counterclockwise rotation of the Disc, allows the missing Retractable Anchors to slide from the shallow end to the deep end, of the Curved Slots which sink them deeper in the Curved Slot of the Disc. The Disc transfer the vertical motion from the Connecting Rod into a horizontal motion of the Retractable Anchors which extend and lock into the Anchor Slots of the Female Slot and shortens to separate from it.

Figure 13:
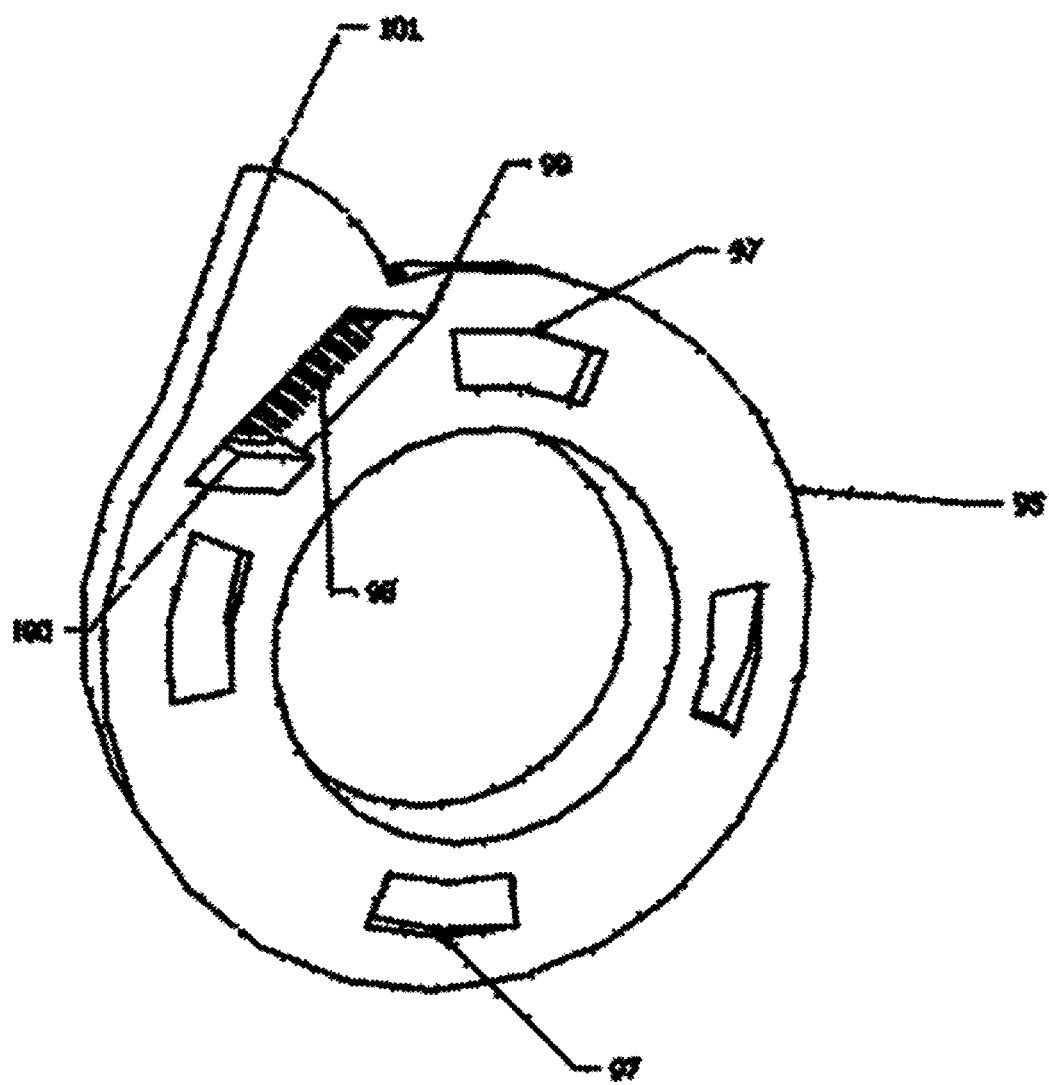
FIG. 13 is a closeup, front view of the Hinged Joint Head which is at the tip, close to the Bent Neck of the Main Body of the Three Point Rail. The Hinge Joint Head has a Female Slot which accommodates the Male Insert of the Rail Handle. Each of the sides has four Anchor Slots and three are visible here.

FIG. 13 is a closeup, front view of the Hinged Joint Head which is at the tip, close to the Bent Neck of the Main Body of the Three Point Rail. The Hinge Joint Head has a Female Slot which accommodates the Male Insert of the Rail Handle. Each of the sides has four Anchor Slots and three are visible here. The Shift Button when pressed, lower the Retractable Anchors and separates them from the Anchor Slot which allows the Rail Handle to move along the Female Slot. The Center Pin in the middle is the cylindrical in shape and anchors the Male Insert of the Rail Handle to the Female Slot of the Main Body of the Three Point Rail, to form a rotating hinge joint.

Figure 14A:
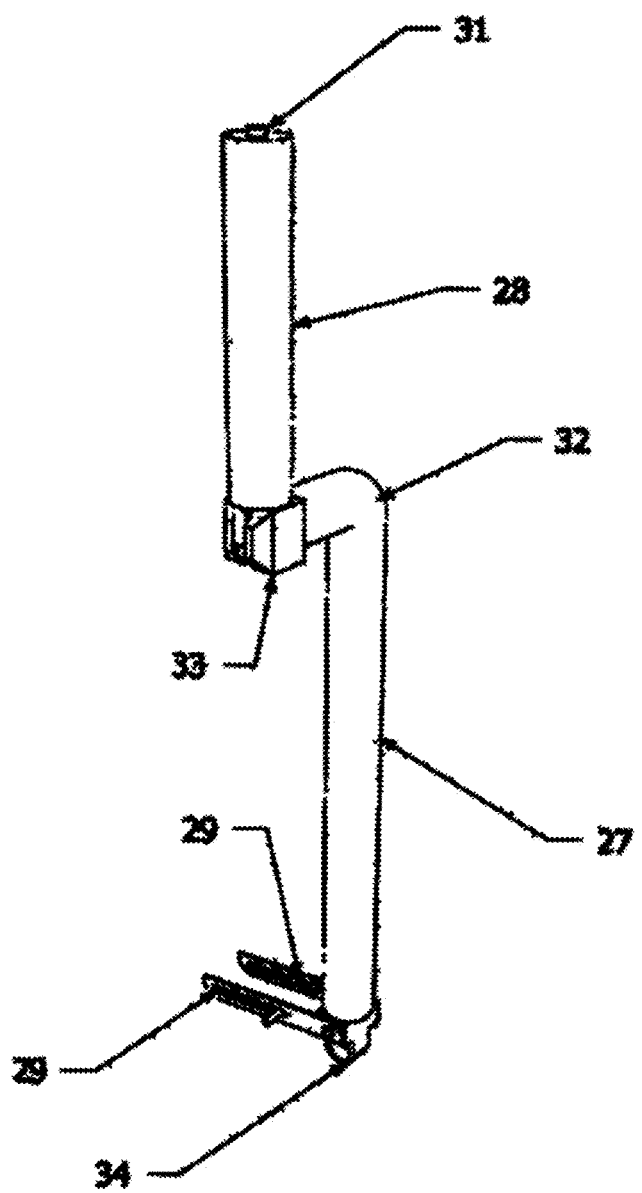
FIG. 14A is an upright and fully assembled Three Point Rail with the Rail Handle in an upright position. The Three Point Rail has attached Stabilizer Bars at the bottom section which prevents it from pulling all the way forward.

FIG. 14A is an upright and fully assembled Three Point Rail with the Rail Handle in an upright position. The Three Point Rail is a sturdy support rail with moveable handle that can be adjusted according to the customers preference. The Three Point Rail has attached Stabilizer Bars at the bottom section which prevents it from pulling all the way forward. Both Stabilizer Bars have a long open slot which span the rear half, that allow them to move back and forward while still attached to the Rail Casing. The other end of the Stabilizer Bar is attached to the side of the Base Connector which gives enough clearance for the Three Point Rail to open and close between them. The Three Point Rail is lifted from the recess of the Rail Casing to an upright position with an adjustable Rail Handle, that gives the climber flexibility.

Figure 14B:
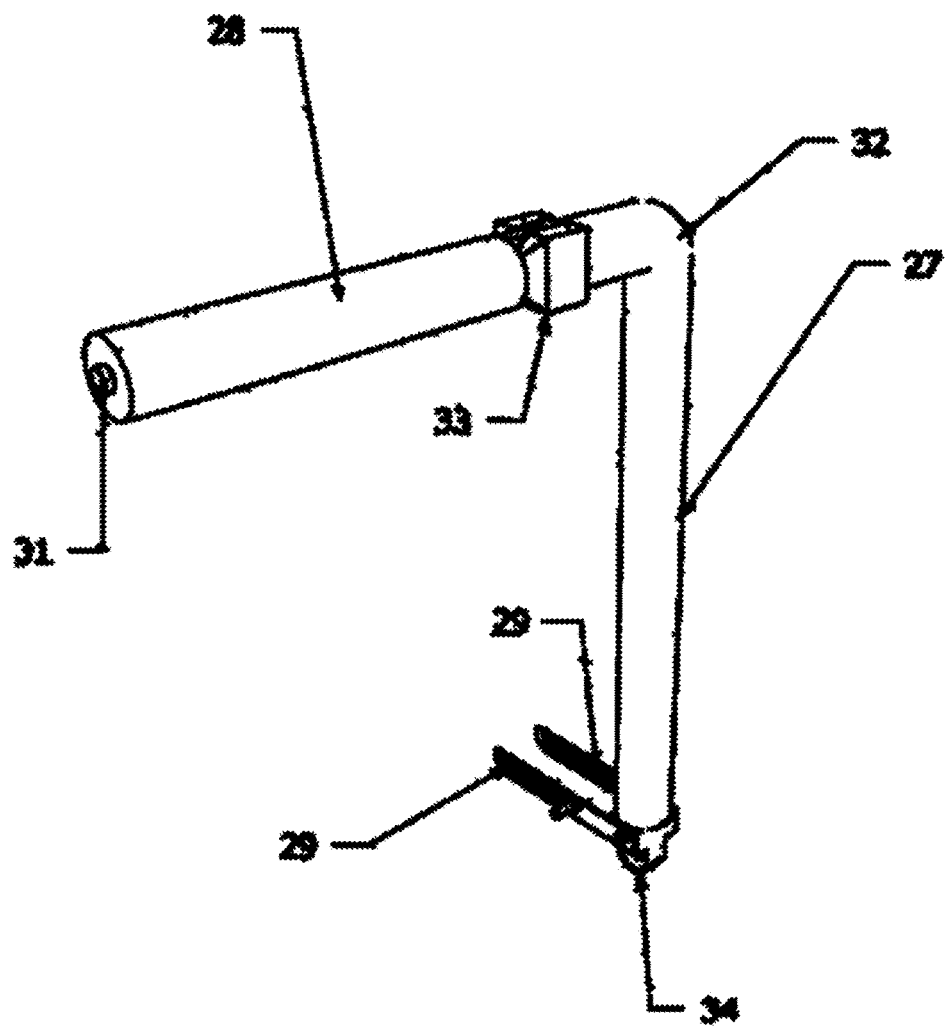
FIG. 14B is an erected Three Point Rail with the flexible Rail Handle being lowered to a horizontal position, and is align with the bent top section of the Main Body. The Three Point Rail has attached Stabilizer Bars at the bottom section which prevents it from pulling all the way forward.

FIG. 14B is an erected Three Point Rail with the flexible Rail Handle being lowered to a horizontal position and is align with the bent top section of the Main Body. The Three Point Rail has attached Stabilizer Bars at the bottom section which prevents it from pulling all the way forward. The Stabilizer Bars each has a long open slot which span the rear half, that allow them to move back and forward while still attached to the Rail Casing. The other end of the Stabilizer Bar is attached to the side of the Base Connector which gives enough clearance for the Three Point Rail to open and close between them.

Figure 14C:
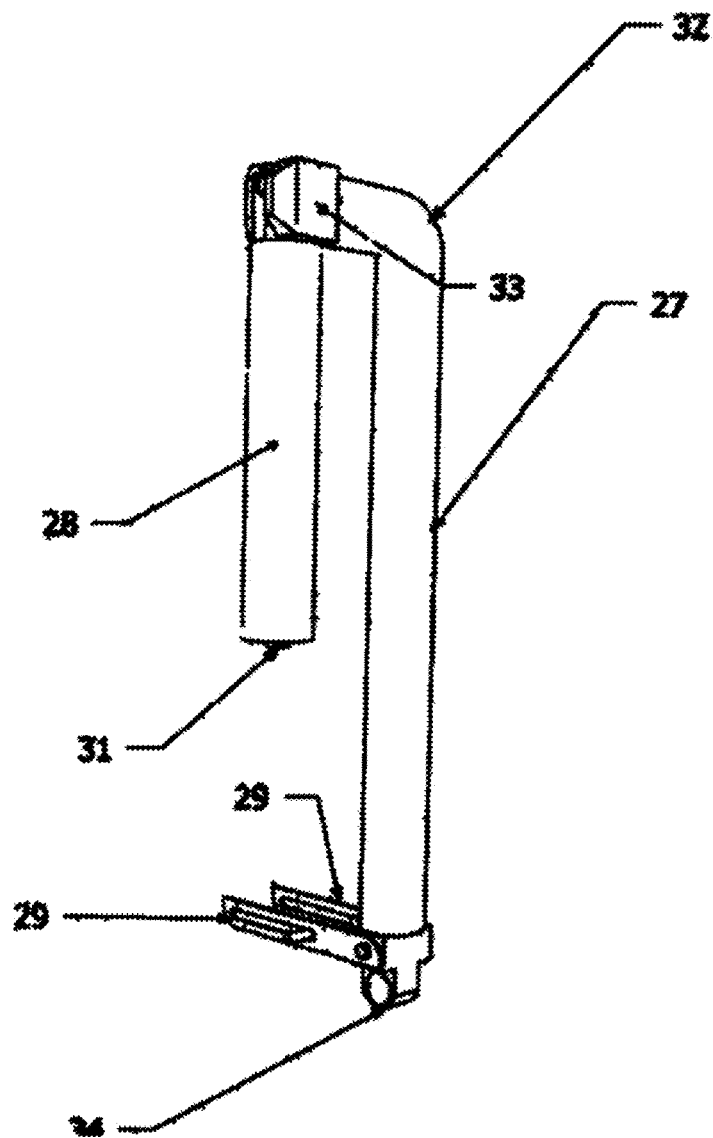
FIG. 14C is an erected Three Point Rail with the flexible Rail Handle now pointing down towards the surface. In this position kids and small adults are able to reach to a lower access point that would enable a safe climb. The Three Point Rail has attached Stabilizer Bars at the bottom section which prevents it from pulling all the way forward.
Figure 14D:
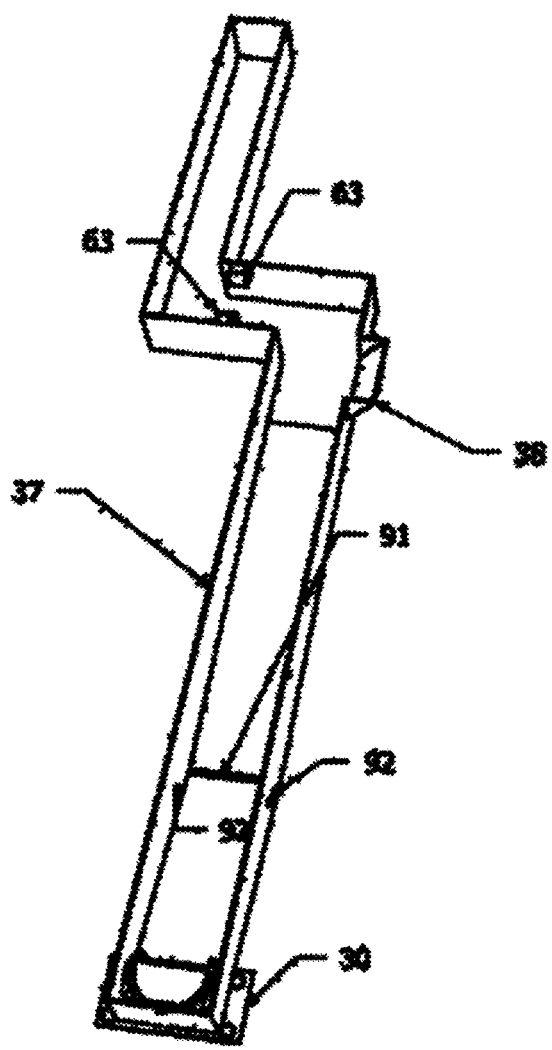
FIG. 14D is an overhead, front view of an elongated, bent Rail Casing which housed the Three Point Rail. The Rail Casing fits tightly inside the narrow-recess of the Tailgate.

FIG. 14C is an erected Three Point Rail with the flexible Rail Handle now pointing down towards the surface. In this position kids and small adults are able to reach to a lower access point that would enable a safe climb. The Three Point Rail has attached Stabilizer Bars at the bottom section which prevents it from pulling all the way forward. The Stabilizer Bars each has a long open slot which span the rear half, that allow them to move back and forward while still attached to the Rail Casing. The other end of the Stabilizer Bar, is attached to the side of the Base Connector which gives enough clearance for the Three Point Rail to open and close between them FIG. 14D is an overhead, front view of an elongated, bent Rail Casing which housed the Three Point Rail. The Rail Casing fits tightly inside the narrow-recess of the Tailgate. In the first section, at the front, is the Base Connector, which support and connects to the missing Three Point Rail. The floor, behind the Base Connector is sloped towards the Drain on both sides which expels water from within. On the outside of the right sidewall, before the bend, is the angled Rail Access Point which is an opening used to lift the Three Point Rail. In the second section, inside both bends are two Rubber Bumpers, one on each sidewall, which hold the Bent Neck of the Three Point Rail in place while it is inside the Rail Casing. The third section of the Rail Casing housed the moveable Rail Handle.

Figure 14E:
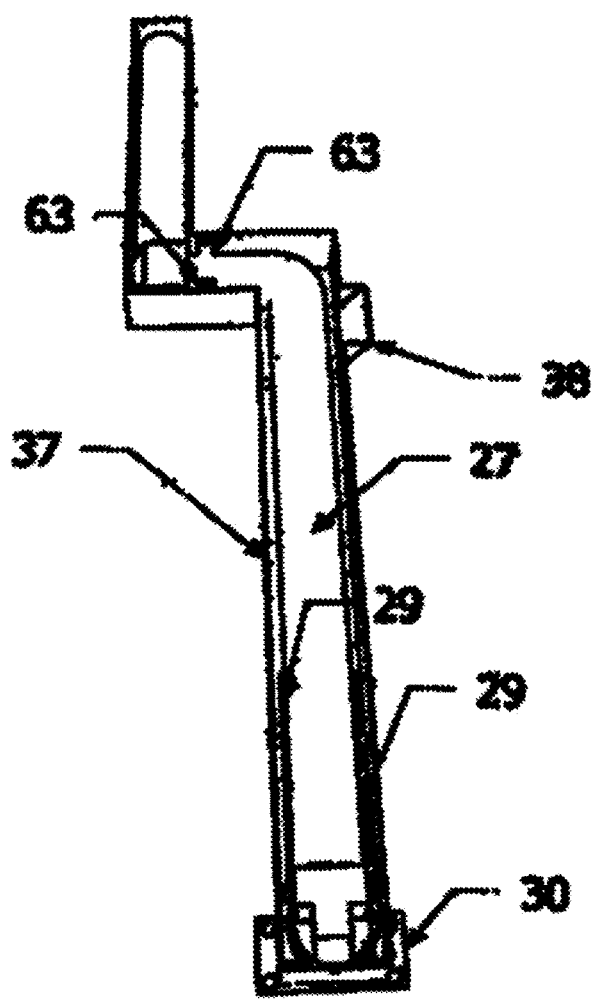
FIG. 14E is an overhead, front view of the said elongated, bent Rail Casing in Fig.-C-1k, but with an embedded Three Point Rail within its walls.

FIG. 14E is an overhead, front view of the said elongated, bent Rail Casing in Fig.-C-1k, but with an embedded Three Point Rail within its walls. The Three Point Rail is lowered and is sandwiched between the Stabilizer Bars at the front section of the Rail Casing. The Rubber Bumpers on the bent section, secures the Three Point Rail in place.

Figure 15A:
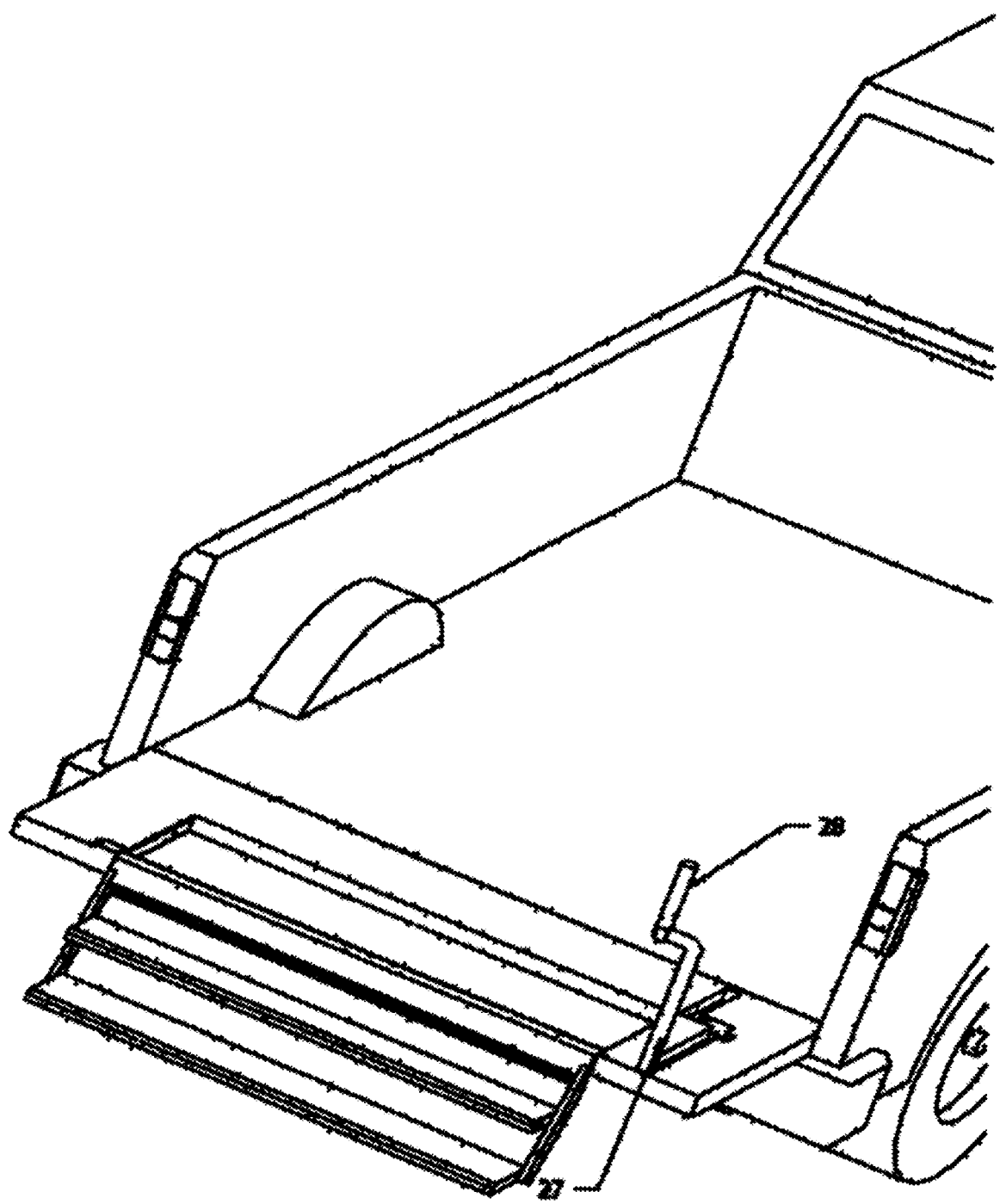
FIG. 15A shows an upright Three Point Rail that has been fully extended. It has been lifted from the recess of the Rail Casing and is now a sturdy rail that will assist the climber as he/she moves up and down the Steps.

FIG. 15A shows an upright Three Point Rail that has been fully extended. It has been lifted from the recess of the Rail Casing and is now a sturdy rail that will assist the climber as he/she moves up and down the Steps. The Three Point Rail is situated on the right of the Tailgate Ladder. The flexible Rail Handle is upright and is at its maximum height. The climber is able to reach the Rail Handle which is in close proximity, as he/she climbs up and down the Steps.

Figure 15B:
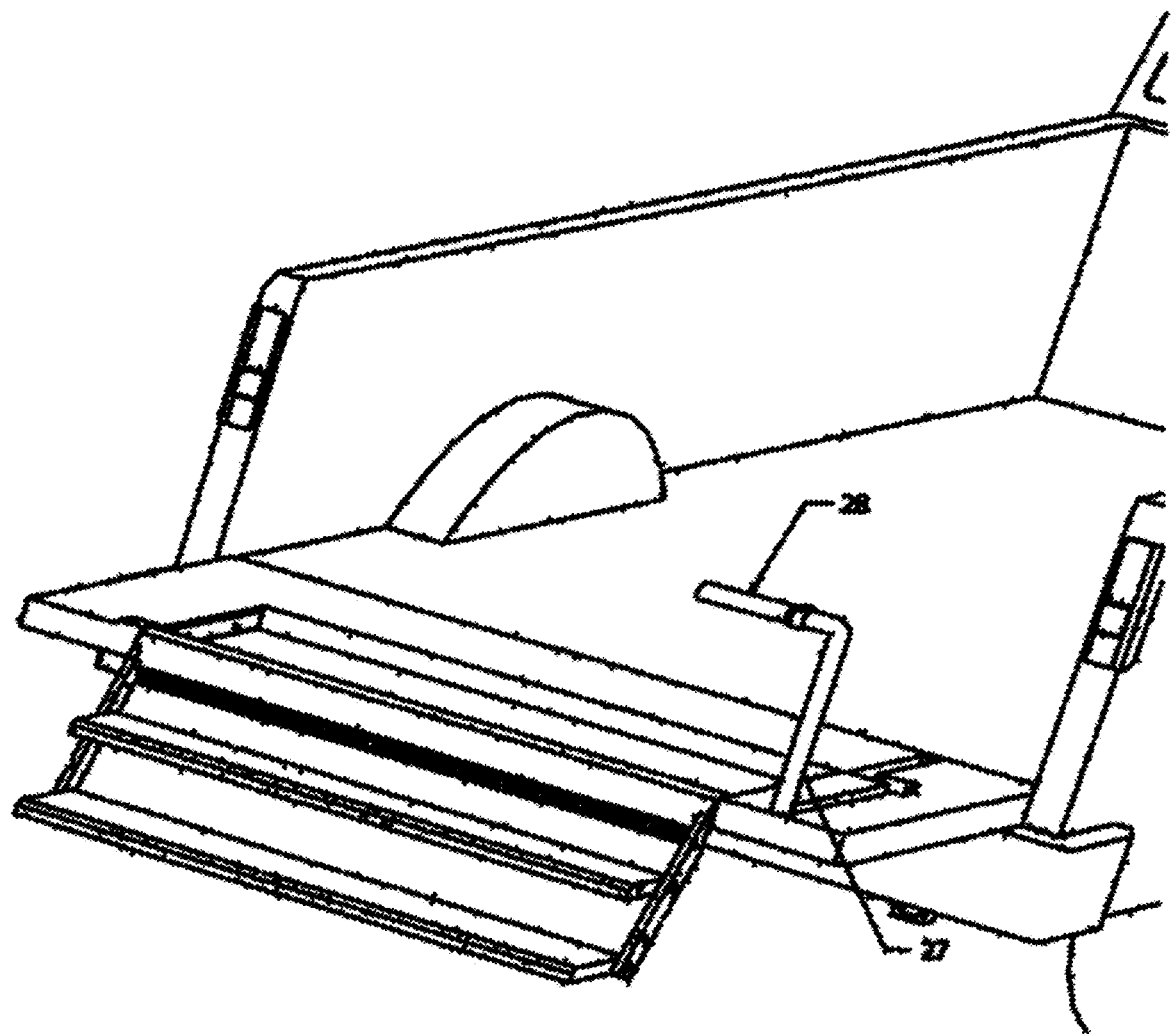
FIG. 15B shows an upright Three Point Rail in the number two position. It has been lifted from the recess of the Rail Casing and displays a horizontal Rail Handle which reaches further to the left to assist the climber as he/she moves up and down the Steps.

FIG. 15B shows an upright Three Point Rail in the number two position. It has been lifted from the recess of the Rail Casing and displays a horizontal Rail Handle which reaches further to the left to assist the climber as he/she moves up and down the Steps. This position gives the climber a moderate reach that makes it easier for an average climber to move along the Steps.

Figure 15C:
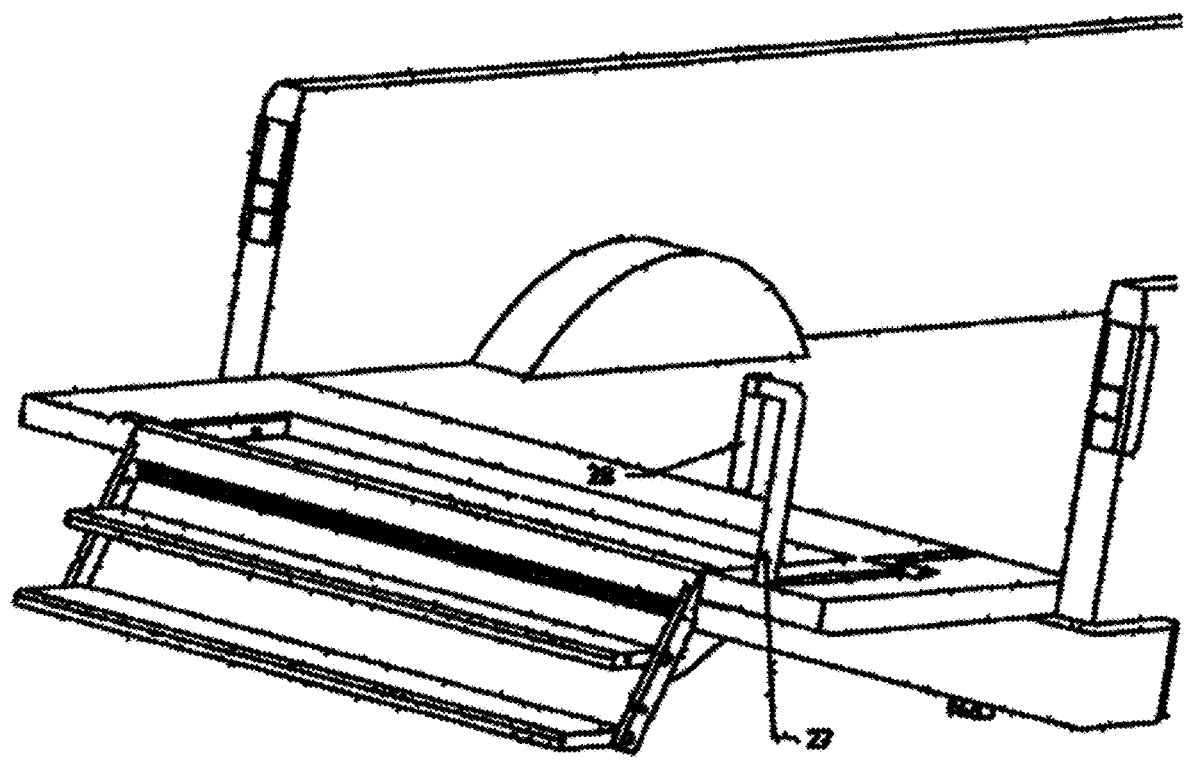
FIG. 15C shows an upright Three Point Rail in the number three position. It has been lifted from the recess of the Rail Casing and has the Rail Handle down and parallel to its body, which gives the climber a lower access point as he/she moves up and down the Steps.

FIG. 15C shows an upright Three Point Rail in the number three position. It has been lifted from the recess of the Rail Casing and has the Rail Handle down and parallel to its body, which gives the climber a lower access point as he/she moves up and down the Steps. In this position the Rail Handle is at its lowest point and children and small adults are able to reach it easily as they climb the Steps.

Figure 16A:
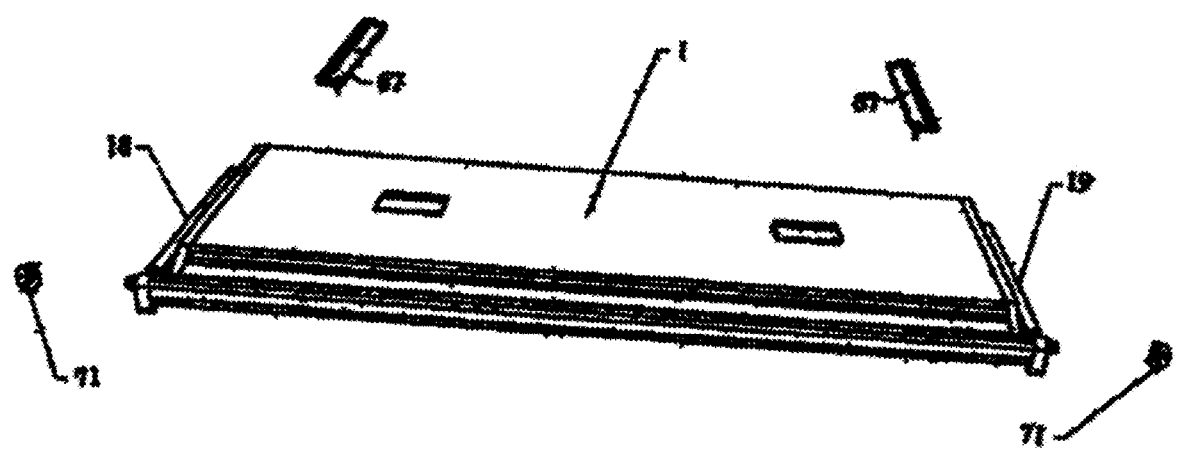
FIG. 16A shows a closed Aftermarket Tailgate Ladder with floating End Caps on both sides and in the rear is a pair of Platform Anchor Brackets which secure the Tailgate Ladder to the Tailgate.

FIG. 16A shows a closed Aftermarket Tailgate Ladder with floating End Caps on both sides and in the rear is a pair of Platform Anchor Brackets which secure the Tailgate Ladder to the Tailgate. This Aftermarket Tailgate Ladder is identical in appearance to the regular Tailgate Ladder, but there are minor differences. The Aftermarket Tailgate Ladder sits on top of the inside of the Tailgate that does not have a recess. The Right and Left Support Bars are exposed and therefore the connecting Main Gate Axles at the front has visible nuts and bolts. The End Caps are used to cover the ends which gives it a clean finish. The Platform Anchor Brackets in the rear, are first secure to the Tailgate, and then the Tailgate Ladder is then inserted into the slots of the said Platform Anchor Brackets until it is locked in place.

Figure 16B:
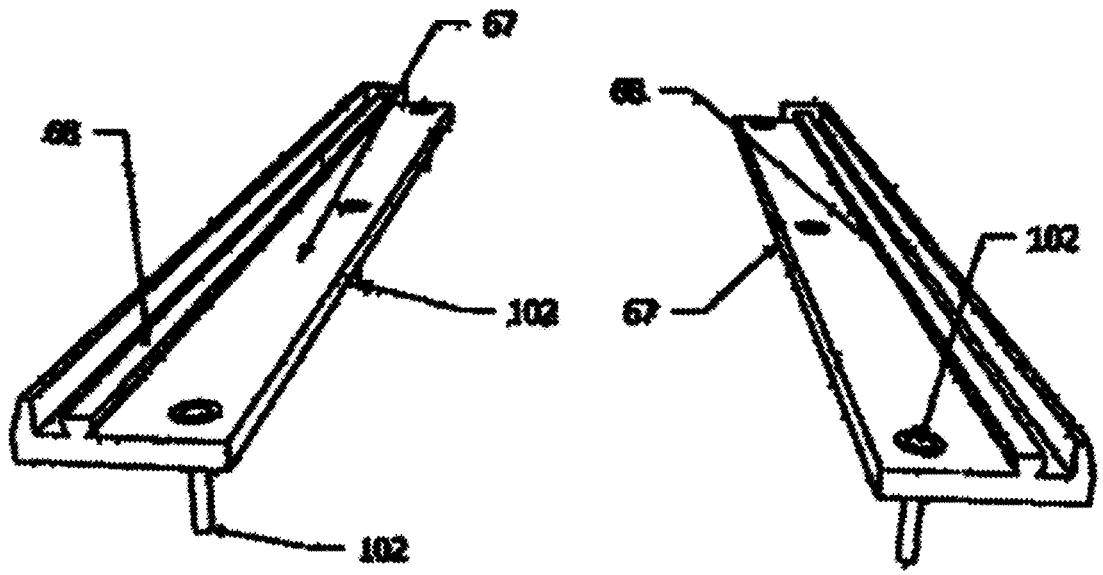
FIG. 16B shows a pair of Platform Anchor Bracket with open ends in the front and closed ends at the rear. A Male Tracks located next to the bent outer edge runs the full length of the Platform Anchor Bracket. It has a wide top and a narrow bottom, which allows it to lock into the Female Track of the Support Bar.

FIG. 16B shows a pair of Platform Anchor Bracket with open ends in the front and closed ends at the rear. A Male Tracks located next to the bent outer edge runs the full length of the Platform Anchor Bracket. It has a wide top and a narrow bottom, which allows it to lock into the Female Track of the Support Bar. T. Each Platform Anchor Bracket has three evenly spaced bolts which fasten it to the Tailgate. The Bolts are not able to be accessed while the Aftermarket Tailgate Ladder is closed, but only when it is opened. At the closed ends are stop barriers which prevents the Aftermarket Tailgate Ladder from slipping off the Male Track.

Figure 16C:
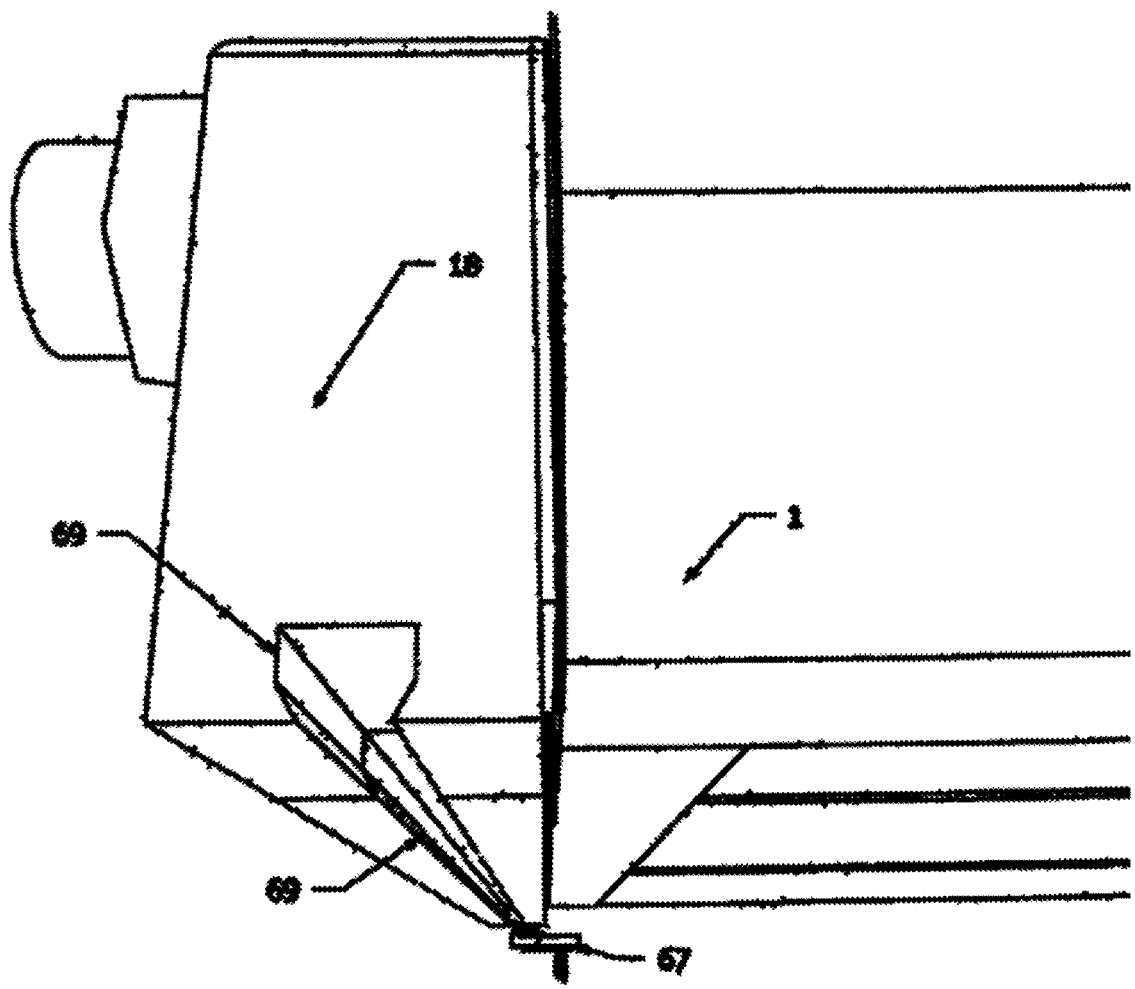
FIG. 16C is a close up, front view of the left underside of the Tailgate Ladder. The Left Support Bar is in full view, with its built-in Female Tracks which runs the full length of the underside.

FIG. 16C is a close up, front view of the left underside of the Tailgate Ladder. The Left Support Bar is in full view, with its built-in Female Tracks which runs the full length of the underside. The Male Track of the Platform Anchor Bracket will connect with the Female Track and secure them together. In the rear is a Platform Anchor Bracket which is aligned with the Left Support Bar.

Figure 16D:
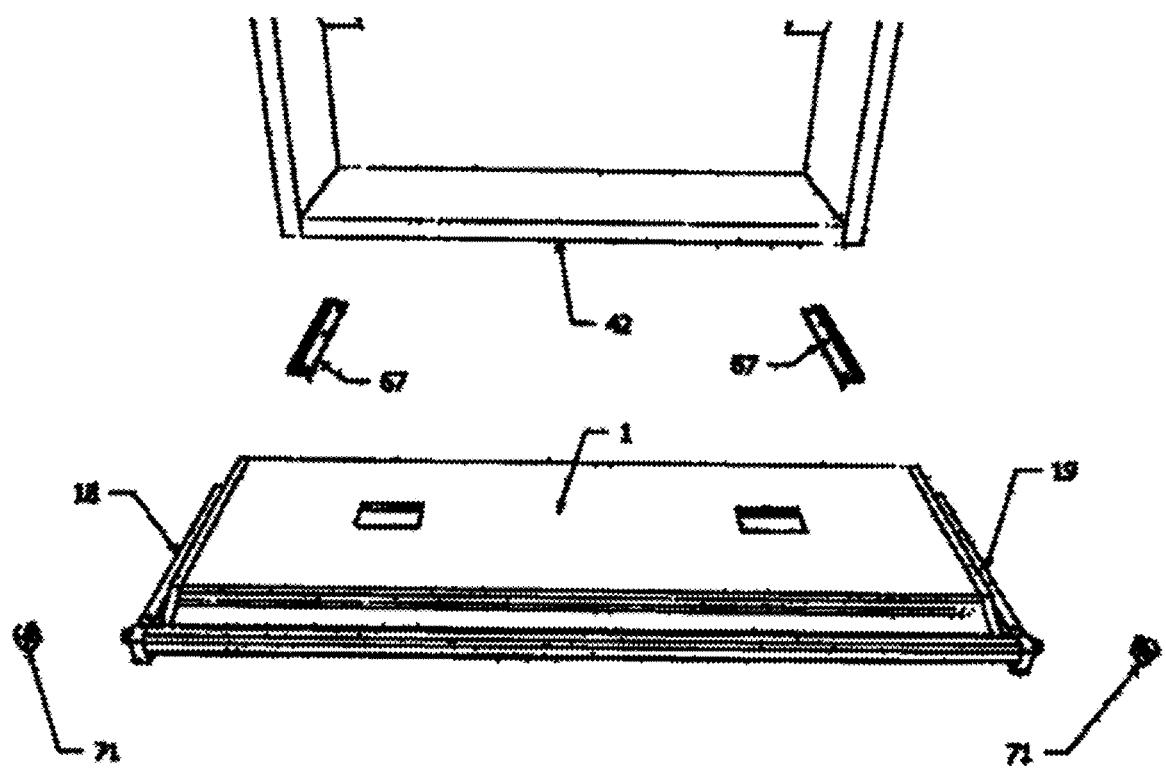
FIG. 16D shows an overhead view of the rear of a pickup with a closed Tailgate. Above the pickup is a pair of Platform Anchor Brackets and above it is an Aftermarket Tailgate Ladder which appears in the front, that is flanked by End Caps on both sides.

FIG. 16D shows an overhead view of the rear of a pickup with a closed Tailgate. Above the pickup is a pair of Platform Anchor Brackets and above it is an Aftermarket Tailgate Ladder which appears in the front, that is flanked by End Caps on both sides. The End Caps covers the open ends of the Main Gate Axles. The Platform Anchor Brackets between the pickup and the Aftermarket Tailgate Ladder, will be installed on the inside of the Tailgate. The Aftermarket Tailgate Ladder is then connected at the Left and Right Support Bars, to the Platform Anchor Brackets.

Figure 16E:
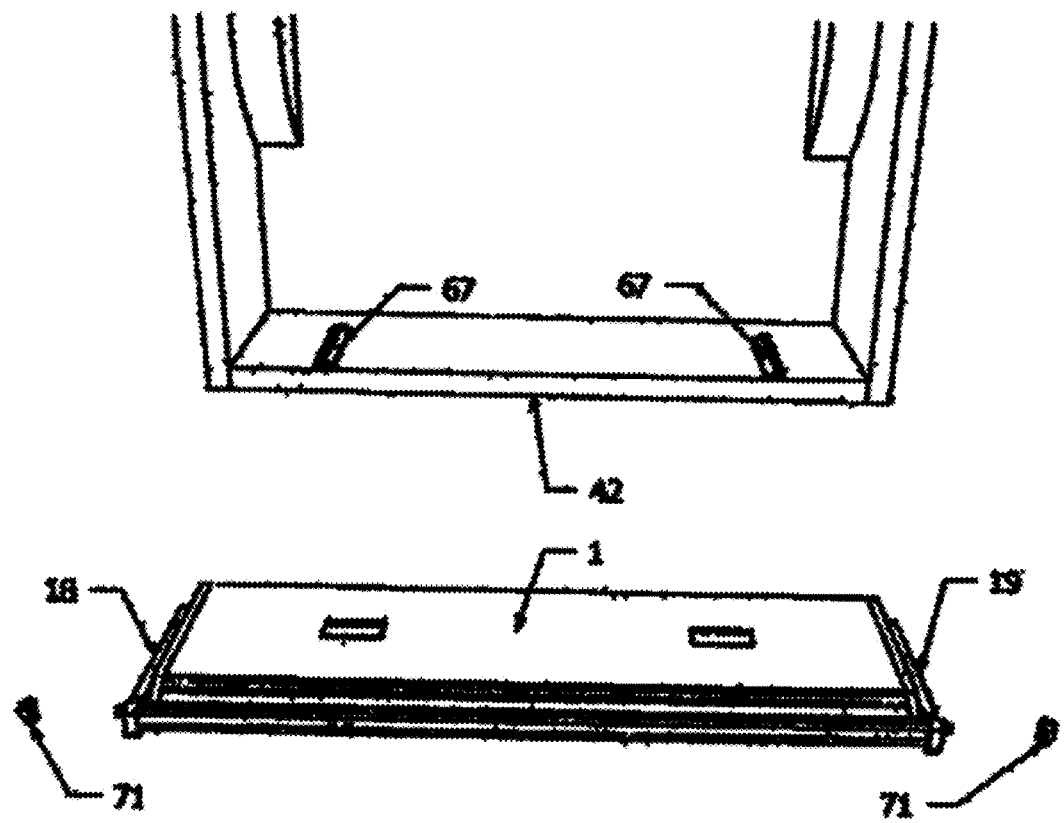
FIG. 16E is an overhead view of the rear of a pickup with two Platform Anchor Brackets attached on the inside of a closed Tailgate. A closed Aftermarket Tailgate Ladder with separated End Caps is above the rear of the pickup.

FIG. 16E is an overhead view of the rear of a pickup with two Platform Anchor Brackets attached on the inside of a closed Tailgate. A closed Aftermarket Tailgate Ladder with separated End Caps is above the rear of the pickup. The Tailgate Ladder is flanked by two End Caps which covers the open ends of the Main Gate Axles. The Left and Right Support Bars of the Aftermarket Tailgate Ladder are aligned with the Platform Anchor Brackets where they will be connected and lock in place.

Figure 16F:
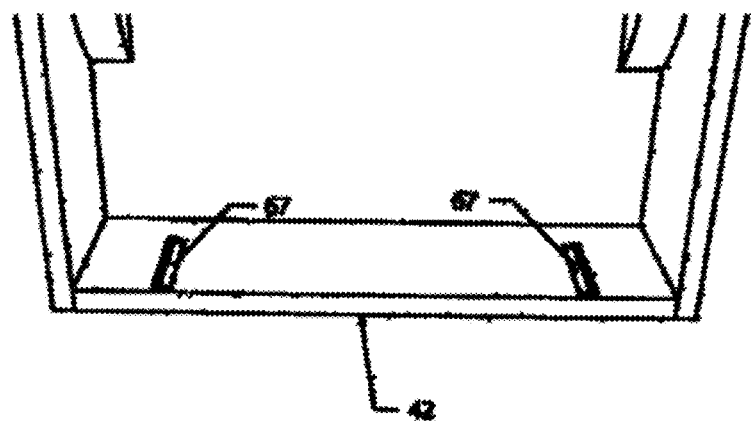
FIG. 16F is an overhead view of the said diagram in Fig. D-1e but with attached End Caps.
Figure 16F:
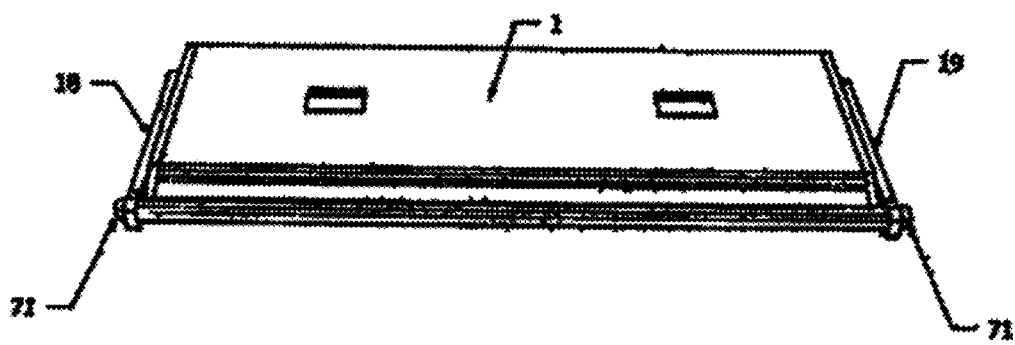

FIG. 16F is an overhead view of the said diagram in Fig. D-1e but with attached End Caps. The End Caps cover the nuts and bolts of the Main Gate Axle which gives it a clean look. The Left and Right Support Bars of the Aftermarket Tailgate Ladder are aligned with the Platform Anchor Brackets that are attached to the inside of the Tailgate.

Figure 16G:
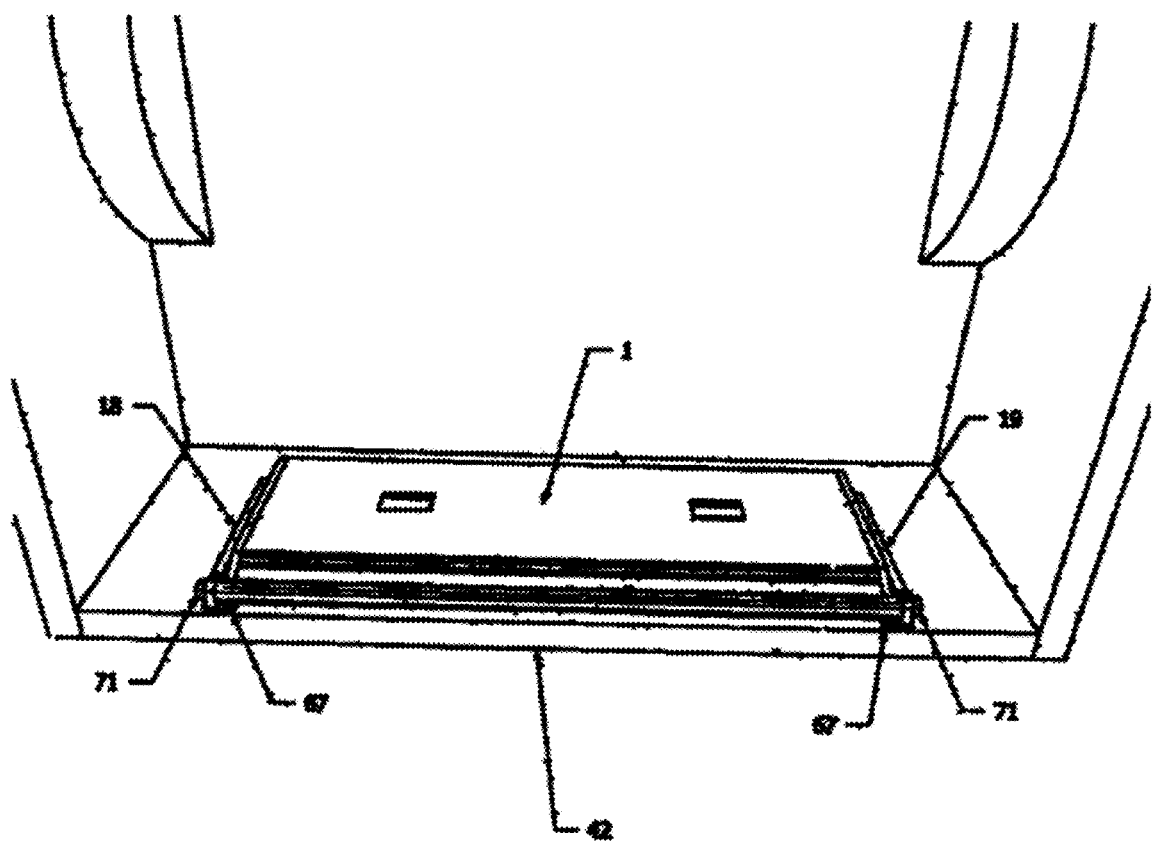
FIG. 16G is an overhead view of the rear of a pickup with a closed Tailgate, and a Tailgate Ladder that has been installed on the surface of the inside of the said Tailgate.

FIG. 16G is an overhead view of the rear of a pickup with a closed Tailgate, and an Aftermarket Tailgate Ladder that has been installed on the surface of the inside of the said Tailgate. The outer part of the Platform Anchor Brackets which connect the Aftermarket Tailgate Ladder to the Tailgate is slightly visible at the front. The End Caps cover nuts and bolts at the Main Gate Axle. The Right and Left Support Bars have Female Tracks that connect to the Male Tracks of the Platform Anchor Brackets and secure them together.

Figure 16H:
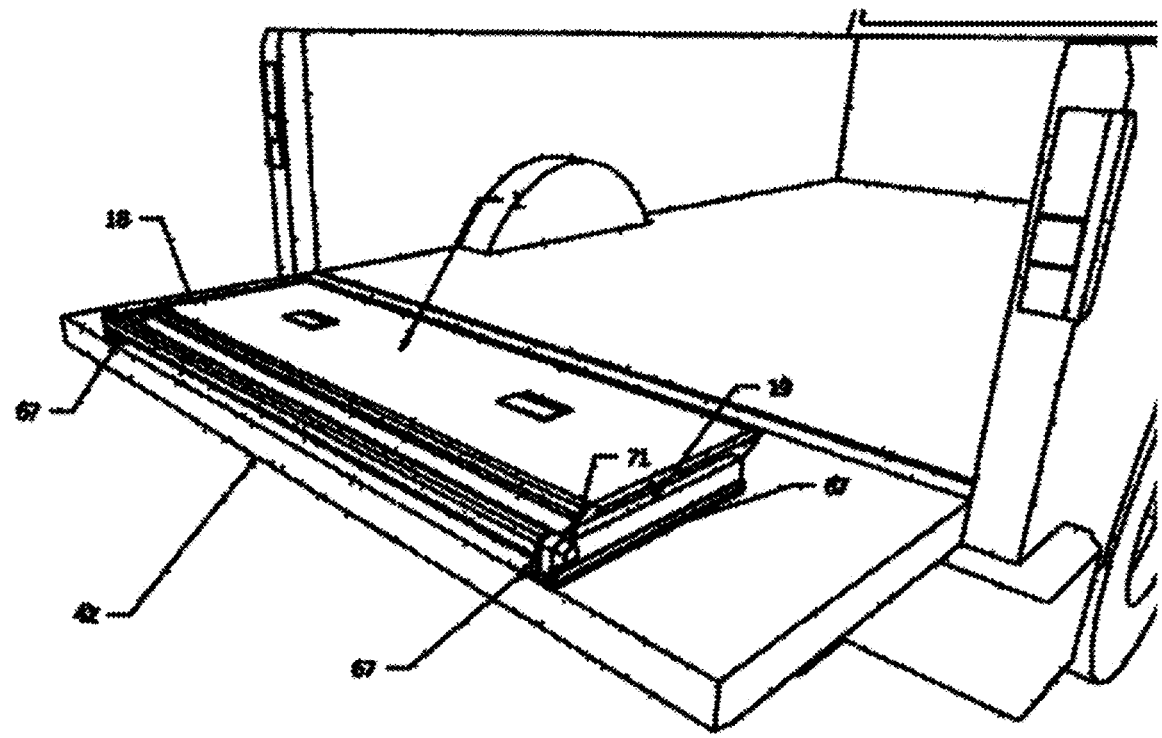
FIG. 16H is a rear view of the rear of a pickup from the right, with an opened Tailgate, and a closed Tailgate Ladder that has been installed on the inside surface of it.

FIG. 16H is a rear view of the rear of a pickup from the right, with an opened Tailgate, and a closed Tailgate Ladder that has been installed on the inside surface of it. The Platform Anchor Brackets are sandwiched between the Tailgate and the Right and Left Support Bar of the Aftermarket Tailgate Ladder as they secure both together.

Figure 16I:
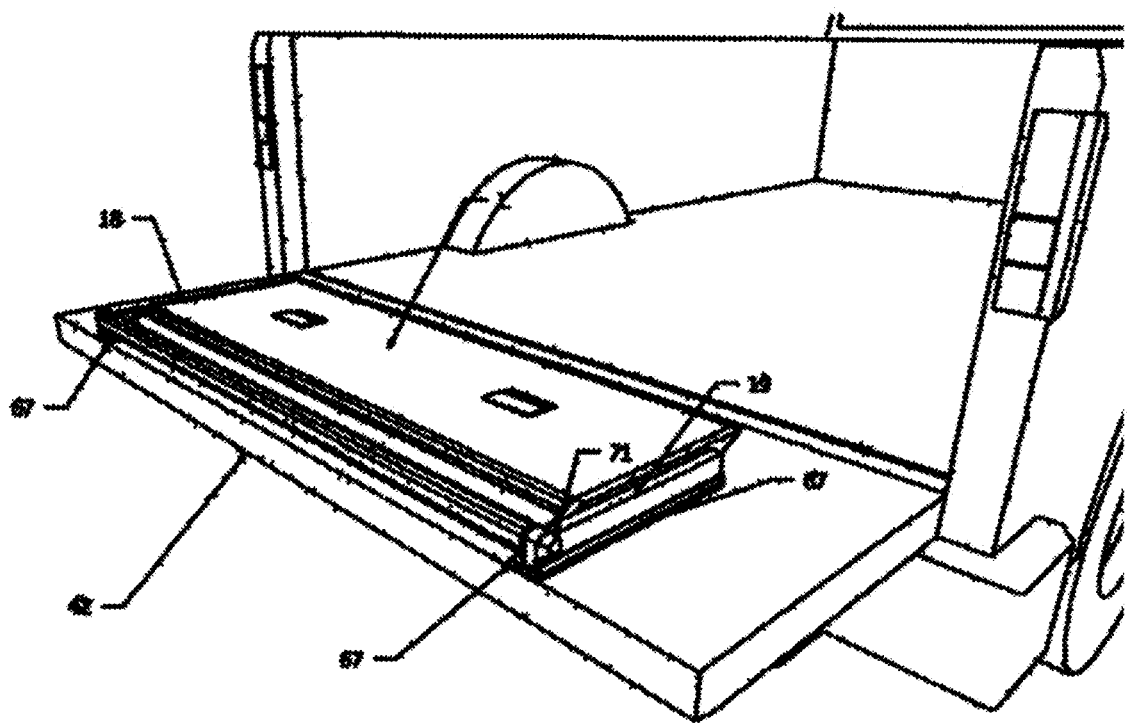
FIG. 16I shows an opened Tailgate of a pickup, with an opened Tailgate Ladder which Expose the Right and Left Support Bar that is attached to the Platform Anchor Brackets.

FIG. 16I shows an opened Tailgate of a pickup, with an opened Tailgate Ladder which Expose the Right and Left Support Bar that is attached to the Platform Anchor Brackets. The exposed Right and Left Support Bars are connected to the Platform Anchor Brackets which are connected to the opened Tailgate. The Top and Bottom Steps are opened and lowered which gives the climber access to the bed of the pickup.

Figure 17A:
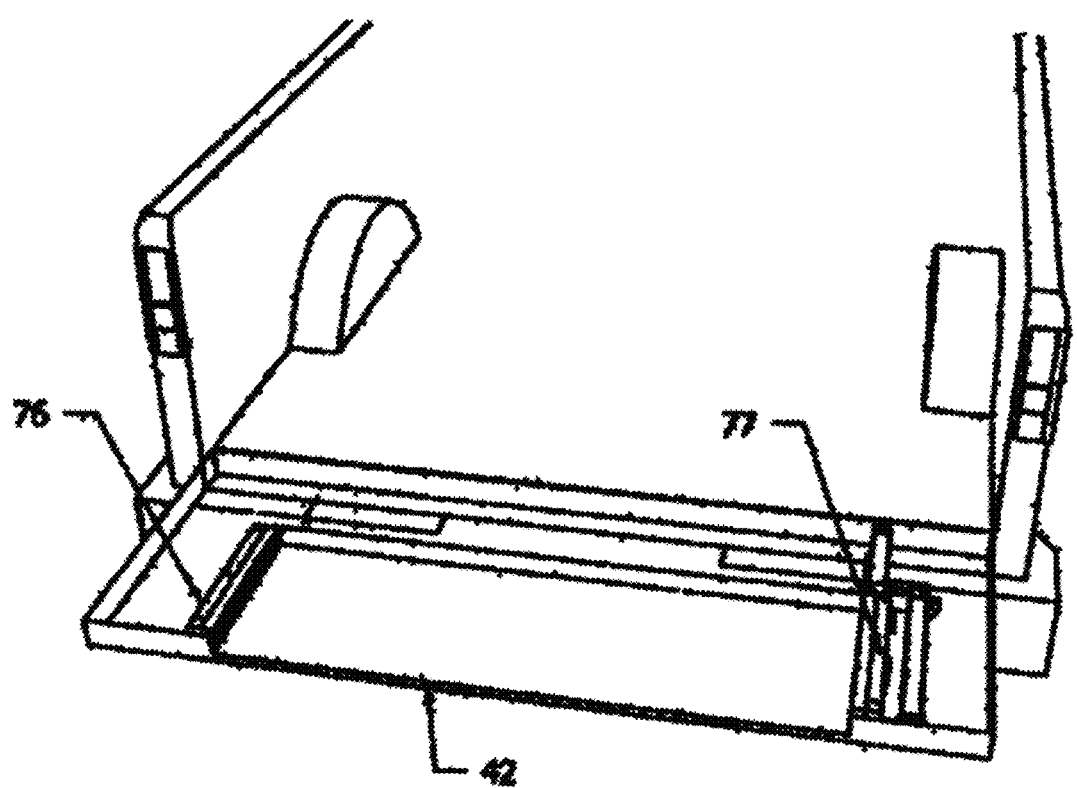
FIG. 17A is a rear view of the rear of a pickup truck with open tailgate. The inside cover of the tailgate has been removed which expose the Right and Left Support Bars with Track.

FIG. 17A is a rear view of the rear of a pickup truck with open tailgate. The inside cover of the tailgate has been removed which expose the Right and Left Support Bars with Track. The Right and Left Support Bars with attached Tracks are attached to the inside of the Tailgate. This sturdy attachment allows the Sliding Tailgate Ladder to roll along the inside Track of the Support Bars from back to front and vices versa.

Figure 17B:
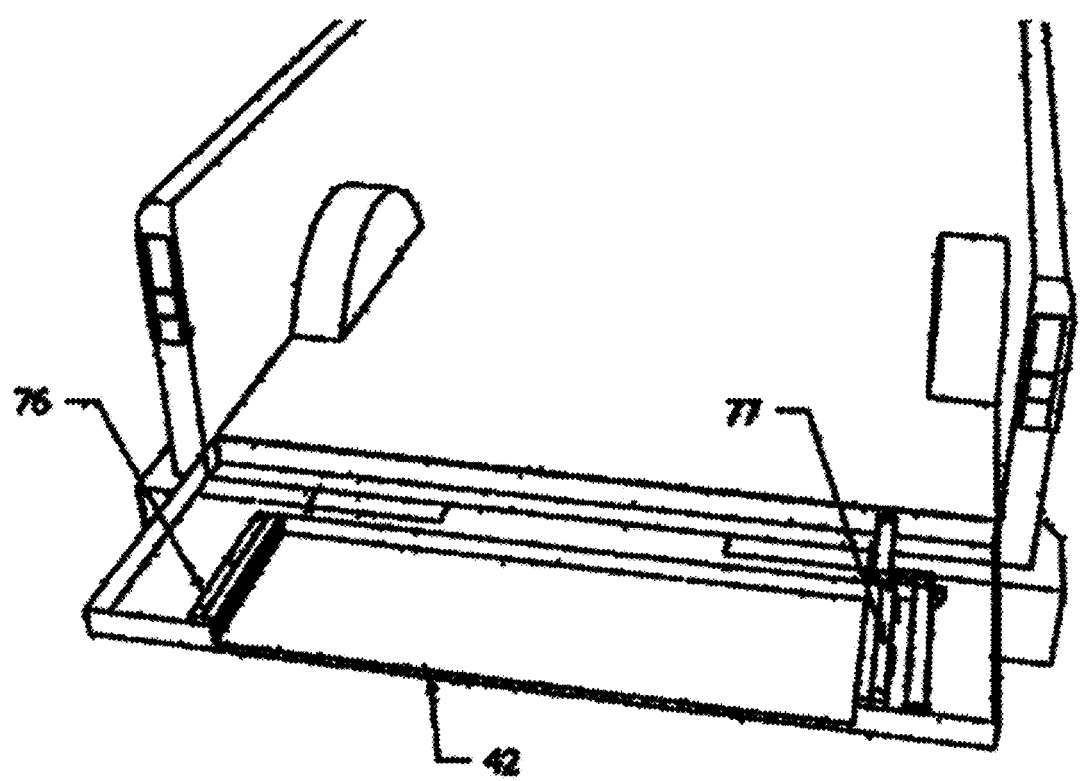
FIG. 17B shows both Right and Left Support Track Bar which is twice as wide as the regular Support Bars. The Left Support Track Bar shows the right, inside track section, while the Right Support Track Bar shows the right outside section of it.

FIG. 17B shows both Right and Left Support Track Bar which is twice as wide as the regular Support Bars. The Left Support Track Bar shows the right, inside Track section, while the Right Support Track Bar shows the right outside section of it. Both Support Track Bar (STB) are attached to the Ladder Casing and they support the moveable Sliding Tailgate Ladder which rolls along the Track. Four oversize L brackets and two oversize U Brackets connect both STB to the Tailgate.

Figure 17C:
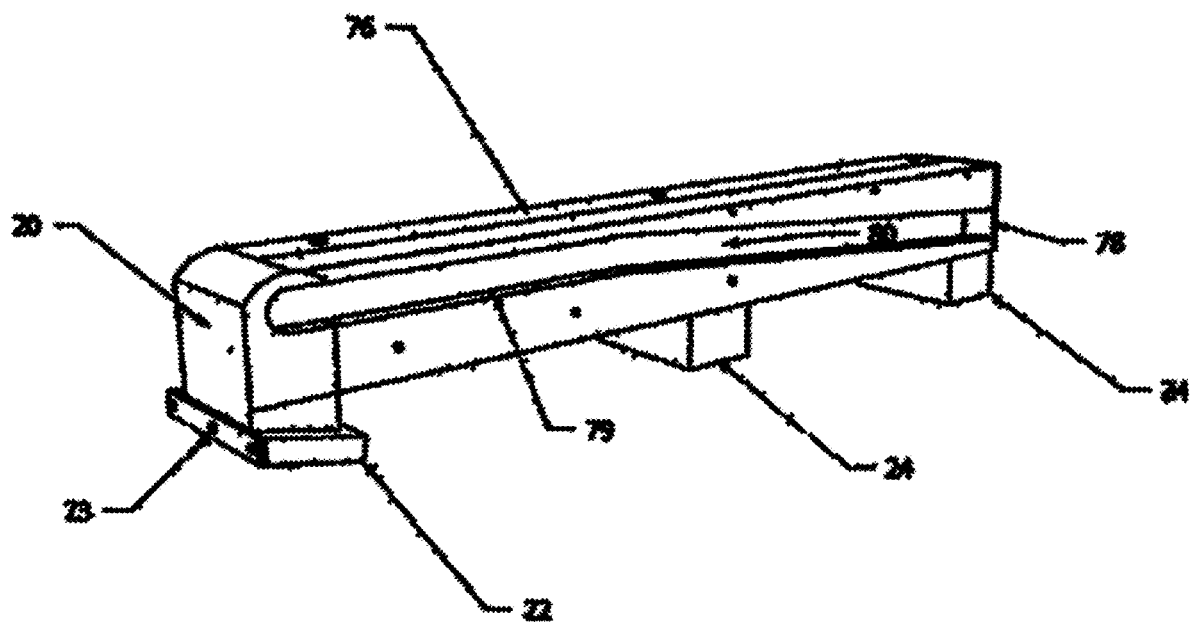
FIG. 17C is a closeup front view of the Left Support Track Bar which shows the inside Track section of it. The STB is wider and is a combination of the Support Bar and a Track section which double the thickness. The Track Opening runs parrel to the top and bottom for about a third of its length, but slopes towards the bottom for the remaining two thirds.

FIG. 17C is a closeup front view of the Left Support Track Bar which shows the inside Track section of it. The STB is wider and is a combination of the Support Bar and a Track section which double the thickness. The Track Opening runs parrel to the top and bottom for about a third of its length, but slopes towards the bottom for the remaining two thirds. At the front, the Left Support Bar Head is connected at the base by the U Bracket and the U Bracket Cover which secures it to the Ladder Casing. Partial view of both L Shaped Anchor Brackets are visible at the rear section. The Track Opening is wide enough to allow and gives enough clearance for the Axle to glide along it. Inside the Track Opening is the Track which is wider than the opening and fits the Axle Wheel. In the rear is the Track Plate which covers the rear opening which the Axle Wheel in inserted through.

Figure 17D:
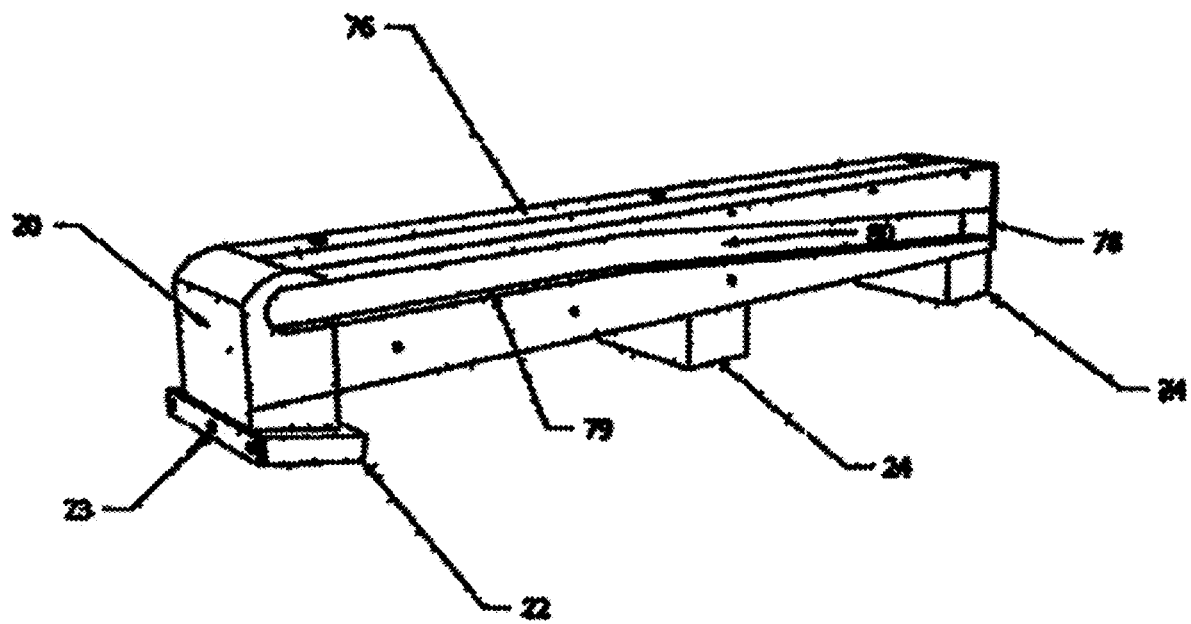
FIG. 17D is a rear view of the left side of the said Left Support Track Bar in FIG. 17C The three anchors and the Track Plate which secures the rear, are evident from this view.

FIG. 17D is a rear view of the left side of the said Left Support Track Bar in Fig. E-1c. The rear and middle L Shaped Anchor Brackets are attached to the Left Support Track Bar, and in the front U Bracket secures the Support Bar Head. Together they are connected to the Ladder Casing, which provide a sturdy support for the Aftermarket Tailgate Ladder. The Track Plate covers the rear opening and prevents the Axle Wheel from slipping out of the Track.

Figure 17E:
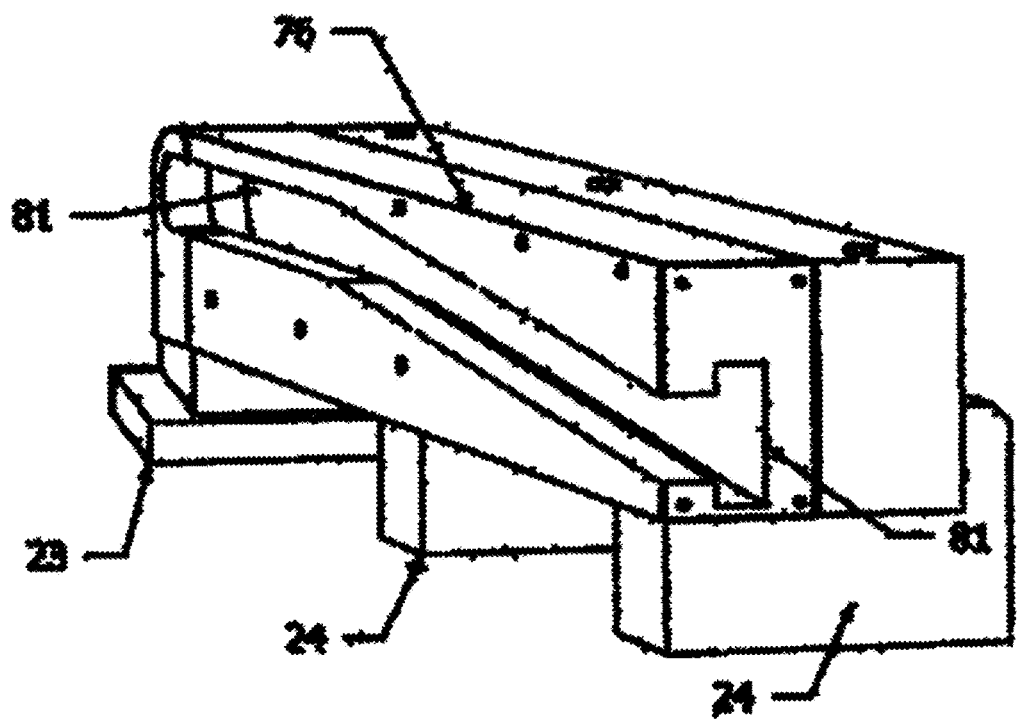
FIG. 17E is a rear view of the Left Support Track Bar. The Track Plate has been removed and a partial inside view of the Track is visible from this angle.

FIG. 17E is a rear view of the Left Support Track Bar. The Track Plate has been removed and a partial inside view of the Track is visible from this angle. The Track Plate is removed during the installation process, to allow the Axle Wheel to be placed inside the Track. It is then put back in place to secure the Axle Wheel. The L Shaped Anchor Bracket in the rear and a partial view of the one in the middle connect the Left Support Track Bar, to the Tailgate. The U Bracket in the front secures the Support Bar Head, to the Tailgate also.

Figure 18A:
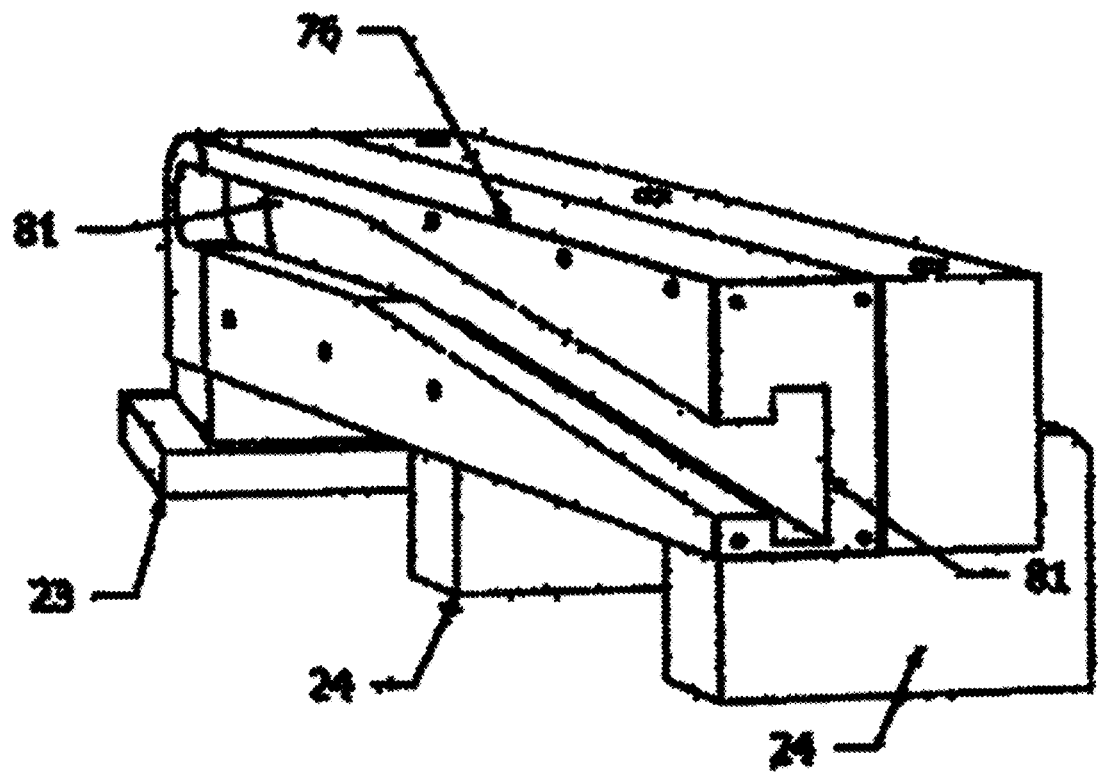
FIG. 18A shows a fully closed Sliding Tailgate Ladder in the front that is aligned with the Left and Right Support Track Bar in the rear. The Sliding Tailgate Ladder will be attached to the Left and Right Support Track Bar by the Axle Wheel which rolls along the Tracks.

FIG. 18A shows a fully closed Sliding Tailgate Ladder in the front that is aligned with the Left and Right Support Track Bar in the rear. The Sliding Tailgate Ladder will be attached to the Left and Right Support Track Bar by the Axle Wheel which rolls along the Tracks.

Figure 18B:
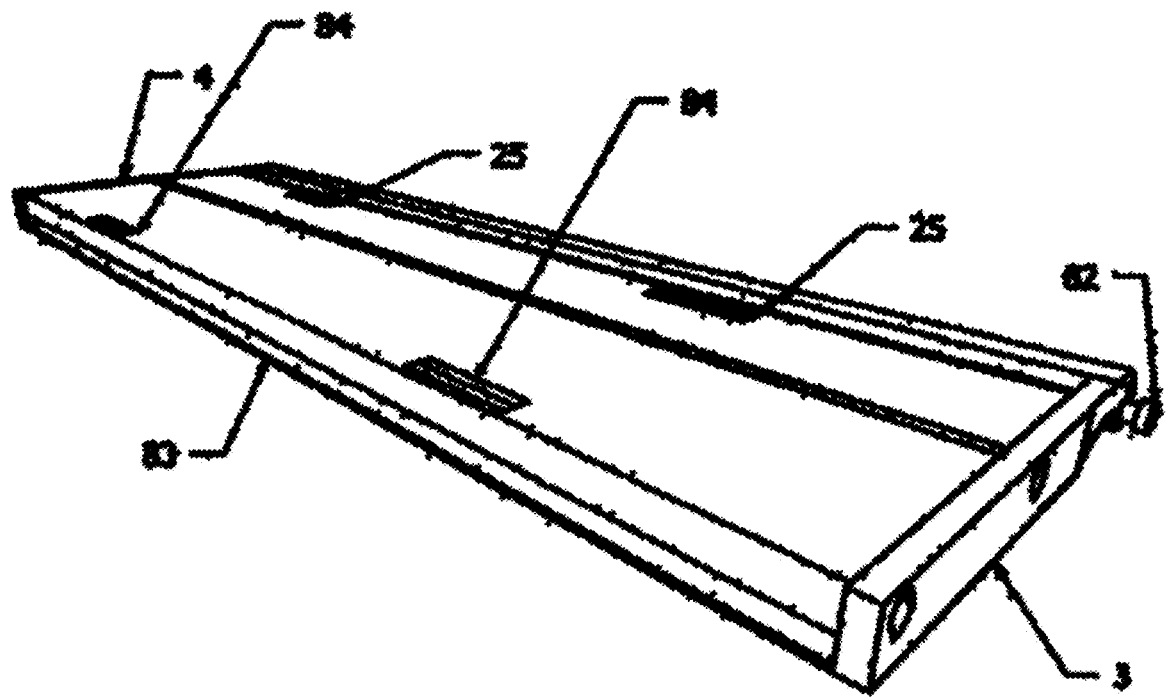
FIG. 18B shows a right-side, front view of a fully closed Sliding Tailgate Ladder, with two Handles on each Steps. A protruding left side Axle Wheel is on the right.

FIG. 18B shows a right-side, front view of a fully closed Sliding Tailgate Ladder, with two Handles on each Steps. A protruding left side Axle Wheel is on the right. Both Steps are attached to the Right and Left Arms. The curved tip of the Left Ann, which is in the front, has a protruding Axle with an Axle Wheel at the tip of it. The outside end of the Right Arm which is on the far left, is hidden from view, but is a mirror image of the Left Ann on the right. The Wheel Axles will be connected to the Track of the Right and Left Support Track Bar. The two Pull Handles at the tip of the Bottom Step, are used to pull the Sliding Tailgate Ladder forward, and the two Step Handles on the upper tip of the Top Step, are used to open the Steps.

Figure 18C:
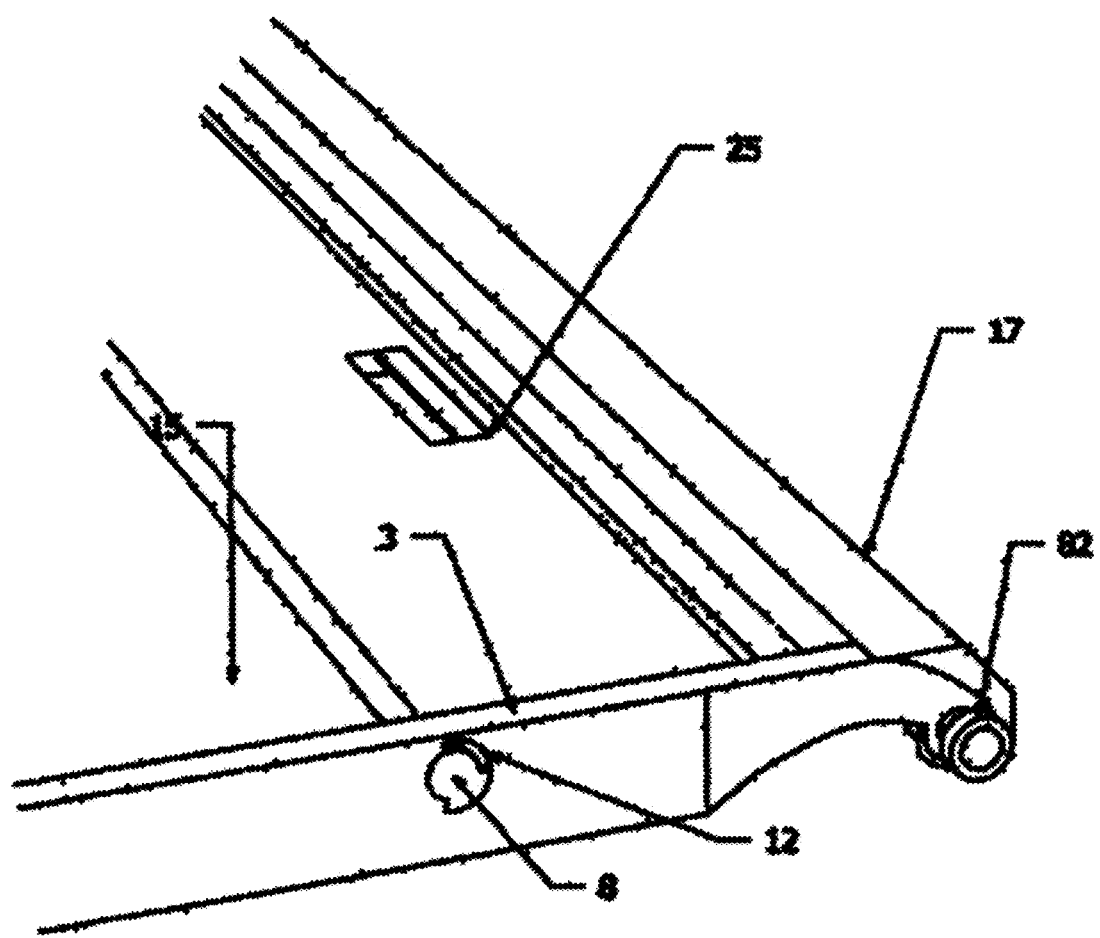
FIG. 18C is a closeup view of the front left side of the Sliding Tailgate Ladder. A clear view of the left Axle Wheel which is at the curved tip of the Left Ann, fits into the Track of the Left Support Track Bar. The Curved Slot next to the Step Axle Head are both located on the outside of the Left Arm.

FIG. 18C is a closeup view of the front left side of the Sliding Tailgate Ladder. A clear view of the left Axle Wheel which is at the curved tip of the Left Ann, fits into the Track of the Left Support Track Bar. The Curved Slot next to the Step Axle Head are both located on the outside of the Left Arm. A partial view of the Top Step with a Step Handle is secured to the Left Ann. A partial view of the Neck Casing which covers the Axle and the curved section between both Arms.

Figure 18D:
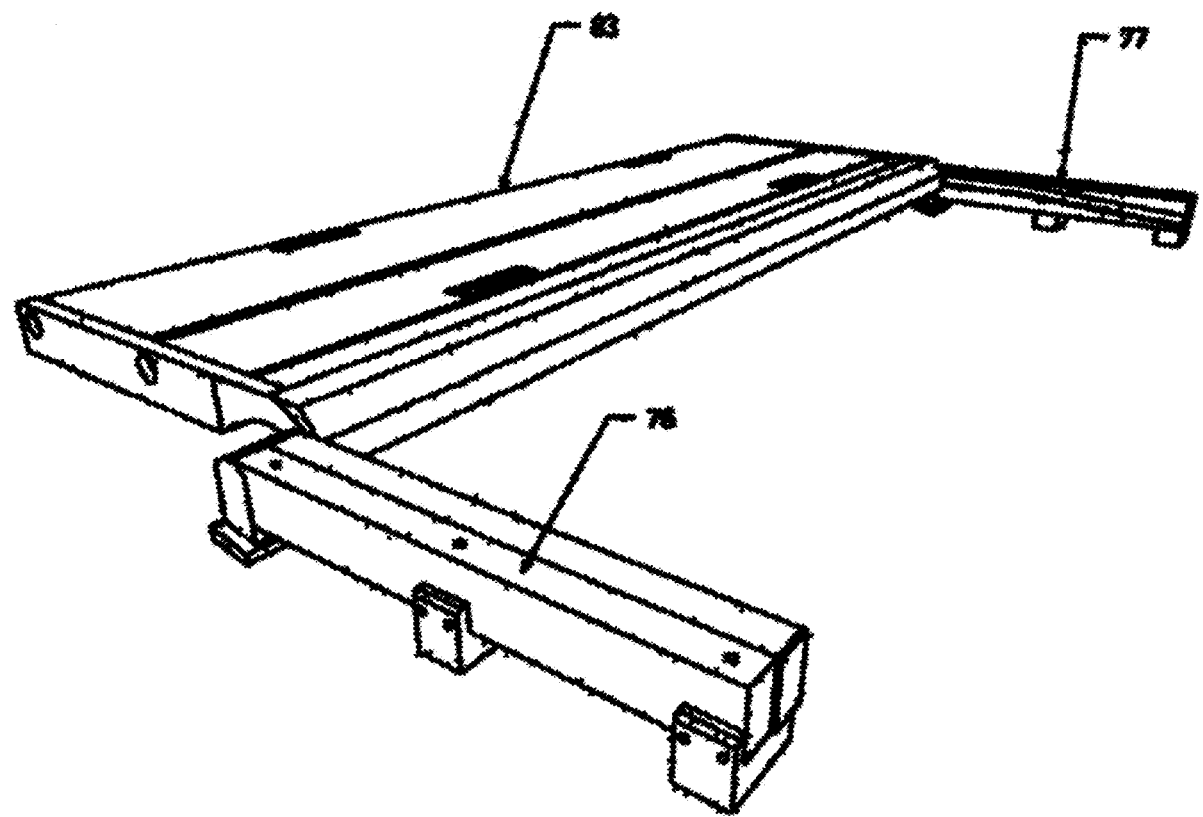
FIG. 18D is a rear view of both Support Track Bars connected to the Sliding Tailgate Ladder at the rear. Both Axle Wheels are inside the Tracks of the Left and Right Support Track Bars and are now able to roll along them.

FIG. 18D is a rear view of both Support Track Bars connected to the Sliding Tailgate Ladder at the rear. Both Axle Wheels are inside the Tracks of the Left and Right Support Track Bars and are now able to roll along them. The Sliding Tailgate Ladder slides downward in the rear which lowers it to the surface.

Figure 18E:
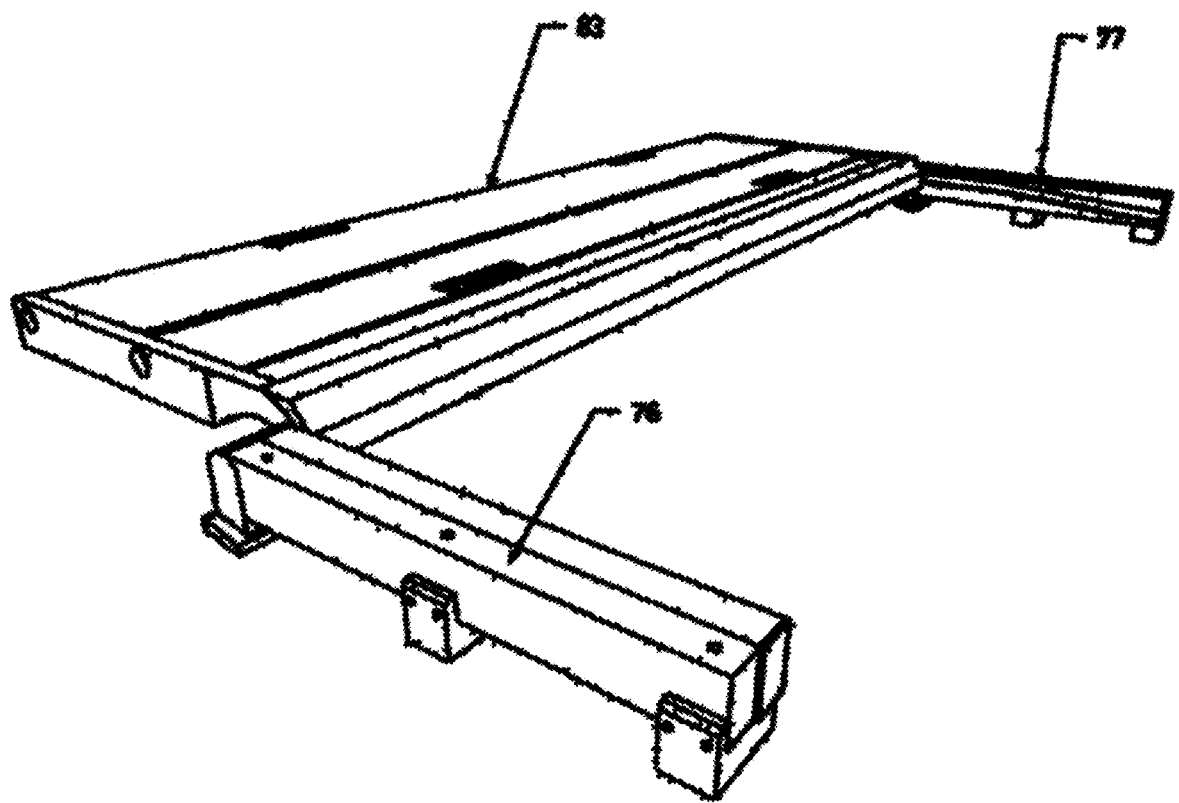
FIG. 18E is a left-side front view of a closed Sliding Tailgate Ladder that is connected to the Left Support Track Bar and the Right Support Track Bar. The Sliding Tailgate Ladder is closed and has slidden all the way along the Tracks with its outer ends flush with the Support Track Bars.

FIG. 18E is a left-side front view of a closed Sliding Tailgate Ladder that is connected to the Left Support Track Bar and the Right Support Track Bar. The Sliding Tailgate Ladder is closed and has slidden all the way along the Tracks with its outer ends flush with the Support Track Bars. The three connecting brackets on the left, connects the Left Support Track Bar to the Tailgate. The Pull Handles of the Bottom Step, pull the Sliding Tailgate Ladder forward while the two Step Handle of the Top Step, pull both Steps down to an open position. The Right Support Track Bar on the right is a mirror image of the Left Support Track Bar.

Figure 18F:
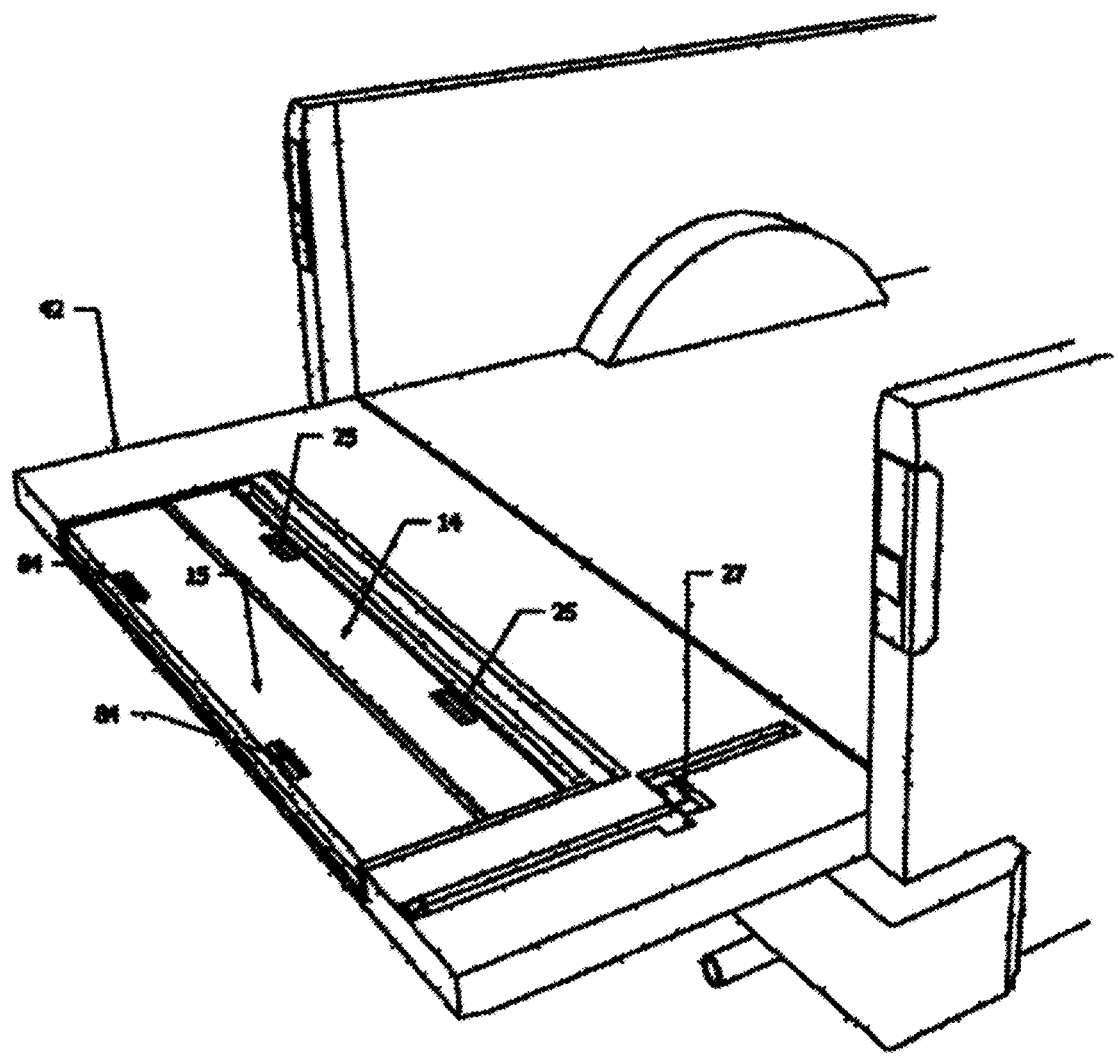
FIG. 18F is a right-side view of the rear of a pickup with an opened Tailgate and a closed Sliding Tailgate Ladder. The Sliding Tailgate Ladder is all the way in and is flush with all the outer ends of the Tailgate.

FIG. 18F is a right-side view of the rear of a pickup with an opened Tailgate and a closed Sliding Tailgate Ladder. The Sliding Tailgate Ladder is all the way in and is flush with all the outer ends of the Tailgate. The Pull Handles of the Bottom Step, pull the Sliding Tailgate Ladder forward while the Step Handles of the Top Step, pull it down to an open position. On the right of the Sliding Tailgate Ladder is a recessed Three Point Rail that is in a closed position.

Figure 18G:
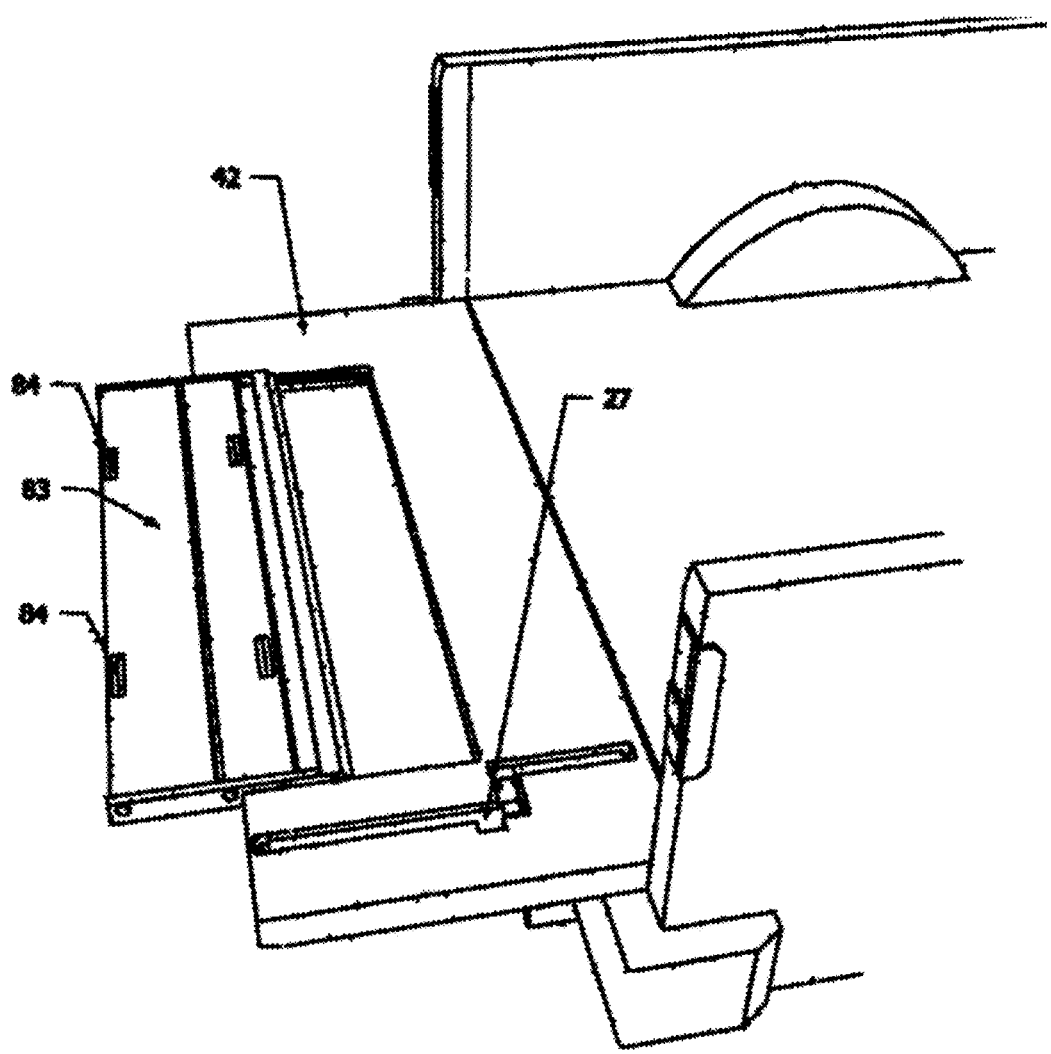
FIG. 18G is a right-side view of the rear of a pickup with an opened Tailgate and a partially opened Sliding Tailgate Ladder that has been pulled half way during the opening process which lifts it slightly above the surface.

FIG. 18G is a right-side view of the rear of a pickup with an opened Tailgate and a partially opened Sliding Tailgate Ladder that has been pulled half way during the opening process which lifts it slightly above the surface. The Sliding Tailgate Ladder as it is being continually pulled by the Pull Handles, at the bottom end of the Bottom Step, until the said Sliding Tailgate Ladder has been pulled all the way forward. On the right of the Sliding Tailgate Ladder is a recessed Three Point Rail that is in a closed position.

Figure 18H:
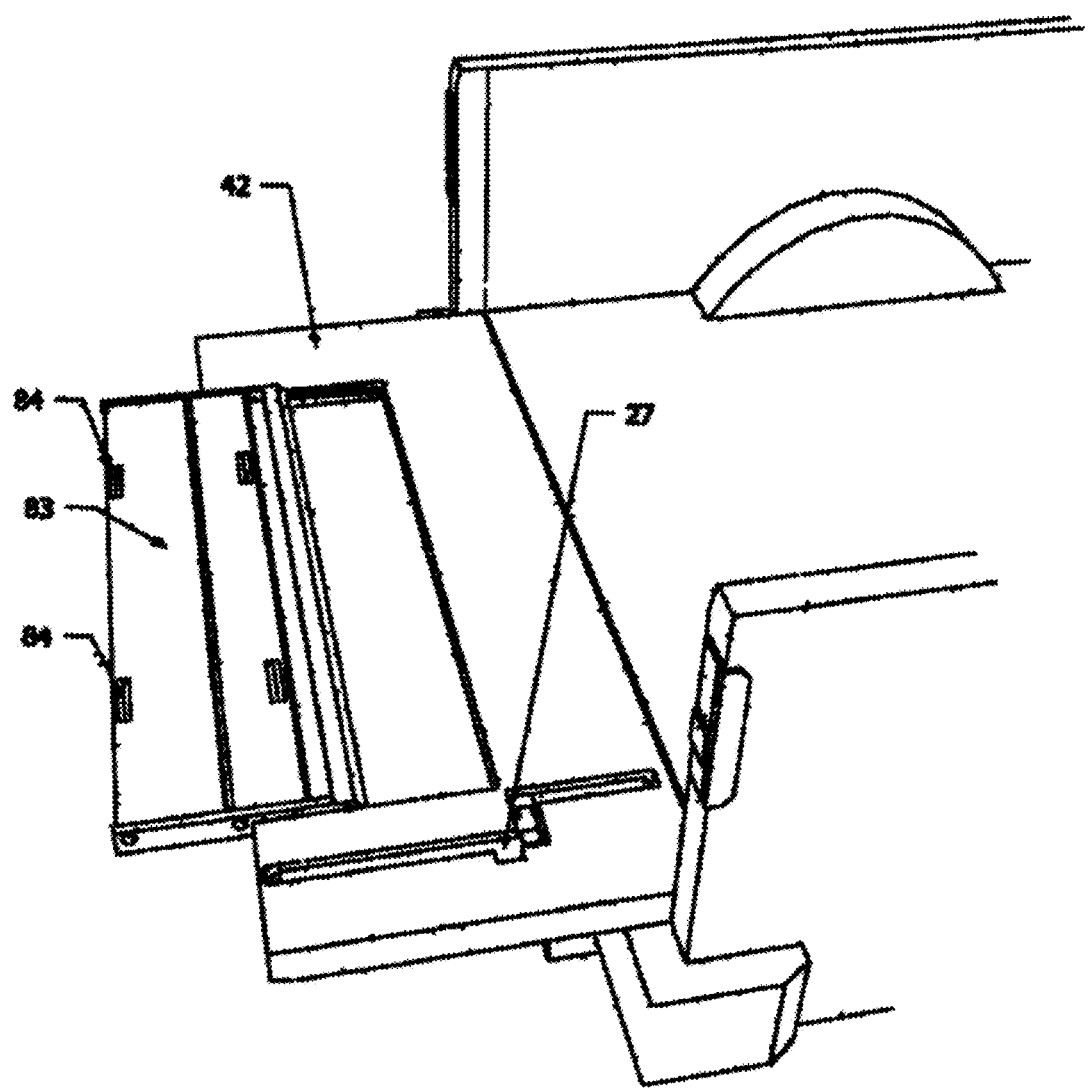
FIG. 18H is a right-side view of the rear of a pickup with an opened Tailgate and a Sliding Tailgate Ladder that has been pulled forward all the way and is about to be lowered. Now that the Sliding Tailgate Ladder has been pulled out to its maximum, it will begin to be lowered while the Steps are still closed.

FIG. 18H is a right-side view of the rear of a pickup with an opened Tailgate and a Sliding Tailgate Ladder that has been pulled forward all the way and is about to be lowered. Now that the Sliding Tailgate Ladder has been pulled out to its maximum, it will begin to be lowered while the Steps are still closed. Right of the Sliding Tailgate Ladder is a recessed Three Point Rail that is in a closed position.

Figure 18I:
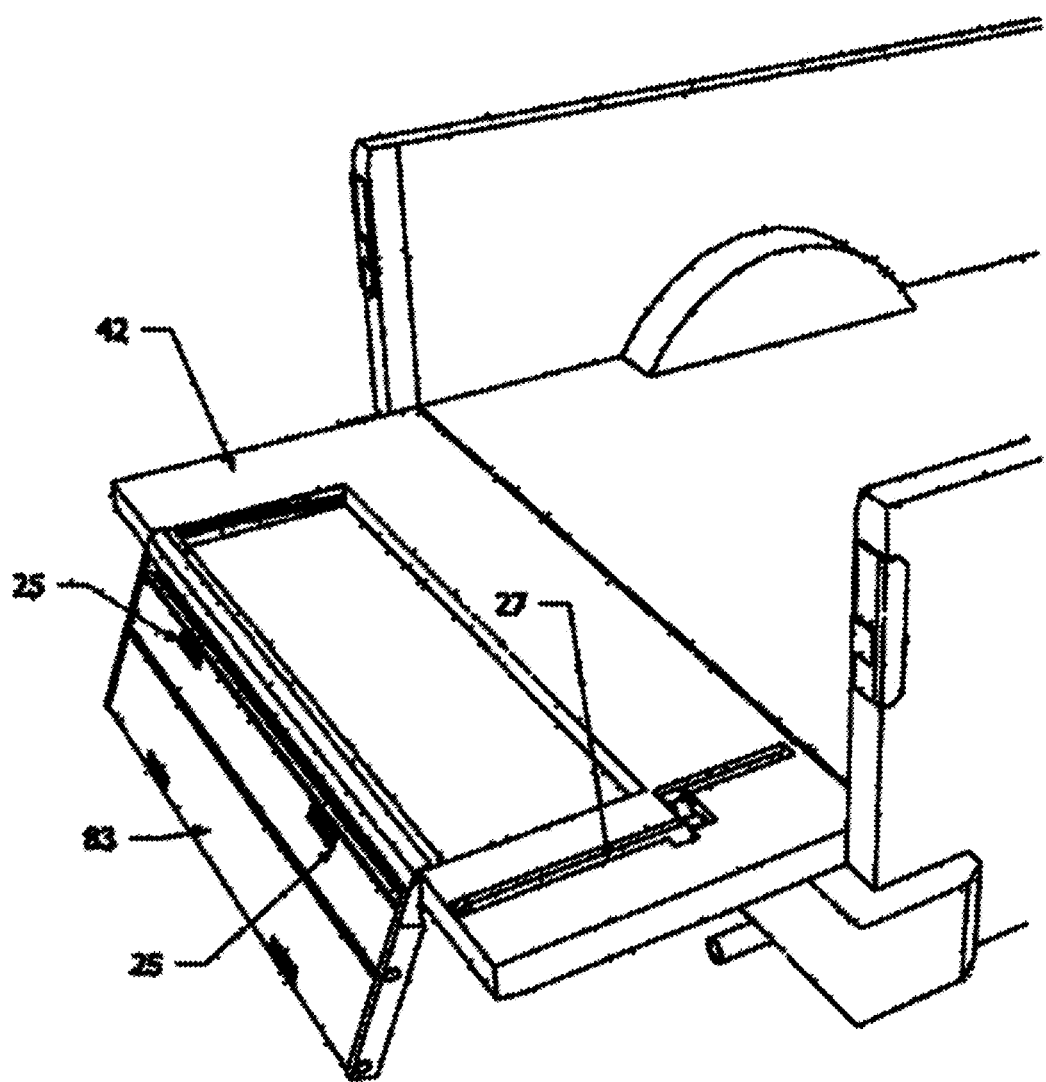
FIG. 18I is a right-side view of the rear of a pickup with an opened Tailgate and a Sliding Tailgate Ladder that has been pulled all the way forward and lowered. Both Steps are still closed and a pull of the Step Handles of the Top Step will lower both of them and make them accessible.

FIG. 18I is a right-side view of the rear of a pickup with an opened Tailgate and a Sliding Tailgate Ladder that has been pulled all the way forward and lowered. Both Steps are still closed and a pull of the Step Handles of the Top Step will lower both of them and make them accessible. Right of the Sliding Tailgate Ladder is a recessed Three Point Rail that is in a closed position.

Figure 18J:
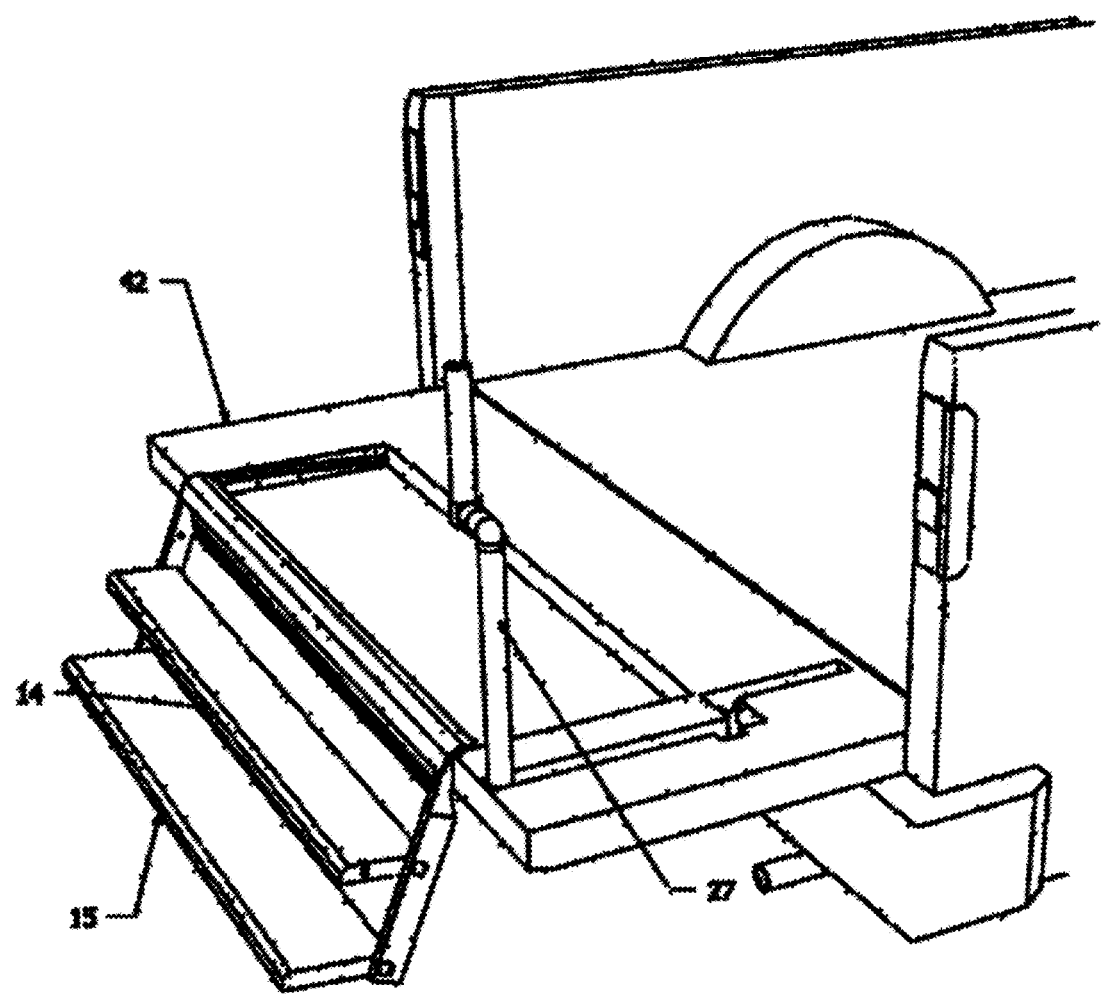
FIG. 18J is a right-side view of the rear of a pickup with an opened Tailgate, and a fully opened Sliding Tailgate Ladder. The Steps have been lowered which give access to anyone who needs to climb to the back of the pickup.

FIG. 18J is a right-side view of the rear of a pickup with an opened Tailgate, and a fully opened Sliding Tailgate Ladder. The Steps have been lowered which give access to anyone who needs to climb to the back of the pickup. The Three Point Rail has been pulled up from the recess of the Rail Casing, and is in an upright position. It is now able to assist the climber as he/she moves up and down the Steps.

I claim:

1. A tailgate ladder system, comprising:
    a moveable tailgate ladder, with manual operation or electric powered operation, that rotates from a confine of a ladder casing, and flips over with two deployable steps which open to form a collapsible tailgate ladder; and
    a single step axle that is placed at a rear of the two deployable steps, with an offsetting large step axle head, which oscillates and moves within a curved slot of a pair of right and left arms, and a cylindrical body with elongated gears that span its length, that lock into gears of a support of one of the two deployable steps.

2. The tailgate ladder system of claim 1,
wherein the tailgate ladder is an aftermarket tailgate ladder that can be operated manually, by electric power, or by sliding, and connects to a flat inside facing side of a tailgate by an anchor bracket;
wherein the anchor bracket contains a male track and is bolted to a flat surface of the tailgate; and
wherein the anchor bracket connects the ladder to the tailgate; and
wherein a plurality of right and left support bars comprise a recessed female track on an underside that locks into the male track of the anchor bracket.

3. The tailgate ladder system of claim 1, wherein the offsetting large step axle head fits on an outer channel of the curved slot of the pair of right and left arms, and wherein movement of the axle head is restricted to oscillate from end to end of the curved slot.

4. The tailgate ladder system of claim 1, wherein the offsetting large step axle head is placed at one end of one of the two deployable steps, away from the center, closer to the rear which allows one of the two deployable steps to open further outward.

5. The tailgate ladder system of claim 1, wherein the cylindrical body of the step axle locks into the gears of the support and fixes the motion of one of the two deployable steps to the step axle.

6. The tailgate ladder system of claim 1, wherein oscillation of the offsetting large step axle head along the curved slot is the amount of rotation that it takes open and close one of the two deployable steps.

7. A sliding tailgate ladder that slides along tracks that are embedded in a left support bar and in a right support bars, and which slides from back to the front to open, and slides from front to back to close, comprising:
an axle wheel that is connected to a front end of the sliding tailgate ladder and a wheel end, and fits in the tracks that are embedded in the right support bar and in the left support bar,
wherein the tracks are embedded in the right support bar and in the left support bar that support the axle wheel, and are sloped downward in a rear of the left and right support bars, which lower the sliding tailgate ladder as it is pushed backward, and which lift the sliding tailgate ladder as it is being pulled forward.

* * * * *